United States Patent
Kawamura et al.

(10) Patent No.: US 10,502,937 B2
(45) Date of Patent: Dec. 10, 2019

(54) VARIABLE MAGNIFICATION OPTICAL SYSTEM AND IMAGE PICKUP APPARATUS USING THE SAME

(71) Applicant: OLYMPUS CORPORATION, Hachioji-shi, Tokyo (JP)

(72) Inventors: Kazuteru Kawamura, Hachioji (JP); Koji Nakagawa, Yokohama (JP); Masahiro Imamura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 191 days.

(21) Appl. No.: 15/479,714

(22) Filed: Apr. 5, 2017

(65) Prior Publication Data
US 2017/0293122 A1    Oct. 12, 2017

(30) Foreign Application Priority Data

Apr. 6, 2016 (JP) ................. 2016-076427
Apr. 6, 2016 (JP) ................. 2016-076428
Apr. 6, 2016 (JP) ................. 2016-076535
Mar. 6, 2017 (JP) ................. 2017-041344

(51) Int. Cl.
| G02B 15/16 | (2006.01) |
| G02B 15/163 | (2006.01) |
| G02B 27/00 | (2006.01) |
| G02B 27/64 | (2006.01) |
| G02B 15/173 | (2006.01) |

(52) U.S. Cl.
CPC .......... *G02B 15/16* (2013.01); *G02B 15/163* (2013.01); *G02B 15/173* (2013.01); *G02B 27/0025* (2013.01); *G02B 27/646* (2013.01)

(58) Field of Classification Search
CPC .... G02B 15/16; G02B 15/163; G02B 15/173; G02B 27/0025; G02B 27/646
See application file for complete search history.

(56) References Cited

U.S. PATENT DOCUMENTS 6,449,433 B2   9/2002   Hagimori et al.
7,126,759 B2   10/2006   Sensui
(Continued)

FOREIGN PATENT DOCUMENTS

JP   2001350093 A   12/2001
JP   2005049843 A   2/2005
(Continued)

OTHER PUBLICATIONS

Related U.S. Appl. No. 15/479,626, filed Apr. 5, 2017, First Named Inventor: Kazuteru Kawamura, Title: "Zoom Optical System and Image Pickup Apparatus Using the Same".
(Continued)

*Primary Examiner* — Darryl J Collins
*Assistant Examiner* — Journey F Sumlar
(74) *Attorney, Agent, or Firm* — Holtz, Holtz & Volek PC

(57) ABSTRACT

A variable magnification optical system includes: in order from an object side, a first lens unit having a positive refractive power; a second lens unit having a negative refractive power; a third lens unit having a positive refractive power; and an image-side lens unit. The image-side lens unit includes a lens belonging to a first region and a lens belonging to a second region. At a time of changing magnification, the second lens unit and the third lens unit move.

60 Claims, 45 Drawing Sheets

(56) References Cited

U.S. PATENT DOCUMENTS

| | | |
|---|---|---|
| 8,605,362 B2 | 12/2013 | Ito |
| 8,891,173 B2 | 11/2014 | Hagiwara |
| 2009/0290232 A1 | 11/2009 | Hagiwara |
| 2010/0053766 A1 | 3/2010 | Okada |
| 2010/0134901 A1 | 6/2010 | Kimura |
| 2011/0080653 A1 | 4/2011 | Kimura |
| 2012/0300313 A1 | 11/2012 | Wada |
| 2012/0314299 A1 | 12/2012 | Tashiro et al. |
| 2014/0009652 A1 | 1/2014 | Sugita |
| 2014/0009832 A1 | 1/2014 | Sugita |
| 2014/0036137 A1 | 2/2014 | Inoue |
| 2014/0118603 A1 | 5/2014 | Saito |
| 2014/0218808 A1 | 8/2014 | Ogata et al. |
| 2015/0281588 A1 | 10/2015 | Izuhara et al. |
| 2017/0108676 A1* | 4/2017 | Hori ............... G02B 15/173 |

FOREIGN PATENT DOCUMENTS

| | | |
|---|---|---|
| JP | 2011175098 A | 9/2011 |
| JP | 2011221554 A | 11/2011 |
| JP | 2012113285 A | 6/2012 |

OTHER PUBLICATIONS

Related U.S. Appl. No. 15/479,673, filed Apr. 5, 2017, First Named Inventor: Kazuteru Kawamura, Title: "Variable Magnification Optical System and Image Pickup Apparatus Using the Same".

Notice of Allowance dated Jan. 18, 2019 issued in U.S. Appl. No. 15/479,626.

Notice of Allowance dated Sep. 13, 2019 issued in U.S. Appl. No. 15/479,673.

* cited by examiner

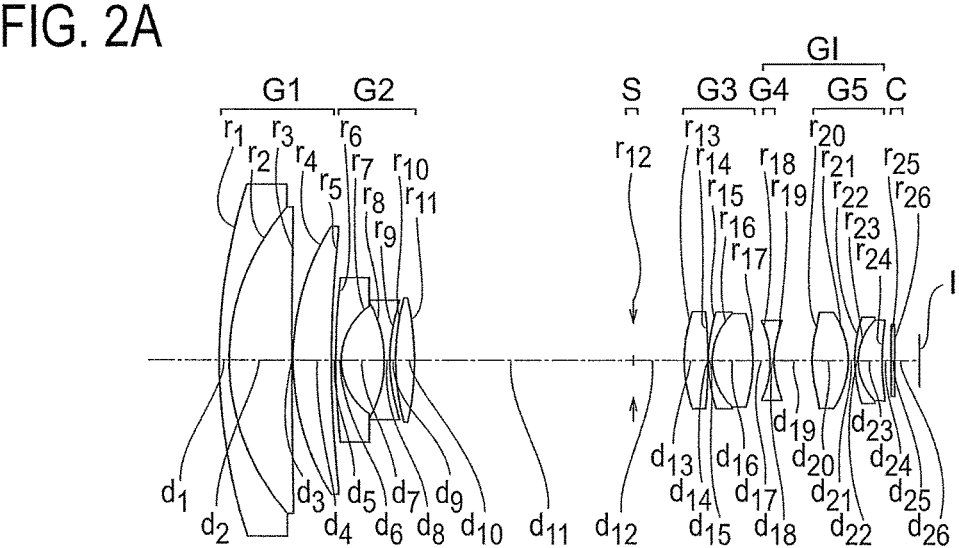
FIG. 2A
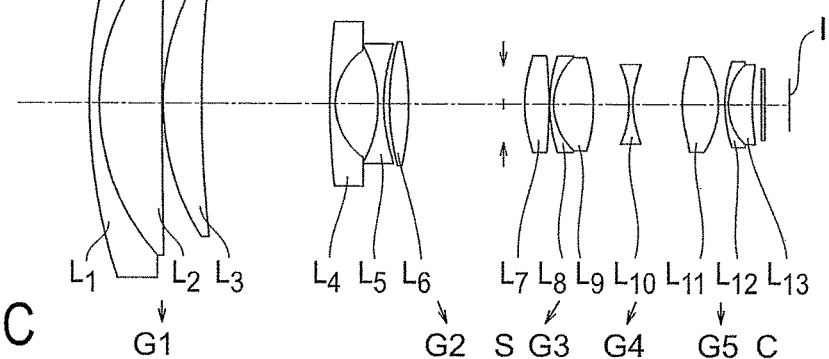
FIG. 2B
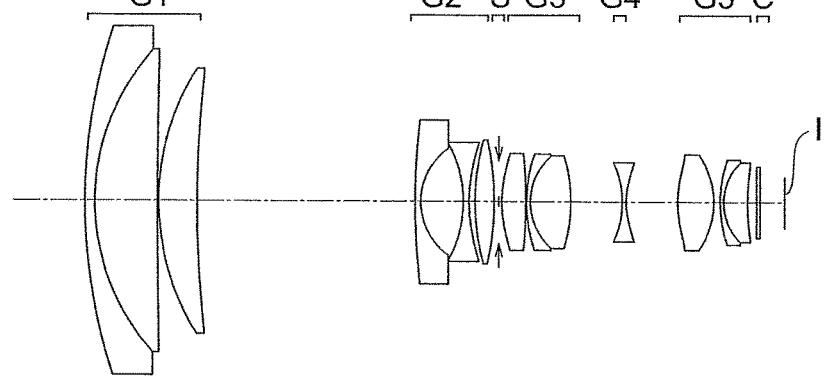
FIG. 2C

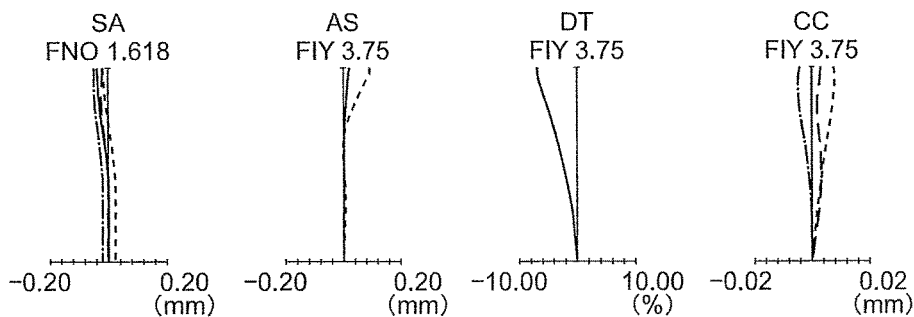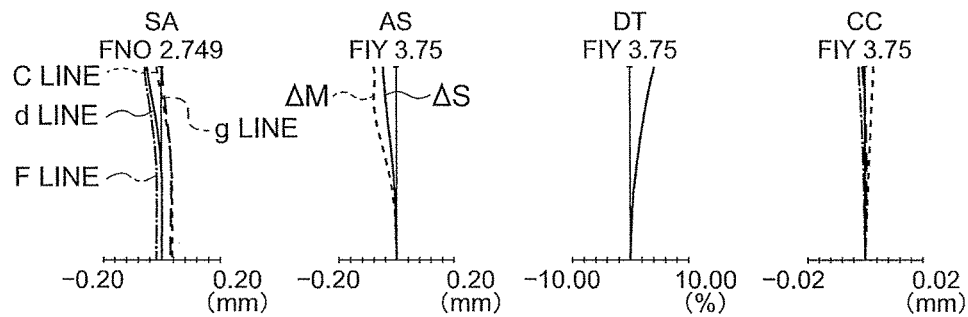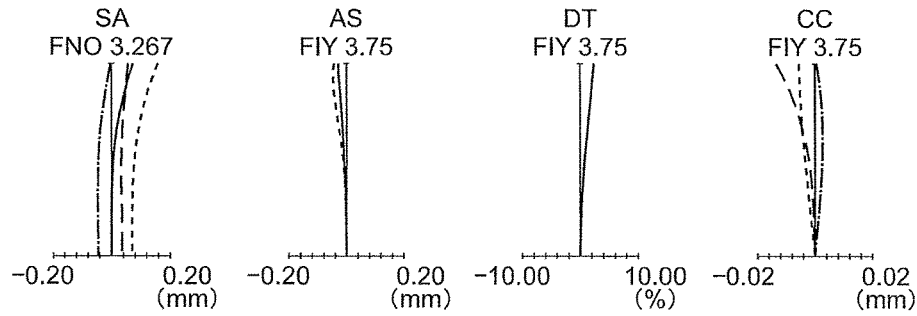

SA
FNO 1.514
-0.20    0.20
(mm)

AS
FIY 3.63
-0.20    0.20
(mm)

DT
FIY 3.63
-10.00   10.00
(%)

CC
FIY 3.63
-0.02    0.02
(mm)

SA
FNO 1.786
-0.20    0.20
(mm)

AS
FIY 3.63
-0.20    0.20
(mm)

DT
FIY 3.63
-10.00   10.00
(%)

CC
FIY 3.63
-0.02    0.02
(mm)

SA
FNO 1.942
-0.20    0.20
(mm)

AS
FIY 3.63
-0.20    0.20
(mm)

DT
FIY 3.63
-10.00   10.00
(%)

CC
FIY 3.63
-0.02    0.02
(mm)

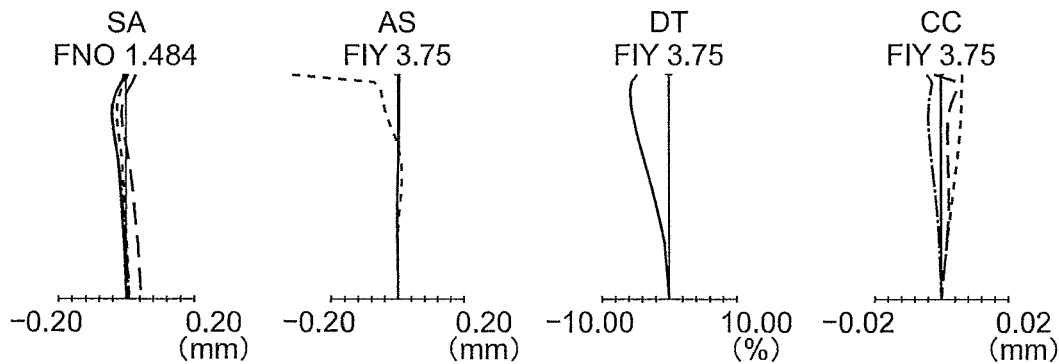
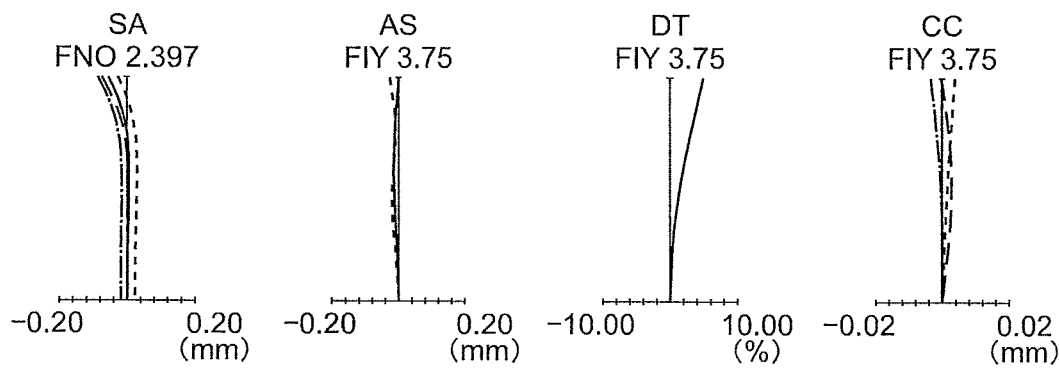
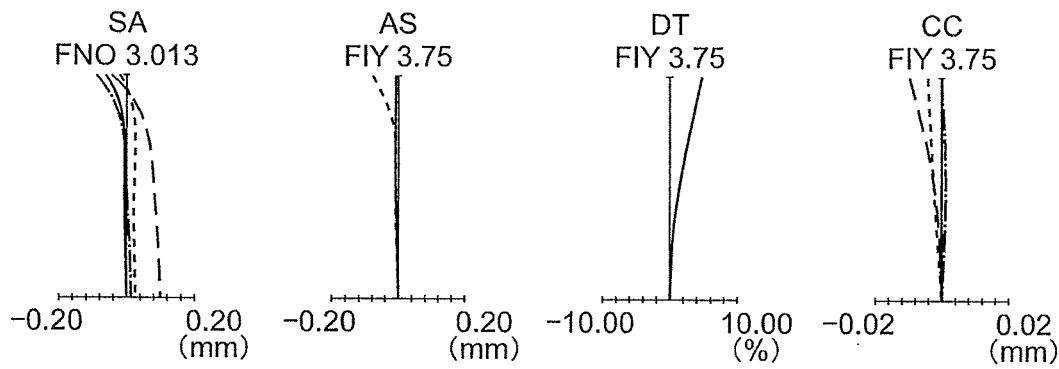

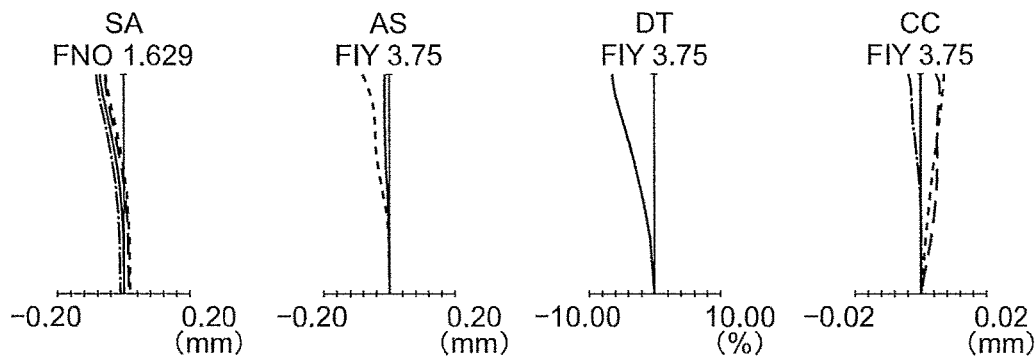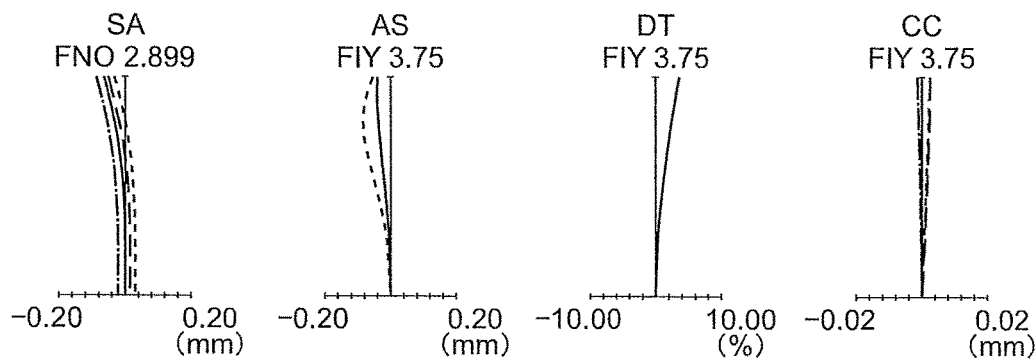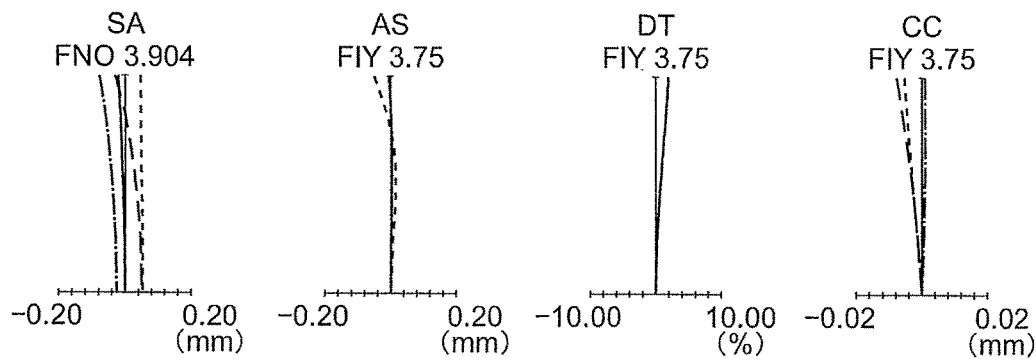

SA
FNO 1.632
-0.20  0.20
(mm)

AS
FIY 3.90
-0.20  0.20
(mm)

DT
FIY 3.90
-10.00  10.00
(%)

CC
FIY 3.90
-0.02  0.02
(mm)

SA
FNO 2.700
-0.20  0.20
(mm)

AS
FIY 3.90
-0.20  0.20
(mm)

DT
FIY 3.90
-10.00  10.00
(%)

CC
FIY 3.90
-0.02  0.02
(mm)

SA
FNO 4.550
-0.20  0.20
(mm)

AS
FIY 3.90
-0.20  0.20
(mm)

DT
FIY 3.90
-10.00  10.00
(%)

CC
FIY 3.90
-0.02  0.02
(mm)

SA
FNO 1.632
-0.20  0.20
(mm)

AS
FIY 3.90
-0.20  0.20
(mm)

DT
FIY 3.90
-10.00  10.00
(%)

CC
FIY 3.90
-0.02  0.02
(mm)

SA
FNO 2.500
-0.20  0.20
(mm)

AS
FIY 3.90
-0.20  0.20
(mm)

DT
FIY 3.90
-10.00  10.00
(%)

CC
FIY 3.90
-0.02  0.02
(mm)

SA
FNO 3.750
-0.20  0.20
(mm)

AS
FIY 3.90
-0.20  0.20
(mm)

DT
FIY 3.90
-10.00  10.00
(%)

CC
FIY 3.90
-0.02  0.02
(mm)

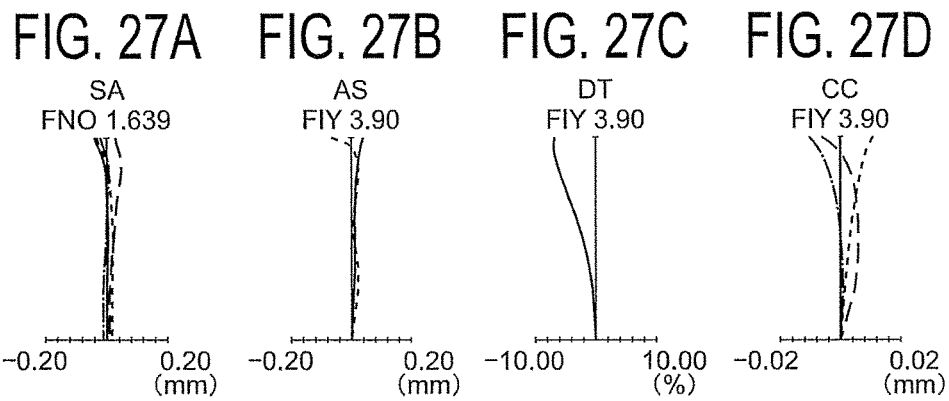
FIG. 27A SA FNO 1.639
FIG. 27B AS FIY 3.90
FIG. 27C DT FIY 3.90
FIG. 27D CC FIY 3.90
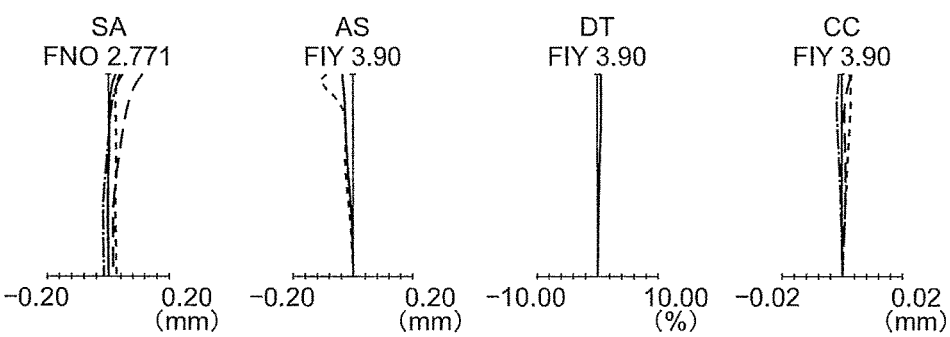
FIG. 27E SA FNO 2.771
FIG. 27F AS FIY 3.90
FIG. 27G DT FIY 3.90
FIG. 27H CC FIY 3.90
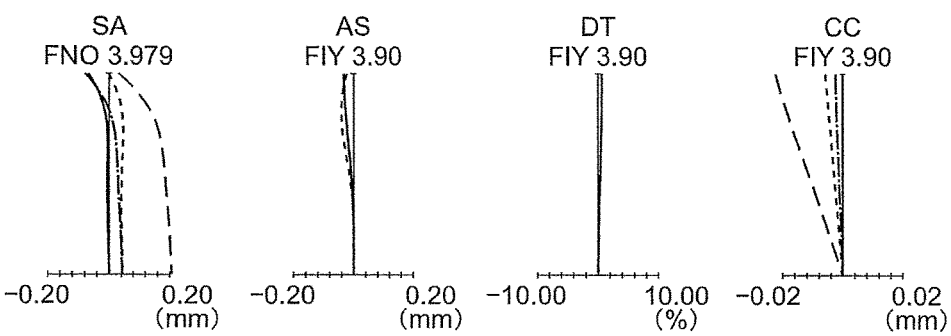
FIG. 27I SA FNO 3.979
FIG. 27J AS FIY 3.90
FIG. 27K DT FIY 3.90
FIG. 27L CC FIY 3.90

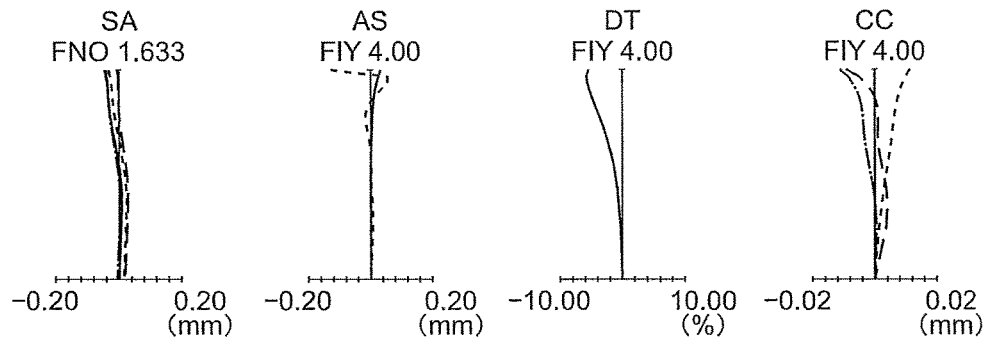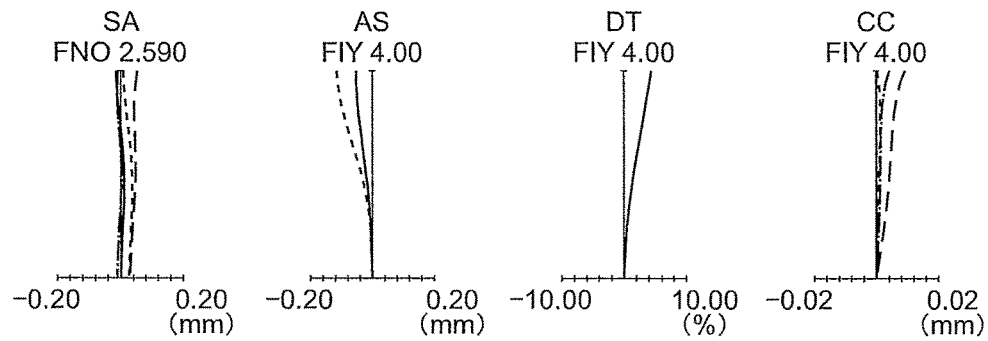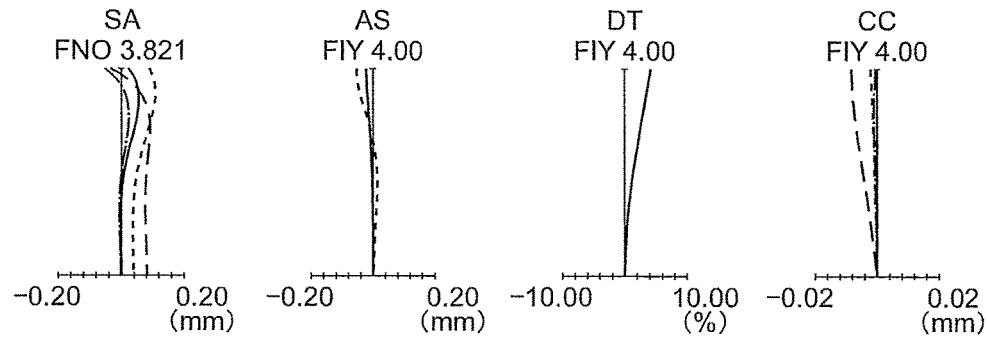

SA
FNO 1.429
-0.20  0.20
(mm)

AS
FIY 4.00
-0.20  0.20
(mm)

DT
FIY 4.00
-10.00  10.00
(%)

CC
FIY 4.00
-0.02  0.02
(mm)

SA
FNO 2.788
-0.20  0.20
(mm)

AS
FIY 4.00
-0.20  0.20
(mm)

DT
FIY 4.00
-10.00  10.00
(%)

CC
FIY 4.00
-0.02  0.02
(mm)

SA
FNO 3.987
-0.20  0.20
(mm)

AS
FIY 4.00
-0.20  0.20
(mm)

DT
FIY 4.00
-10.00  10.00
(%)

CC
FIY 4.00
-0.02  0.02
(mm)

SA
FNO 1.637
-0.20    0.20
       (mm)

AS
FIY 3.65
-0.20    0.20
       (mm)

DT
FIY 3.65
-10.00   10.00
        (%)

CC
FIY 3.65
-0.02    0.02
       (mm)

SA
FNO 2.690
-0.20    0.20
       (mm)

AS
FIY 3.65
-0.20    0.20
       (mm)

DT
FIY 3.65
-10.00   10.00
        (%)

CC
FIY 3.65
-0.02    0.02
       (mm)

SA
FNO 3.646
-0.20    0.20
       (mm)

AS
FIY 3.65
-0.20    0.20
       (mm)

DT
FIY 3.65
-10.00   10.00
        (%)

CC
FIY 3.65
-0.02    0.02
       (mm)

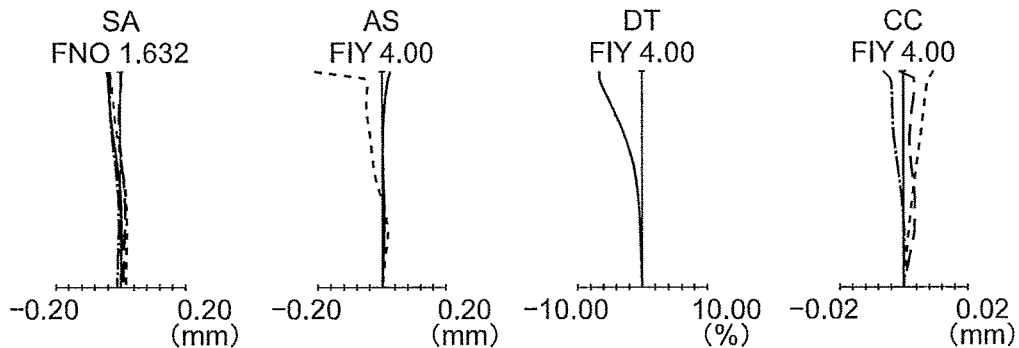
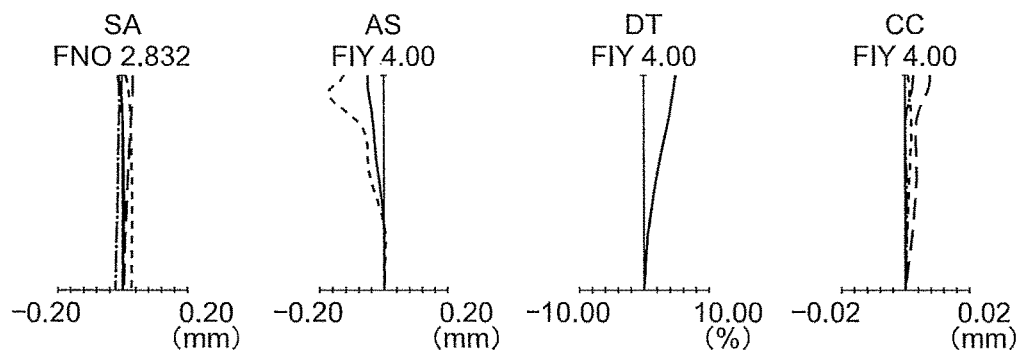
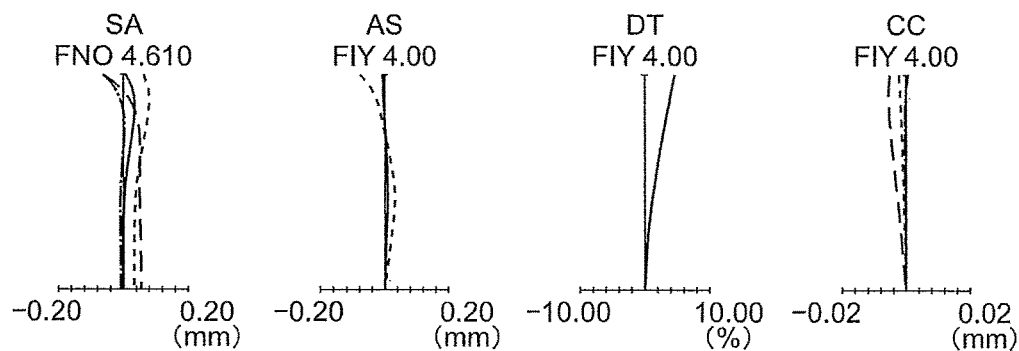

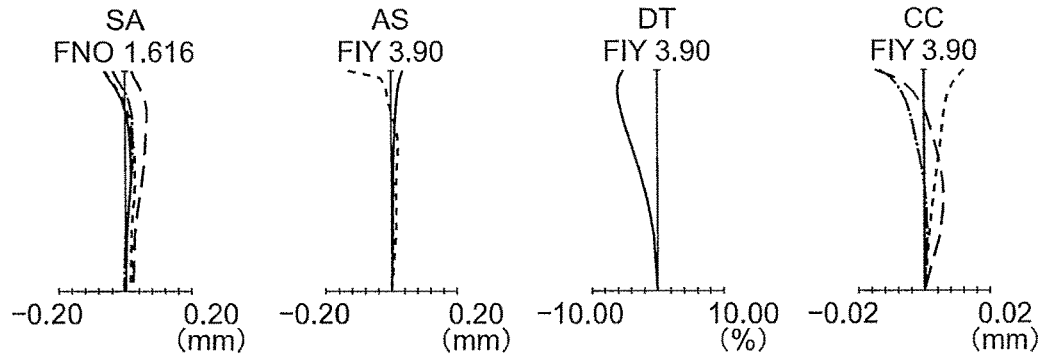
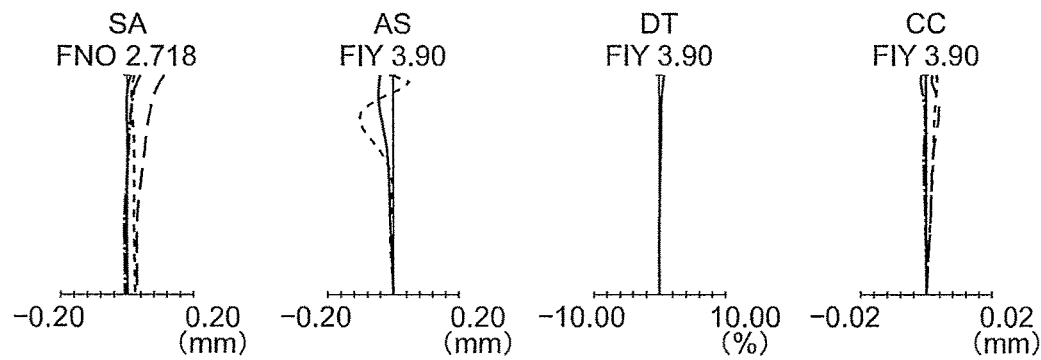
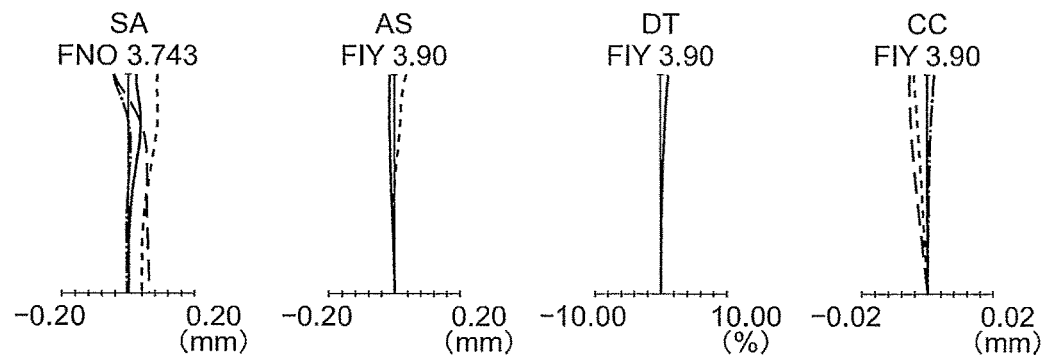

SA
FNO 1.633

AS
FIY 3.90

DT
FIY 3.90

CC
FIY 3.90

SA
FNO 2.678

AS
FIY 3.90

DT
FIY 3.90

CC
FIY 3.90

SA
FNO 3.635

AS
FIY 3.90

DT
FIY 3.90

CC
FIY 3.90

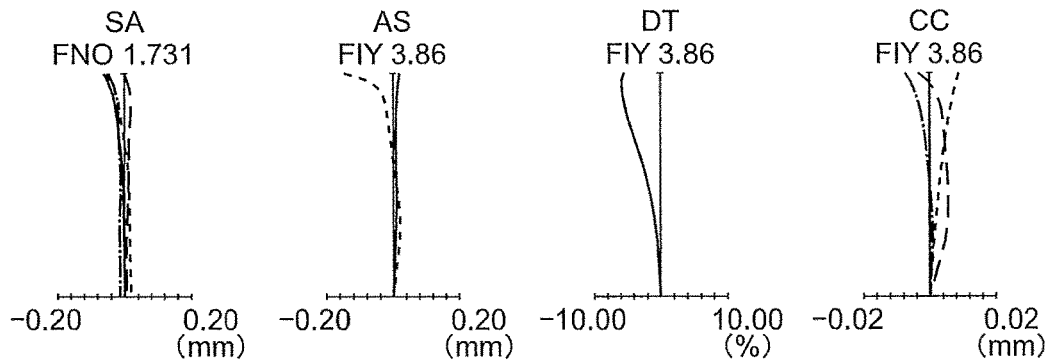
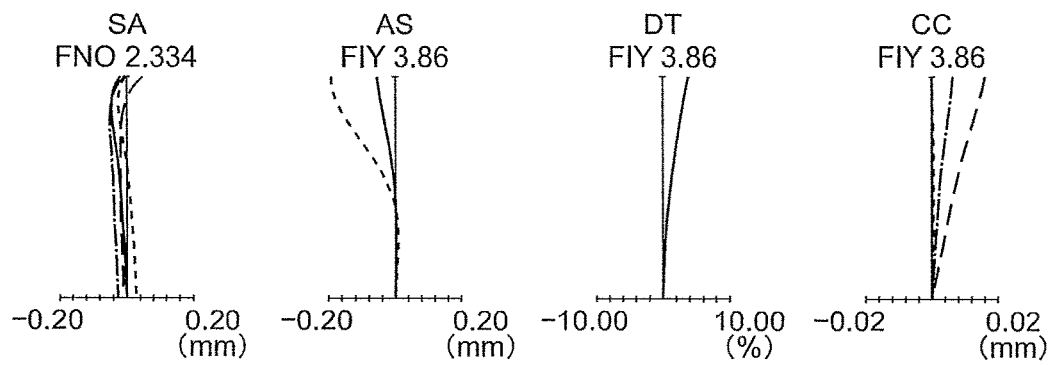
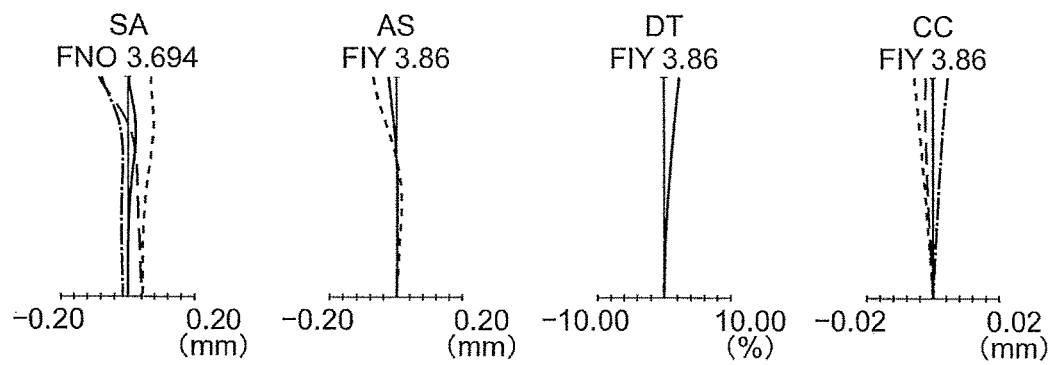

SA
FNO 1.629
-0.20   0.20
(mm)

AS
FIY 3.77
-0.20   0.20
(mm)

DT
FIY 3.77
-10.00   10.00
(%)

CC
FIY 3.77
-0.02   0.02
(mm)

SA
FNO 2.691
-0.20   0.20
(mm)

AS
FIY 3.77
-0.20   0.20
(mm)

DT
FIY 3.77
-10.00   10.00
(%)

CC
FIY 3.77
-0.02   0.02
(mm)

SA
FNO 3.569
-0.20   0.20
(mm)

AS
FIY 3.77
-0.20   0.20
(mm)

DT
FIY 3.77
-10.00   10.00
(%)

CC
FIY 3.77
-0.02   0.02
(mm)

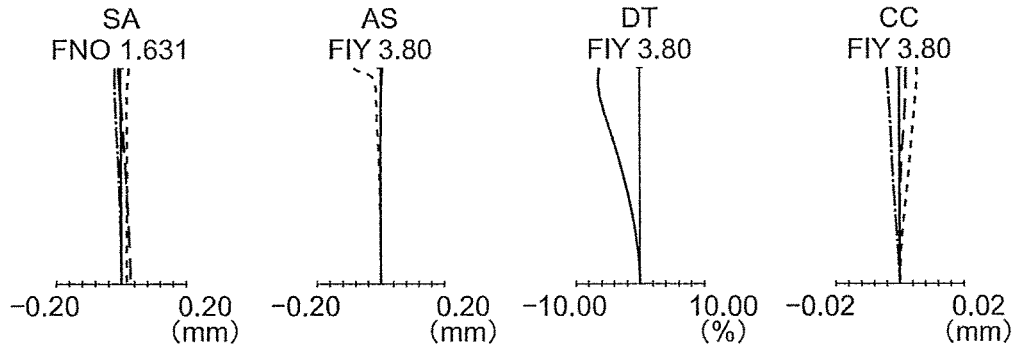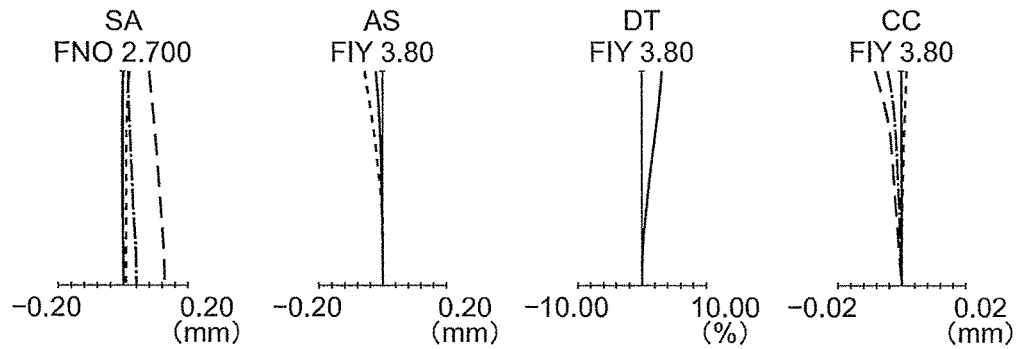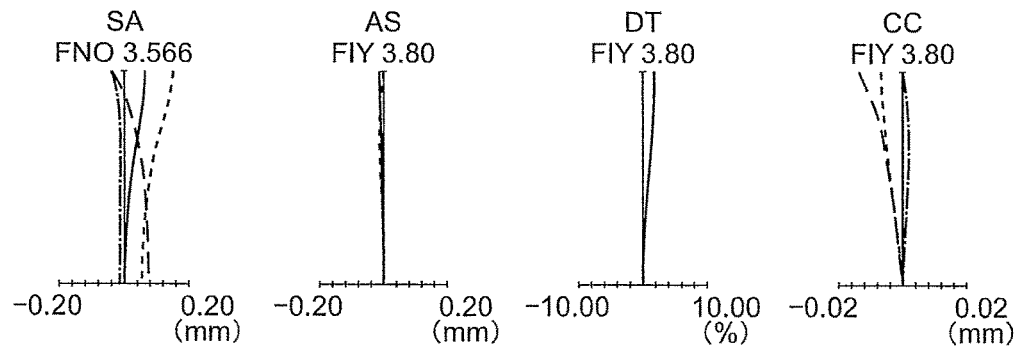

SA
FNO 1.697
-0.20  0.20
(mm)

AS
FIY 3.77
-0.20  0.20
(mm)

DT
FIY 3.77
-10.00  10.00
(%)

CC
FIY 3.77
-0.02  0.02
(mm)

SA
FNO 2.260
-0.20  0.20
(mm)

AS
FIY 3.77
-0.20  0.20
(mm)

DT
FIY 3.77
-10.00  10.00
(%)

CC
FIY 3.77
-0.02  0.02
(mm)

SA
FNO 2.942
-0.20  0.20
(mm)

AS
FIY 3.77
-0.20  0.20
(mm)

DT
FIY 3.77
-10.00  10.00
(%)

CC
FIY 3.77
-0.02  0.02
(mm)

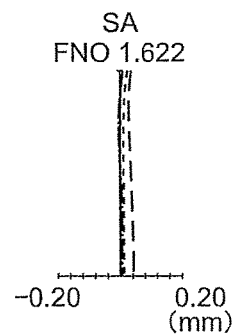
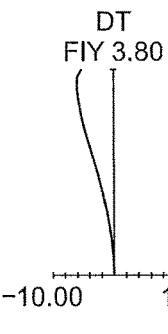
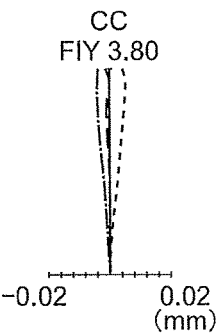
FIG. 38A  FIG. 38B  FIG. 38C  FIG. 38D
SA         AS         DT         CC
FNO 1.622  FIY 3.80   FIY 3.80   FIY 3.80
-0.20  0.20  -0.20  0.20  -10.00  10.00  -0.02  0.02
(mm)        (mm)        (%)         (mm)
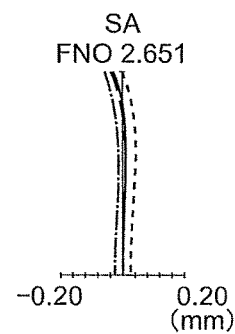
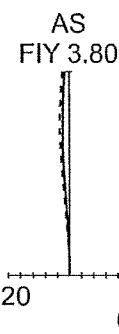
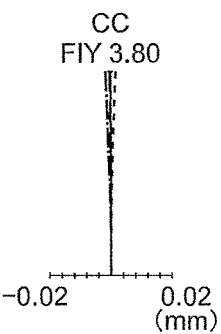
FIG. 38E  FIG. 38F  FIG. 38G  FIG. 38H
SA         AS         DT         CC
FNO 2.651  FIY 3.80   FIY 3.80   FIY 3.80
-0.20  0.20  -0.20  0.20  -10.00  10.00  -0.02  0.02
(mm)        (mm)        (%)         (mm)
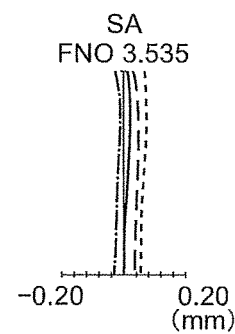
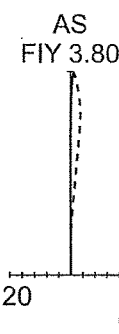
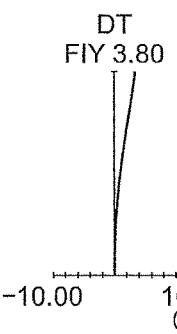
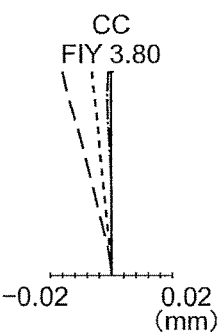
FIG. 38I  FIG. 38J  FIG. 38K  FIG. 38L
SA         AS         DT         CC
FNO 3.535  FIY 3.80   FIY 3.80   FIY 3.80
-0.20  0.20  -0.20  0.20  -10.00  10.00  -0.02  0.02
(mm)        (mm)        (%)         (mm)

FIG. 39A  FIG. 39B  FIG. 39C  FIG. 39D
SA        AS        DT        CC
FNO 1.632 FIY 3.80  FIY 3.80  FIY 3.80
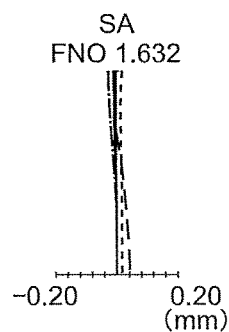 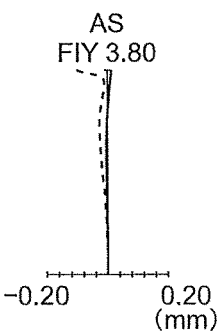  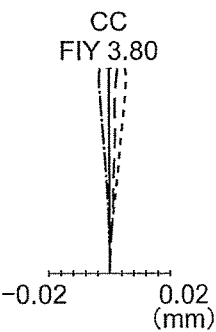
-0.20   0.20   -0.20   0.20   -10.00   10.00   -0.02   0.02
 (mm)           (mm)            (%)             (mm)
FIG. 39E  FIG. 39F  FIG. 39G  FIG. 39H
SA        AS        DT        CC
FNO 2.546 FIY 3.80  FIY 3.80  FIY 3.80
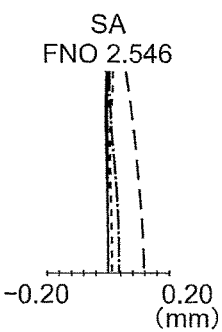 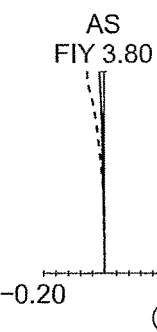  
-0.20   0.20   -0.20   0.20   -10.00   10.00   -0.02   0.02
 (mm)           (mm)            (%)             (mm)
FIG. 39I  FIG. 39J  FIG. 39K  FIG. 39L
SA        AS        DT        CC
FNO 3.516 FIY 3.80  FIY 3.80  FIY 3.80
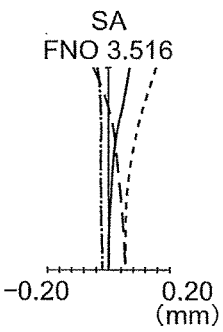 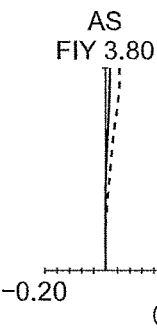 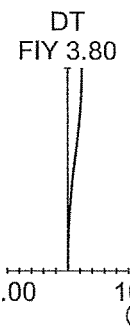 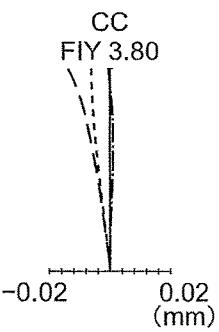
-0.20   0.20   -0.20   0.20   -10.00   10.00   -0.02   0.02
 (mm)           (mm)            (%)             (mm)

SA
FNO 1.620
-0.20    0.20
(mm)

AS
FIY 3.77
-0.20    0.20
(mm)

DT
FIY 3.77
-10.00    10.00
(%)

CC
FIY 3.77
-0.02    0.02
(mm)

SA
FNO 2.496
-0.20    0.20
(mm)

AS
FIY 3.77
-0.20    0.20
(mm)

DT
FIY 3.77
-10.00    10.00
(%)

CC
FIY 3.77
-0.02    0.02
(mm)

SA
FNO 2.853
-0.20    0.20
(mm)

AS
FIY 3.77
-0.20    0.20
(mm)

DT
FIY 3.77
-10.00    10.00
(%)

CC
FIY 3.77
-0.02    0.02
(mm)

VARIABLE MAGNIFICATION OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2016-076535 filed on Apr. 6, 2016, 2016-076427 filed on Apr. 6, 2016, 2016-076428 filed on Apr. 6, 2016 and 2017-041344 filed on Mar. 6, 2017; the entire contents of which are incorporated herein by reference.

BACKGROUND OF THE INVENTION

Field of the Invention

The present invention relates to a variable magnification optical system and an image pickup apparatus using the same.

In recent years, image pickup optical systems are used infields of wide range, such as digital cameras, video cameras, monitoring cameras, and cameras for television conference systems.

A variable magnification optical system is used for such image pickup optical systems. Examples of a variable magnification optical system are variable magnification optical systems disclosed in Japanese Patent Application Laid-open No. 2012-113285, Japanese Patent Application Laid-open No. 2011-221554, and Japanese Patent Application Laid-open No. 2001-350093. These variable magnification optical systems include, in order from the object side, a first lens unit having a positive refractive power, a second lens unit having a negative refractive power, a third lens unit having a positive refractive power, a fourth lens unit having a negative refractive power, and a fifth lens unit having a positive refractive power.

SUMMARY OF THE INVENTION

A variable magnification optical system of the present invention comprises:
in order from an object side,
a first lens unit having a positive refractive power;
a second lens unit having a negative refractive power;
a third lens unit having a positive refractive power; and
an image-side lens unit, wherein
the image-side lens unit includes a lens belonging to a first region and a lens belonging to a second region,
the refractive power on the basis of all lenses belonging to the first region is a negative refractive power, and the refractive power on the basis of all lenses belonging to the second region is a positive refractive power, and
at a time of changing magnification,
a distance between the lens units changes, and
the second lens unit moves so that a distance between the first lens unit and the second lens unit is widened at a telephoto end than at a wide angle end.

Another variable magnification optical system of the present invention comprises:
in order from an object side,
a first lens unit having a positive refractive power; and
a second lens unit having a negative refractive power, wherein
an image-side first positive lens unit having a positive refractive power is included at a position closer to an image side than the second lens unit is,
an image-side second positive lens unit is included at a position closer to the image side than the image-side first positive lens unit is, and
at a time of changing magnification,
the distance between the lens units changes, and
the second lens unit moves so that the distance between the first lens unit and the second lens unit is widened at a telephoto end than at a wide angle end.

Moreover, an image pickup apparatus according to the present invention comprises:
an optical system; and
an image pickup element having an image pickup surface and converting an image formed on the image pickup surface with the optical system into an electrical signal, wherein
the optical system is the variable magnification optical system described above.

BRIEF DESCRIPTION OF THE DRAWINGS

FIG. 2A, FIG. 2B, and FIG. 2C are lens cross-sectional views of a variable magnification optical system of Example 2;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams of the variable magnification optical system of Example 1;

FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams of the variable magnification optical system of Example 3;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams of the variable magnification optical system of Example 4;

FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L are aberration diagrams of the variable magnification optical system of Example 7;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams of the variable magnification optical system of Example 8;

FIG. 31A, FIG. 31B, FIG. 31C, FIG. 31D, FIG. 31E, FIG. 31F, FIG. 31G, FIG. 31H, FIG. 31I, FIG. 31J, FIG. 31K, and FIG. 31L are aberration diagrams of the variable magnification optical system of Example 11;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams of the variable magnification optical system of Example 12;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams of the variable magnification optical system of Example 14;

FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L are aberration diagrams of the variable magnification optical system of Example 16;

FIG. 38A, FIG. 38B, FIG. 38C, FIG. 38D, FIG. 38E, FIG. 38F, FIG. 38G, FIG. 38H, FIG. 38I, FIG. 38J, FIG. 38K, and FIG. 38L are aberration diagrams of the variable magnification optical system of Example 18;

FIG. 39A, FIG. 39B, FIG. 39C, FIG. 39D, FIG. 39E, FIG. 39F, FIG. 39G, FIG. 39H, FIG. 39I, FIG. 39J, FIG. 39K, and FIG. 39L are aberration diagrams of the variable magnification optical system of Example 19;

DETAILED DESCRIPTION OF THE INVENTION

Figure 1A:
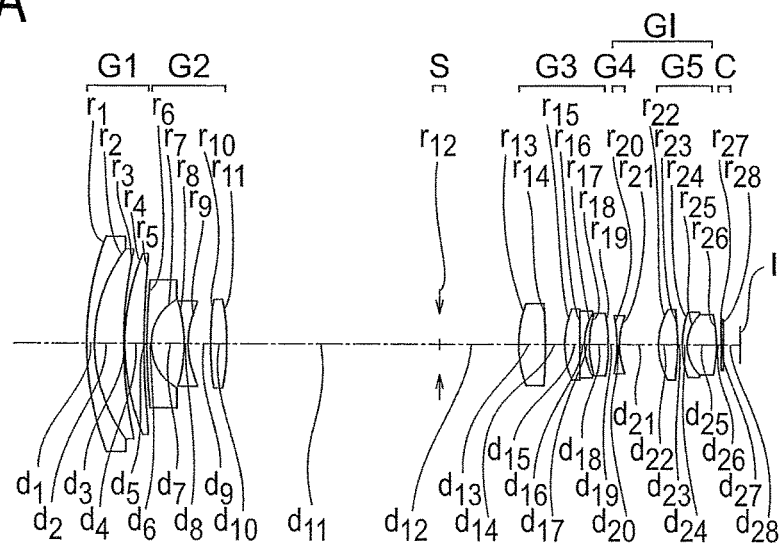
FIG. 1A, FIG. 1B, and FIG. 1C are lens cross-sectional views of a variable magnification optical system of Example 1.
Figure 1B:
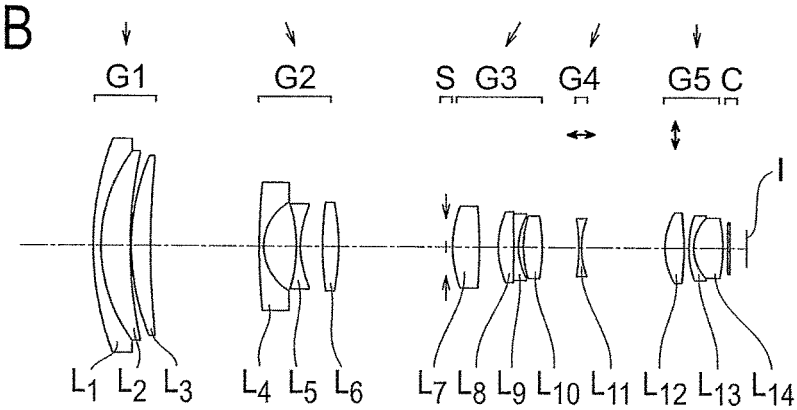
Figure 1C:
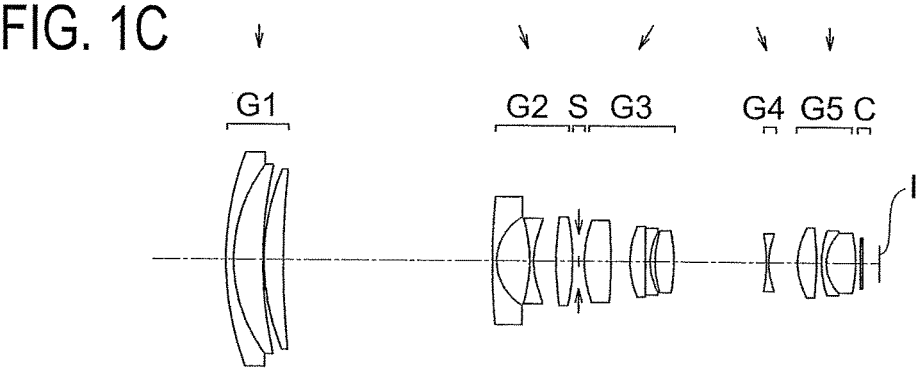
Figure 3A:
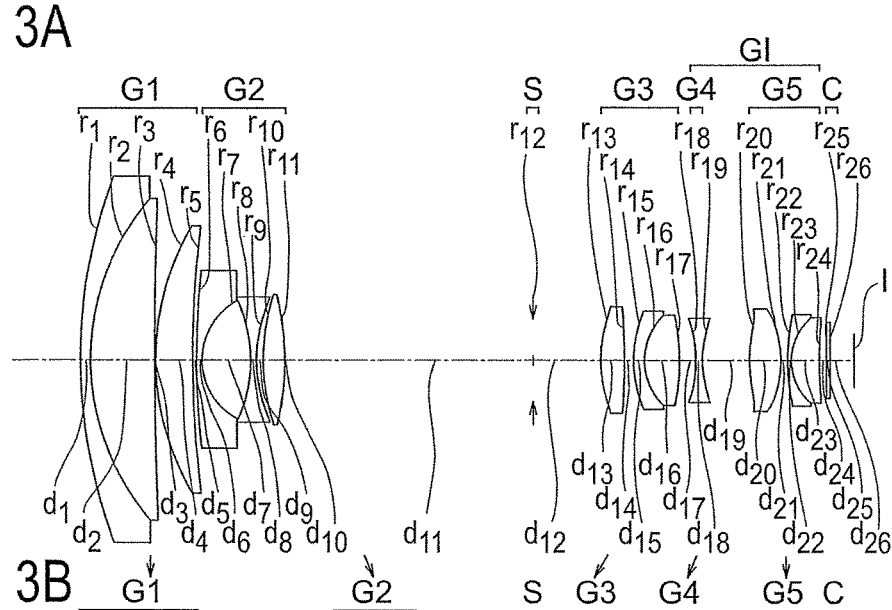
FIG. 3A, FIG. 3B, and FIG. 3C are lens cross-sectional views of a variable magnification optical system of Example 3.
Figure 3B:
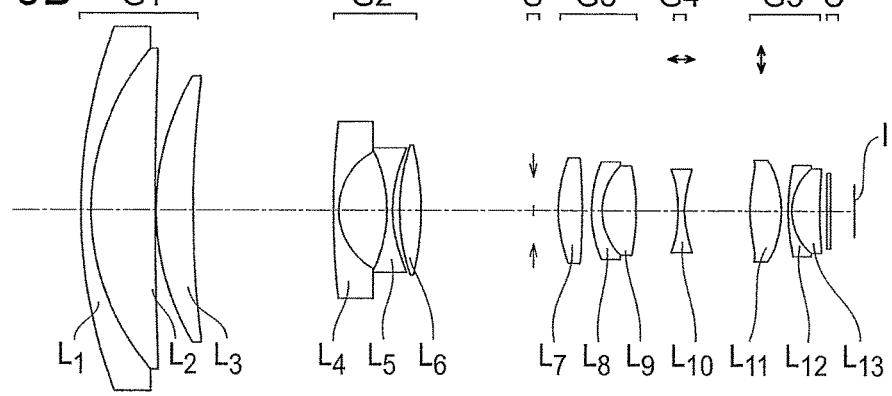
Figure 3C:
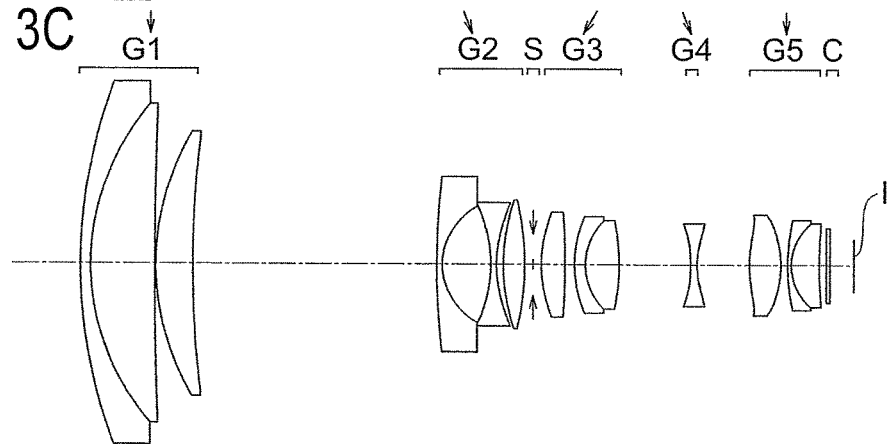
Figure 4A:
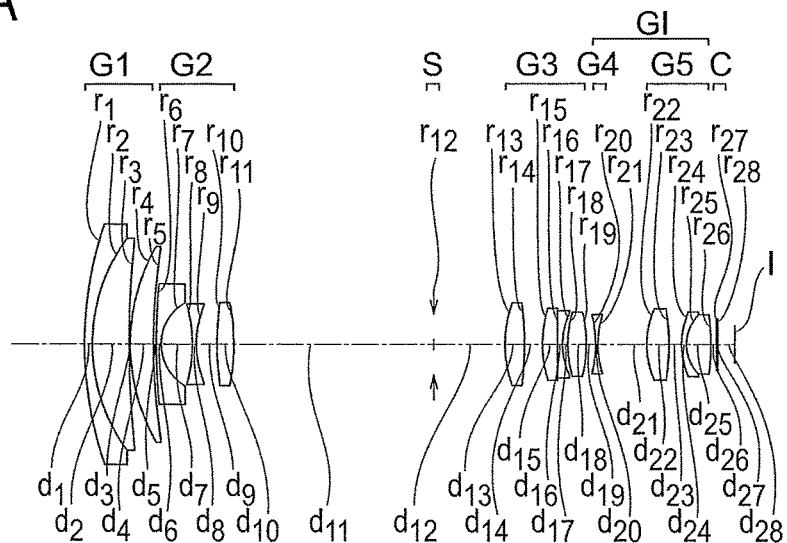
FIG. 4A, FIG. 4B, and FIG. 4C are lens cross-sectional views of a variable magnification optical system of Example 4.
Figure 4B:
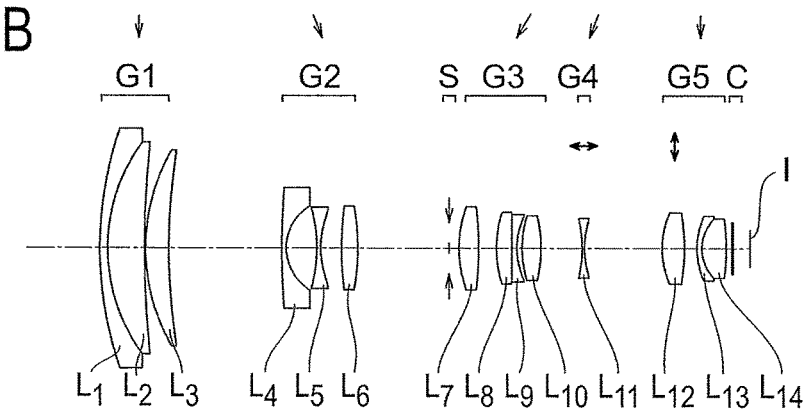
Figure 4C:
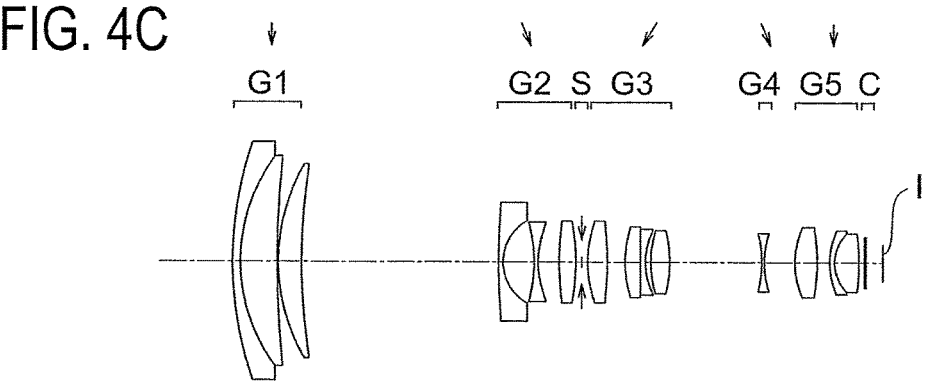
Figure 5A:
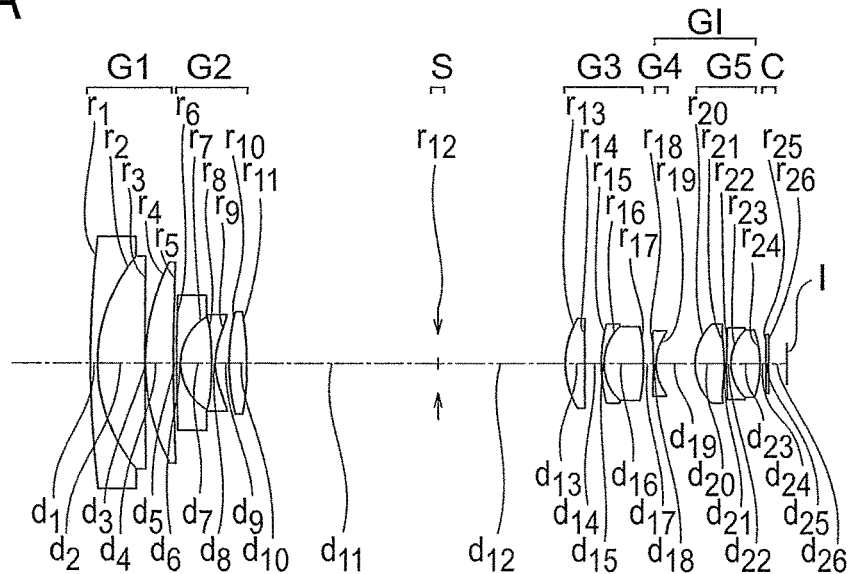
FIG. 5A, FIG. 5B, and FIG. 5C are lens cross-sectional views of a variable magnification optical system of Example 5.
Figure 5B:
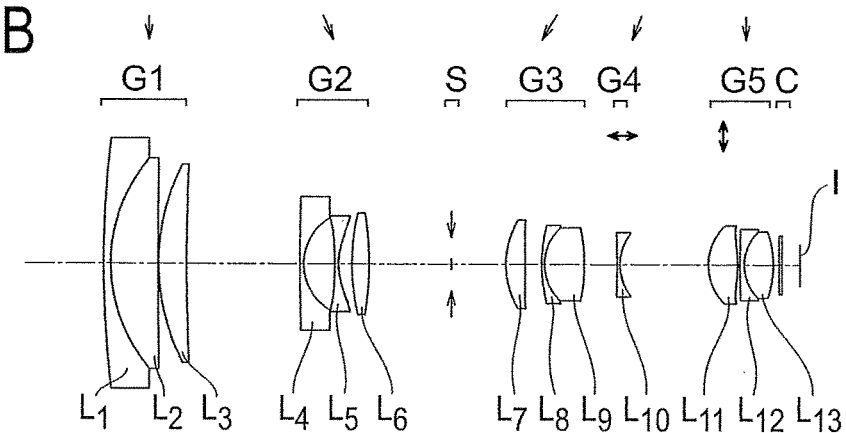
Figure 5C:
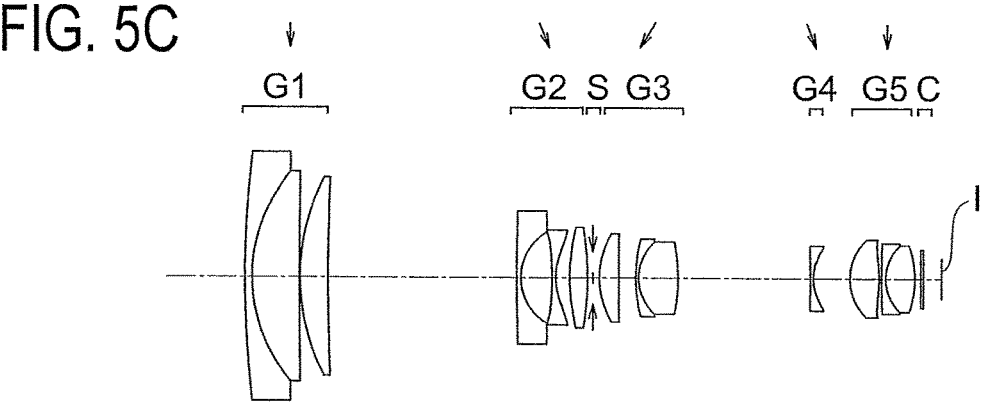
Figure 6A:
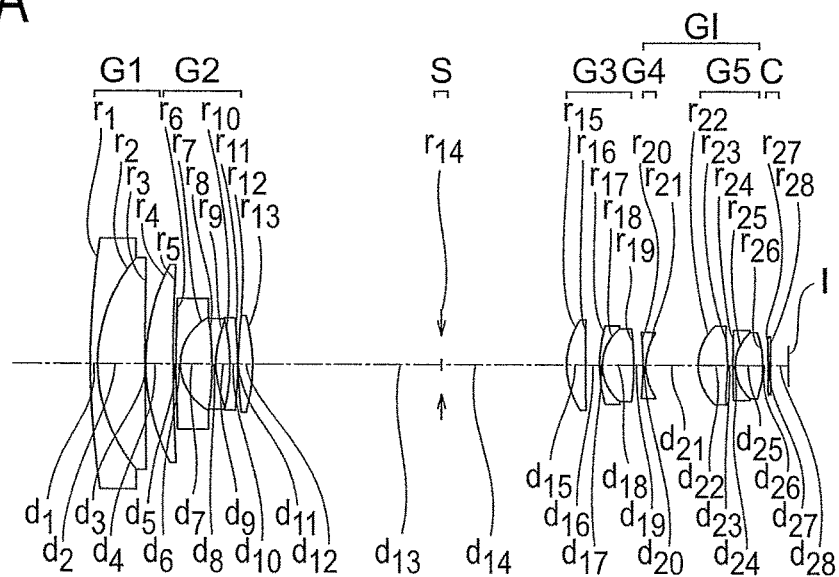
FIG. 6A, FIG. 6B, and FIG. 6C are lens cross-sectional views of a variable magnification optical system of Example 6.
Figure 6B:
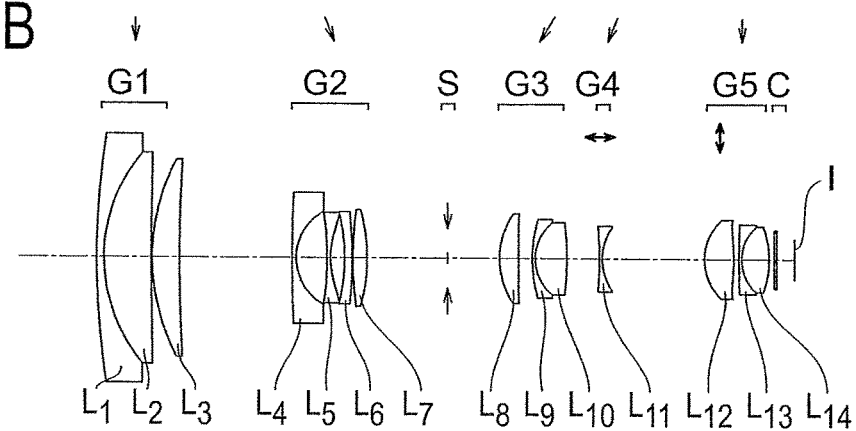
Figure 6C:
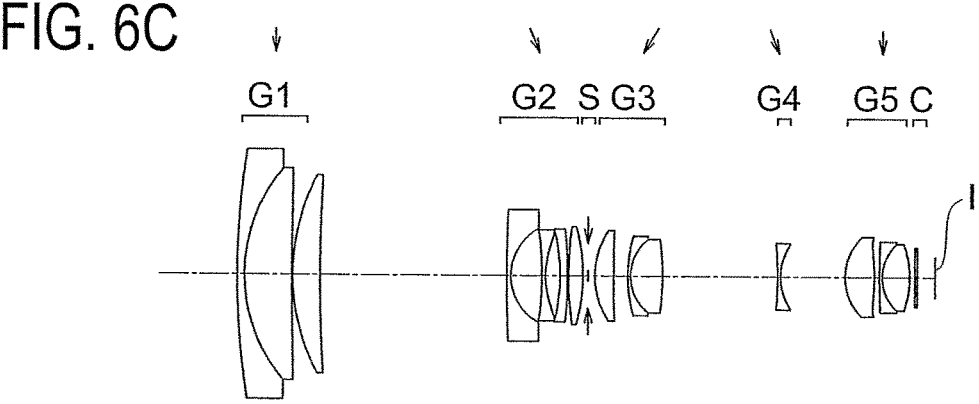
Figure 7A:
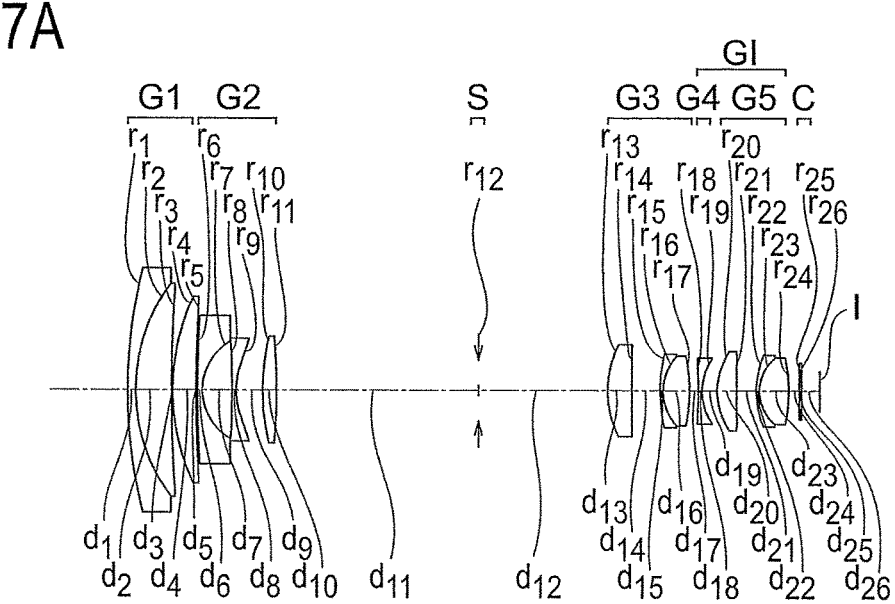
FIG. 7A, FIG. 7B, and FIG. 7C are lens cross-sectional views of a variable magnification optical system of Example 7.
Figure 7B:
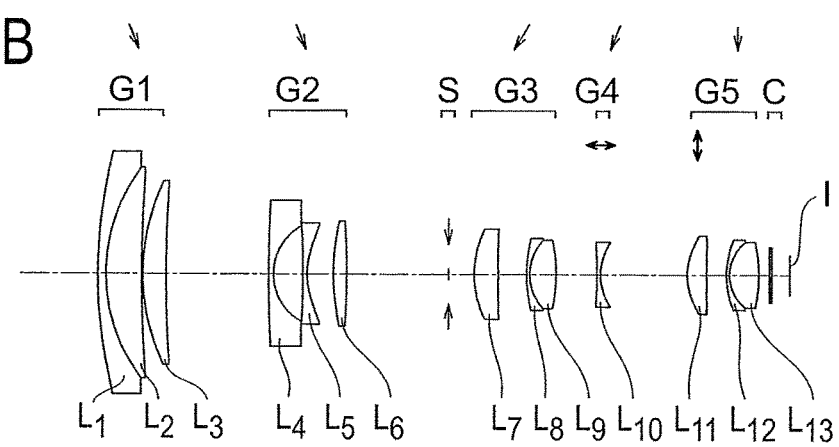
Figure 7C:
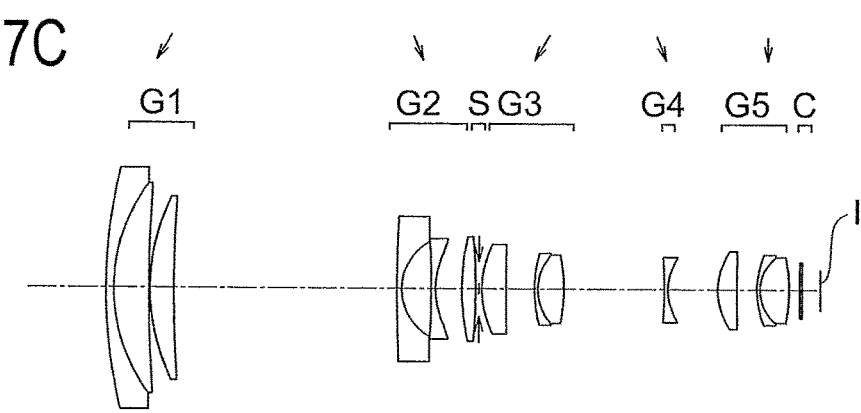
Figure 8A:
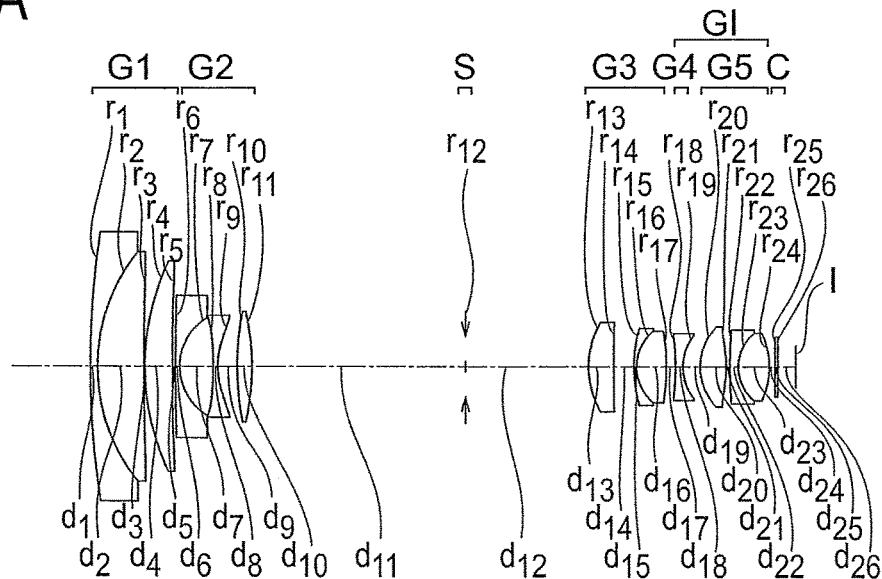
FIG. 8A, FIG. 8B, and FIG. 8C are lens cross-sectional views of a variable magnification optical system of Example 8.
Figure 8B:
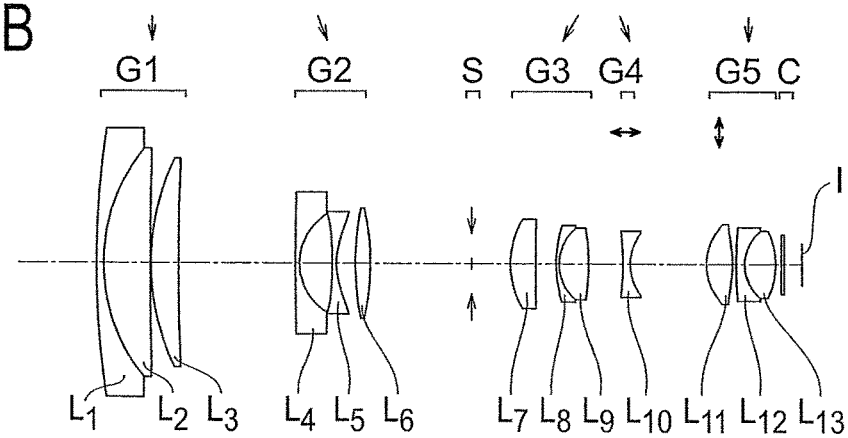
Figure 8C:
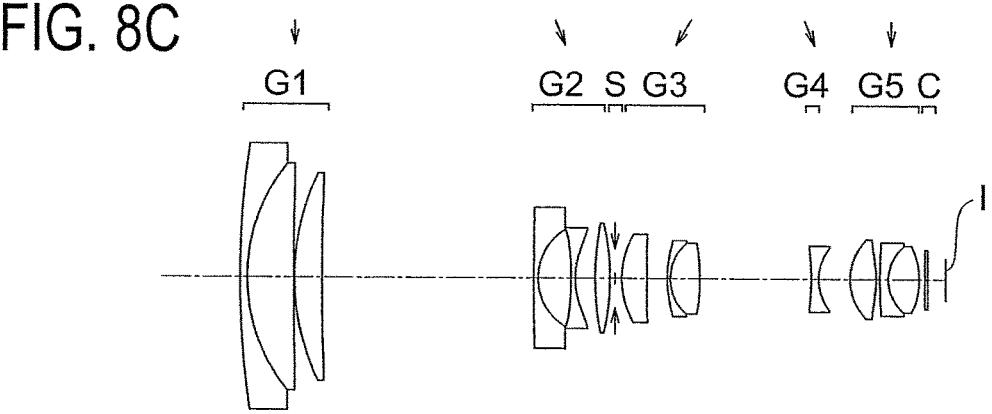
Figure 9A:
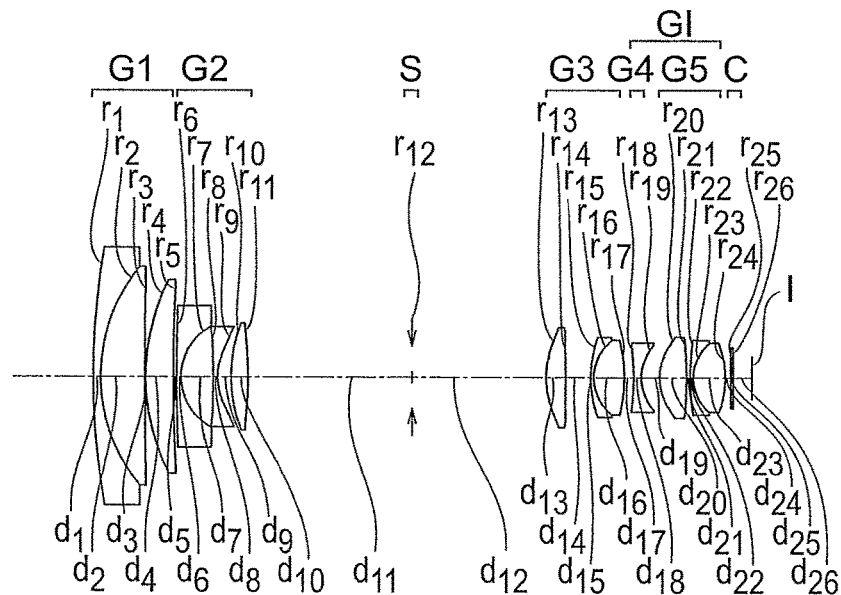
FIG. 9A, FIG. 9B, and FIG. 9C are lens cross-sectional views of a variable magnification optical system of Example 9.
Figure 9B:
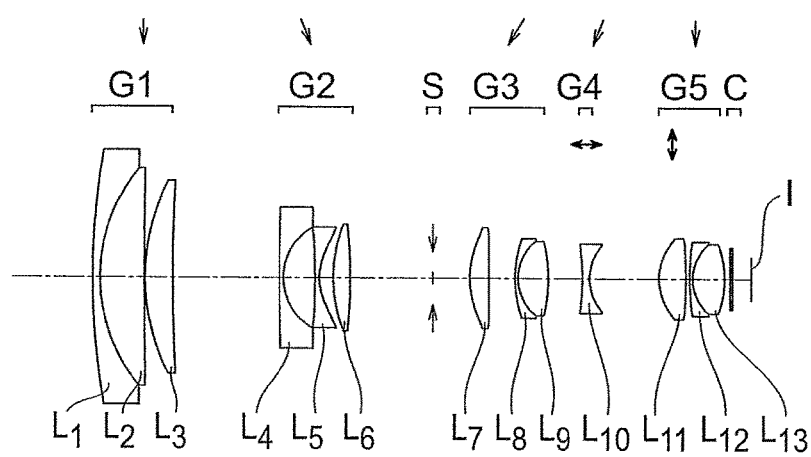
Figure 9C:
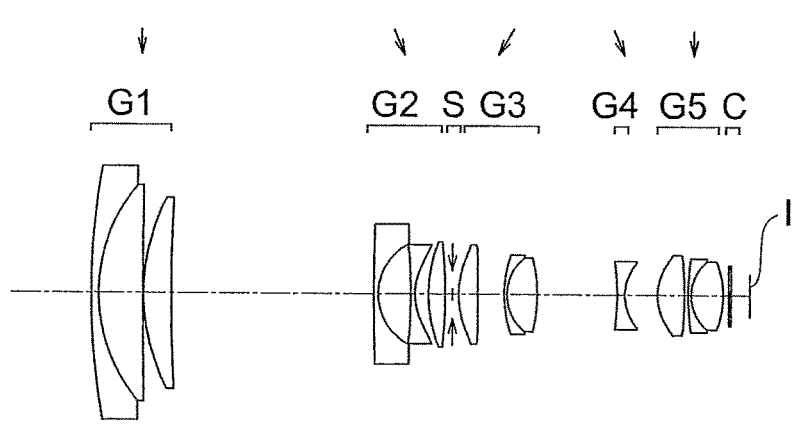
Figure 10A:
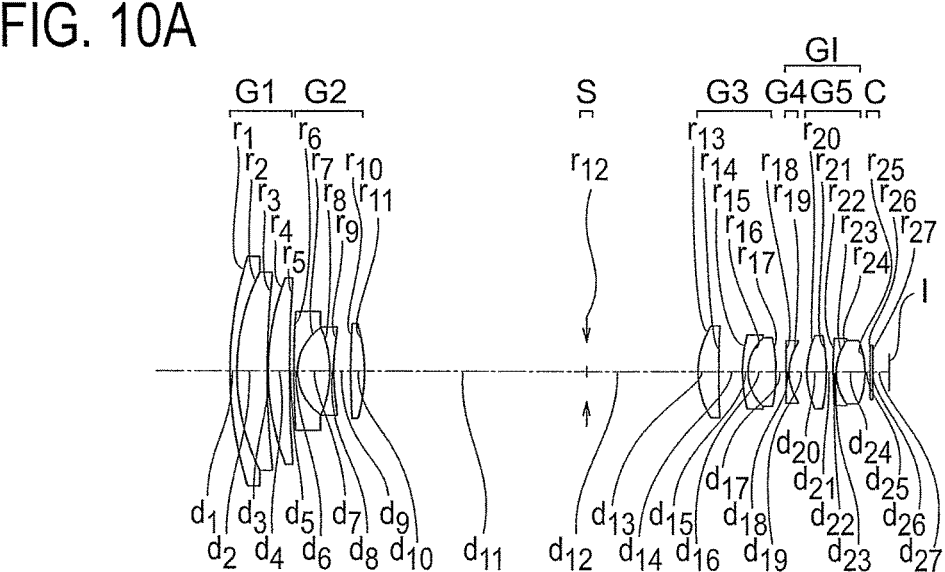
FIG. 10A, FIG. 10B, and FIG. 10C are lens cross-sectional views of a variable magnification optical system of Example 10.
Figure 10B:
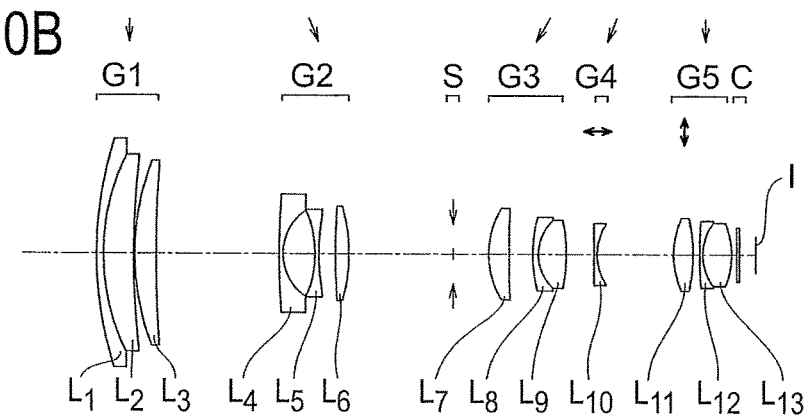
Figure 10C:
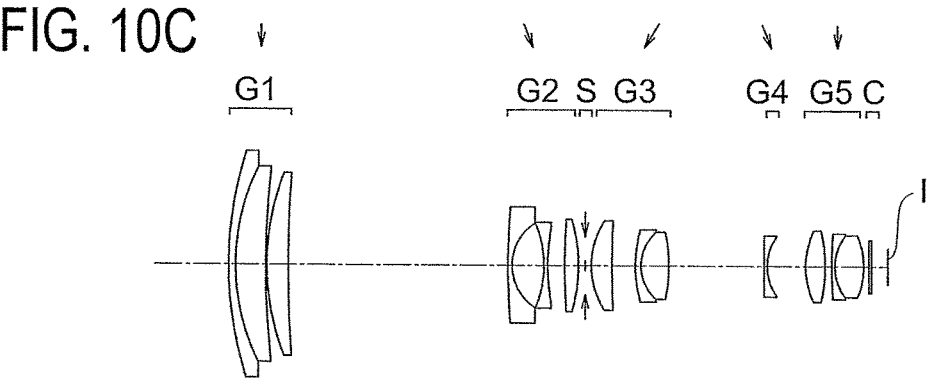
Figure 11A:
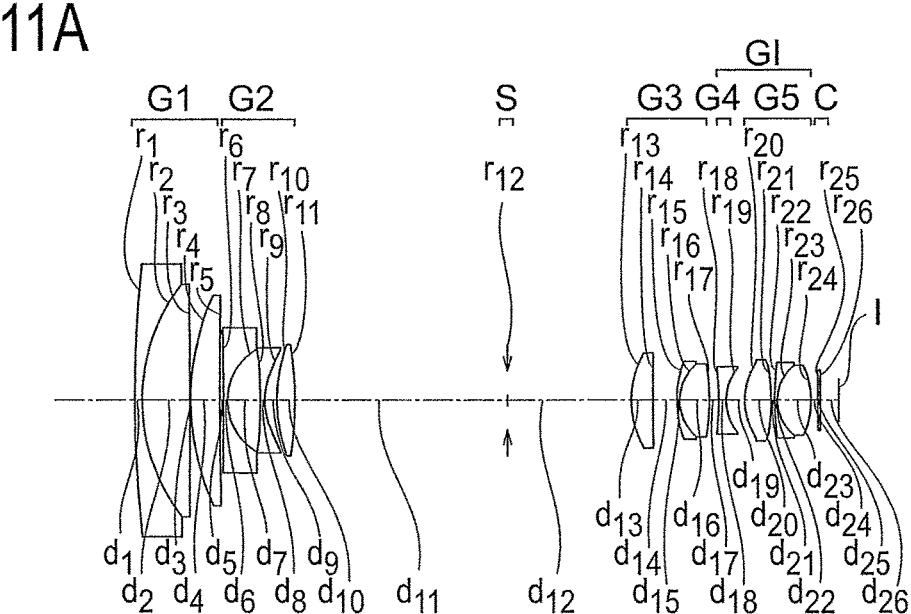
FIG. 11A, FIG. 11B, and FIG. 11C are lens cross-sectional views of a variable magnification optical system of Example 11.
Figure 11B:
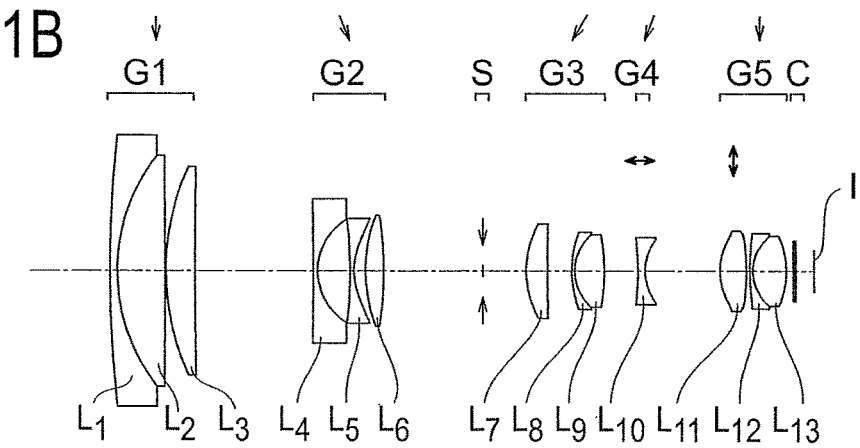
Figure 11C:
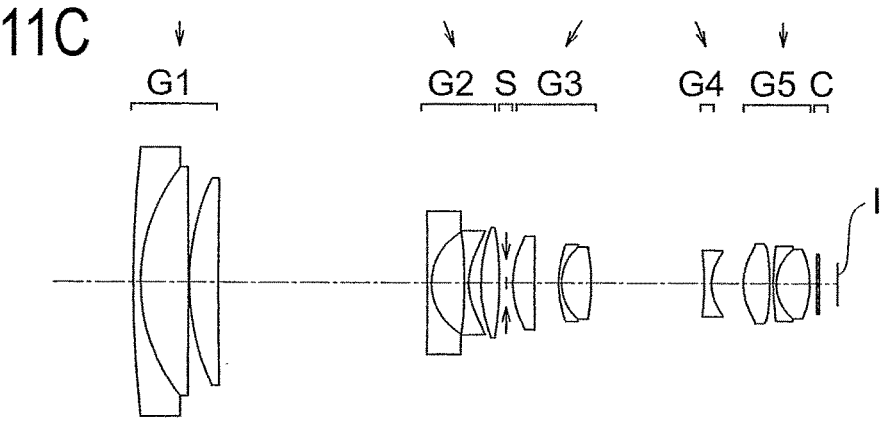
Figure 12A:
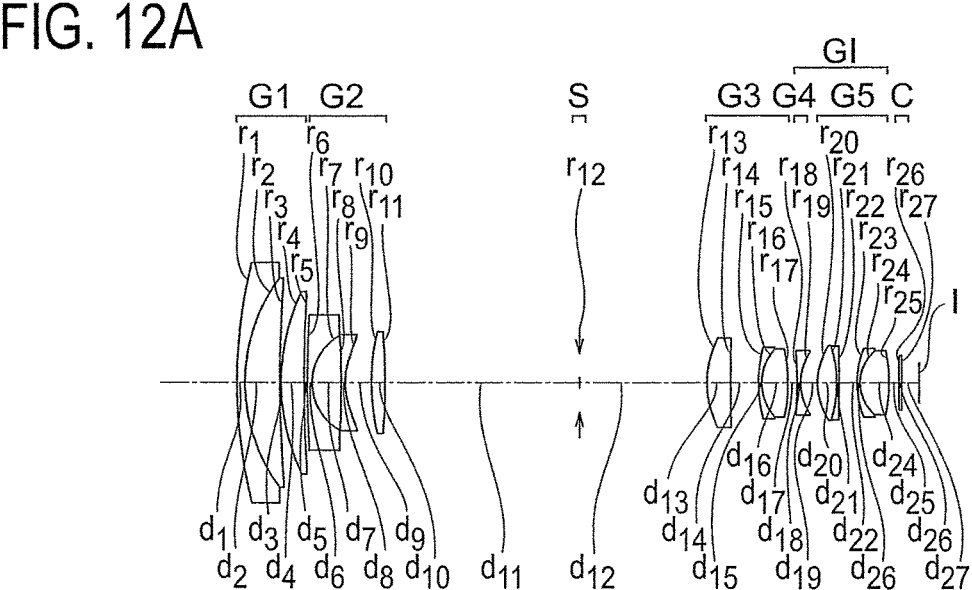
FIG. 12A, FIG. 12B, and FIG. 12C are lens cross-sectional views of a variable magnification optical system of Example 12.
Figure 12B:
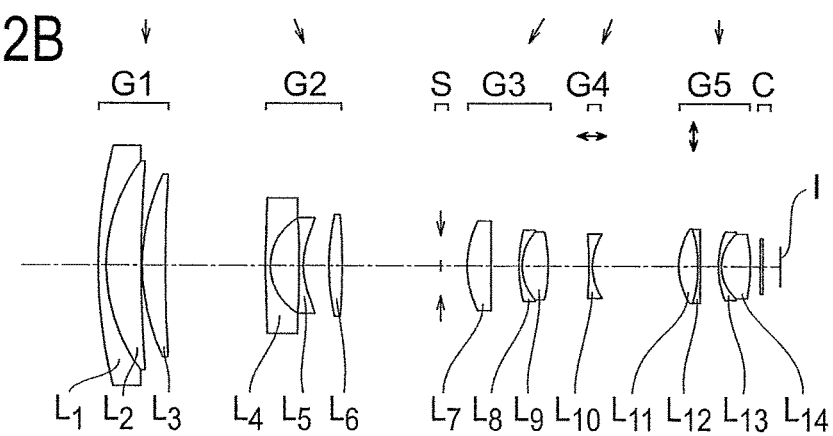
Figure 12C:
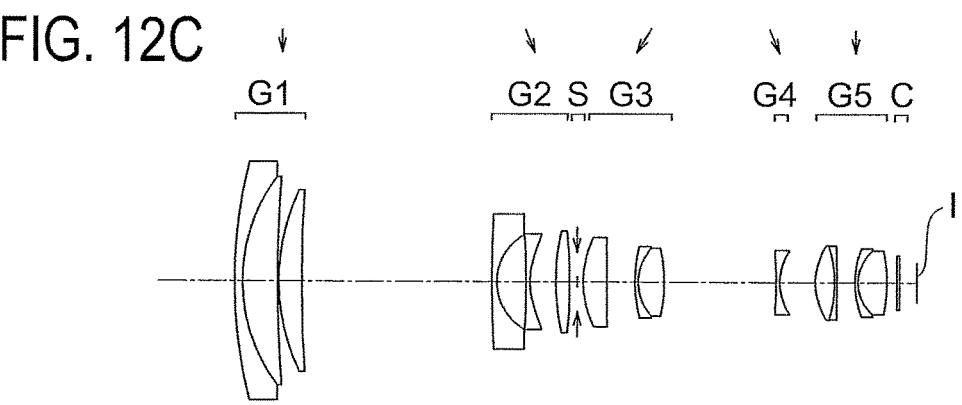
Figure 13A:
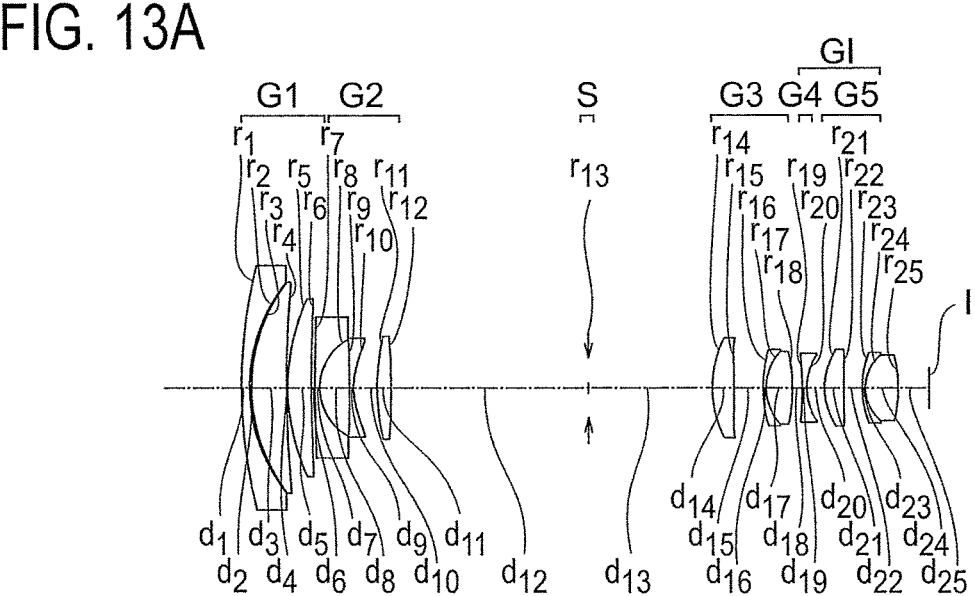
FIG. 13A, FIG. 13B, and FIG. 13C are lens cross-sectional views of a variable magnification optical system of Example 13.
Figure 13B:
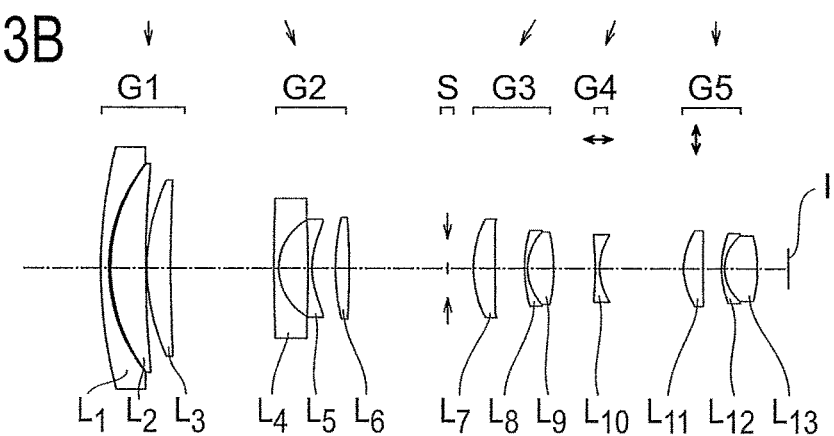
Figure 13C:
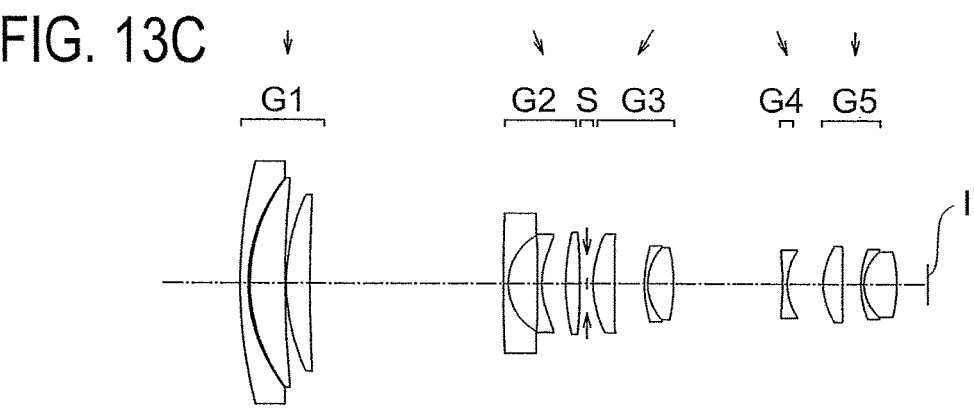
Figure 14A:
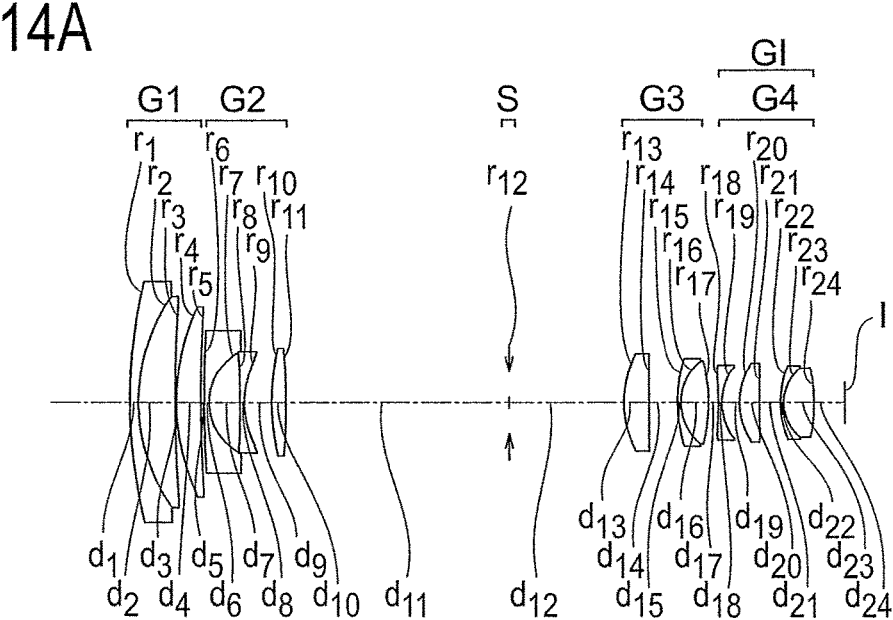
FIG. 14A, FIG. 14B, and FIG. 14C are lens cross-sectional views of a variable magnification optical system of Example 14.
Figure 14B:
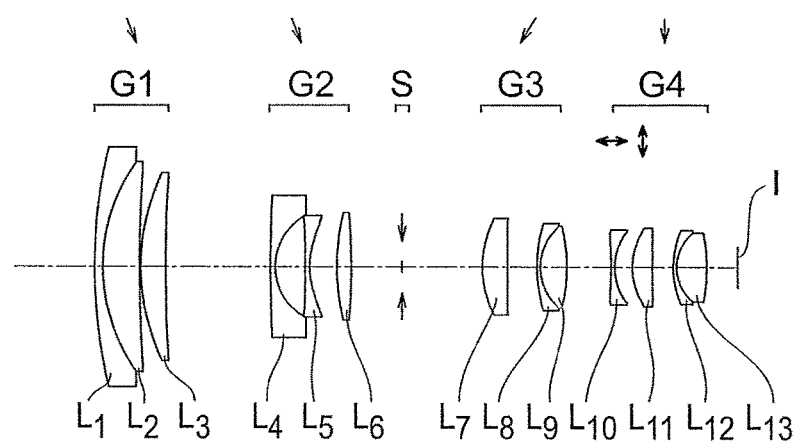
Figure 14C:
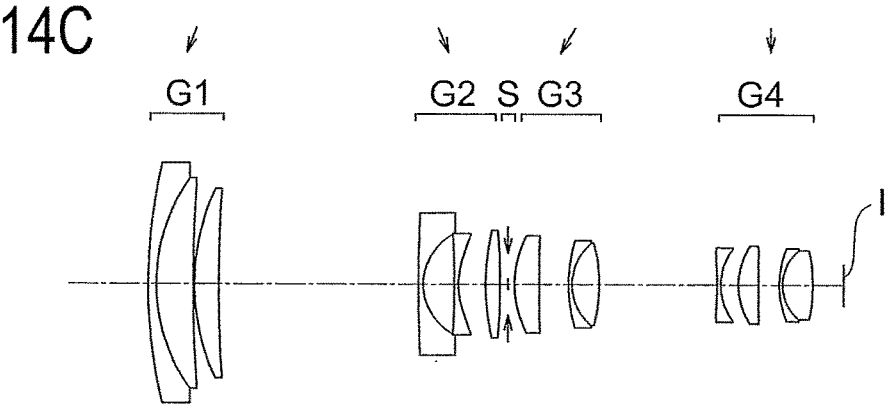
Figure 15A:
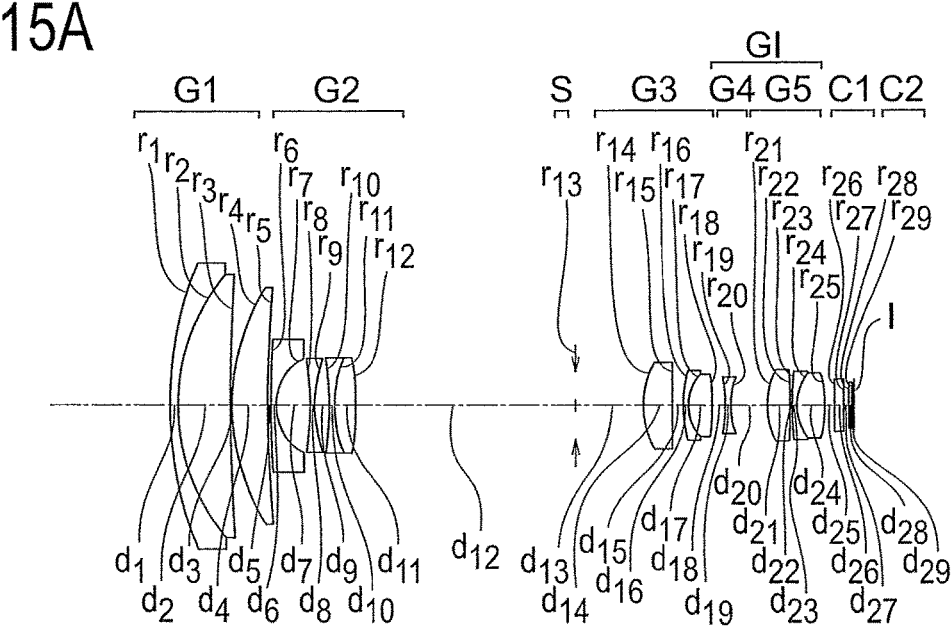
FIG. 15A, FIG. 15B, and FIG. 15C are lens cross-sectional views of a variable magnification optical system of Example 15.
Figure 15B:
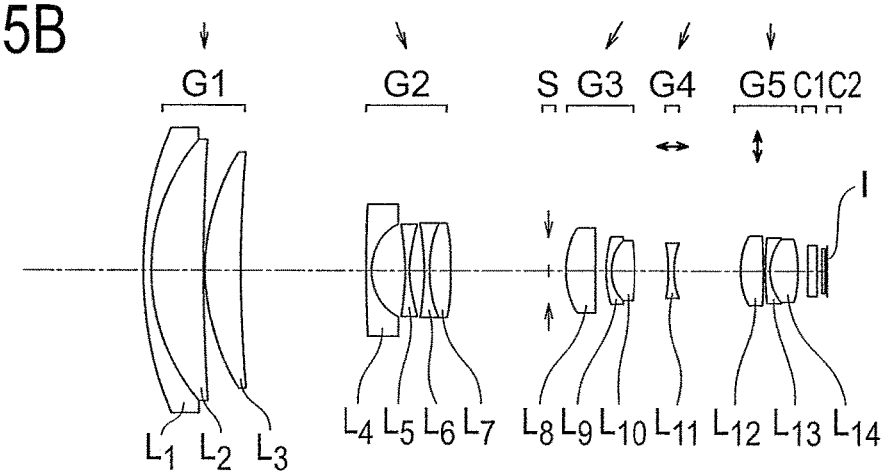
Figure 15C:
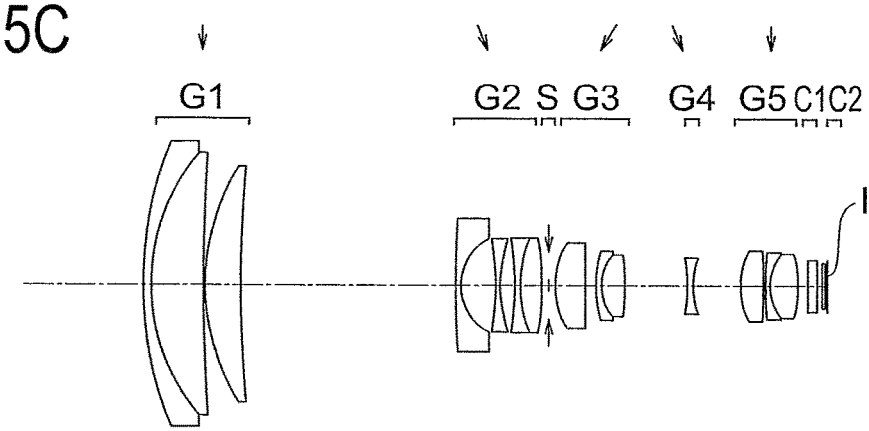
Figure 16A:
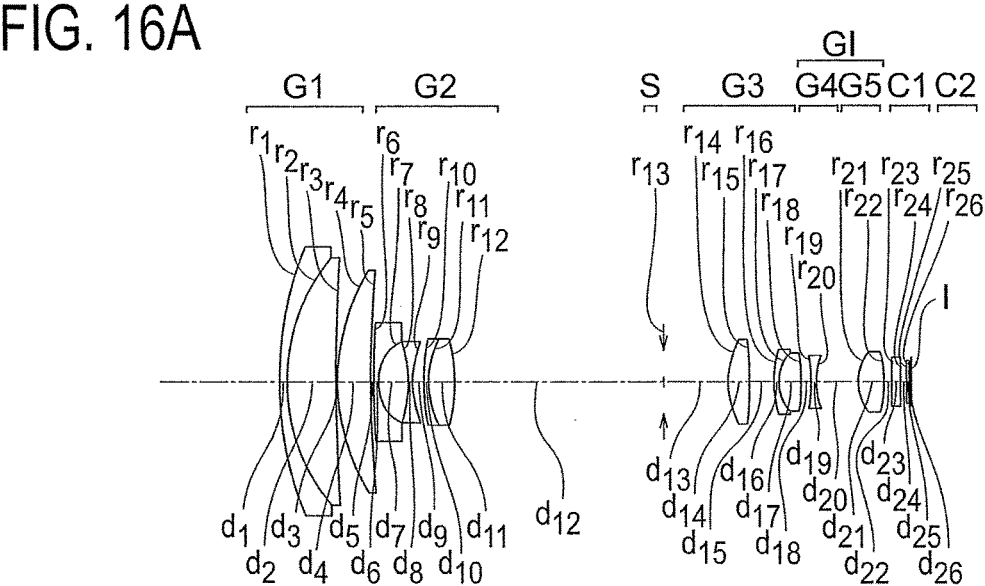
FIG. 16A, FIG. 16B, and FIG. 16C are lens cross-sectional views of a variable magnification optical system of Example 16.
Figure 16B:
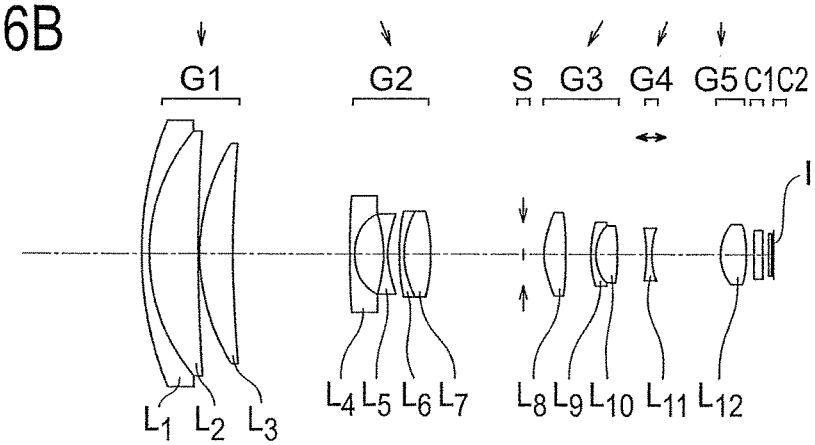
Figure 16C:
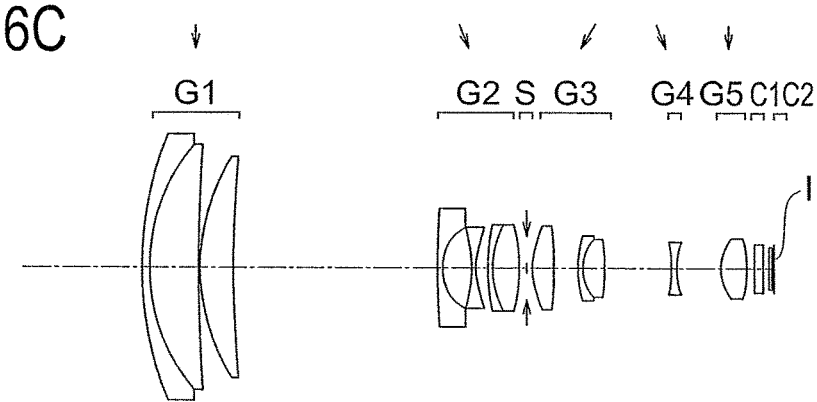
Figure 17A:
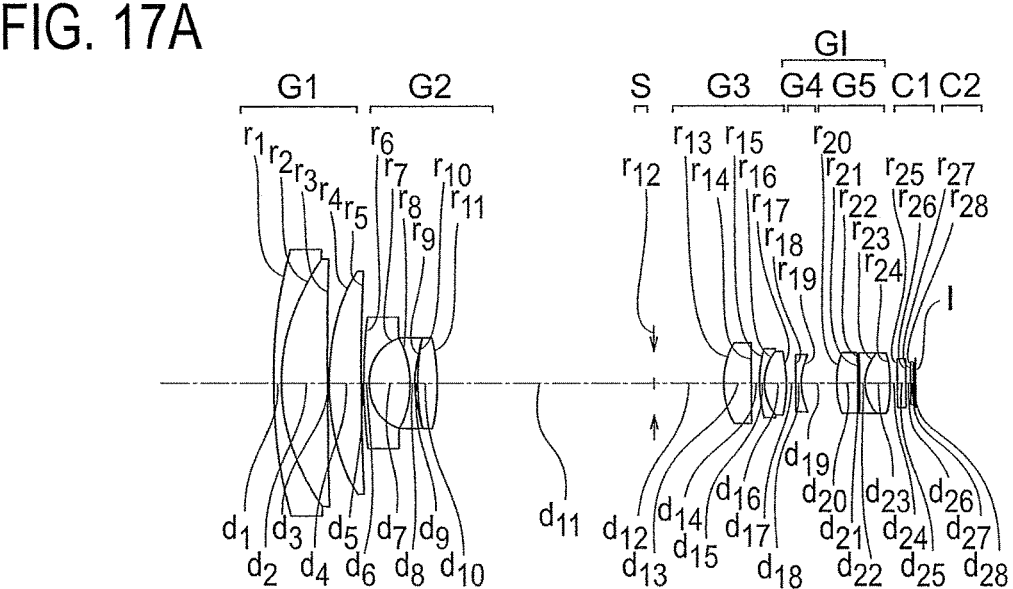
FIG. 17A, FIG. 17B, and FIG. 17C are lens cross-sectional views of a variable magnification optical system of Example 17.
Figure 17B:
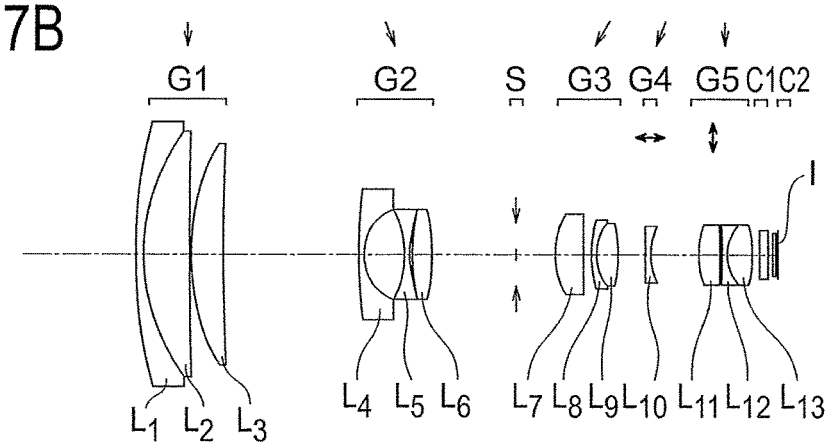
Figure 17C:
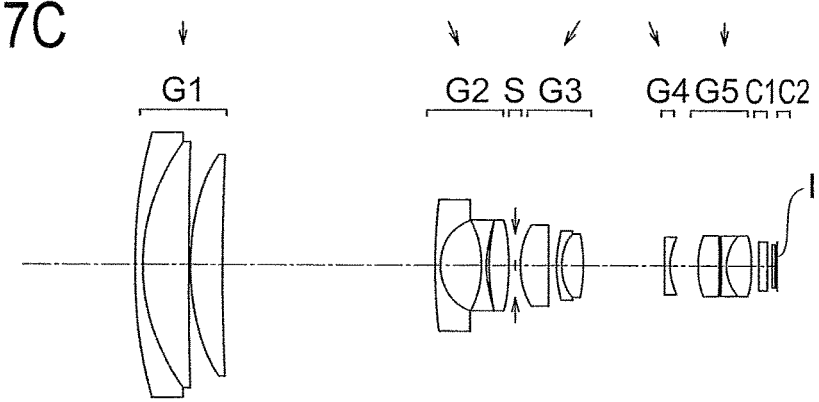
Figure 18A:
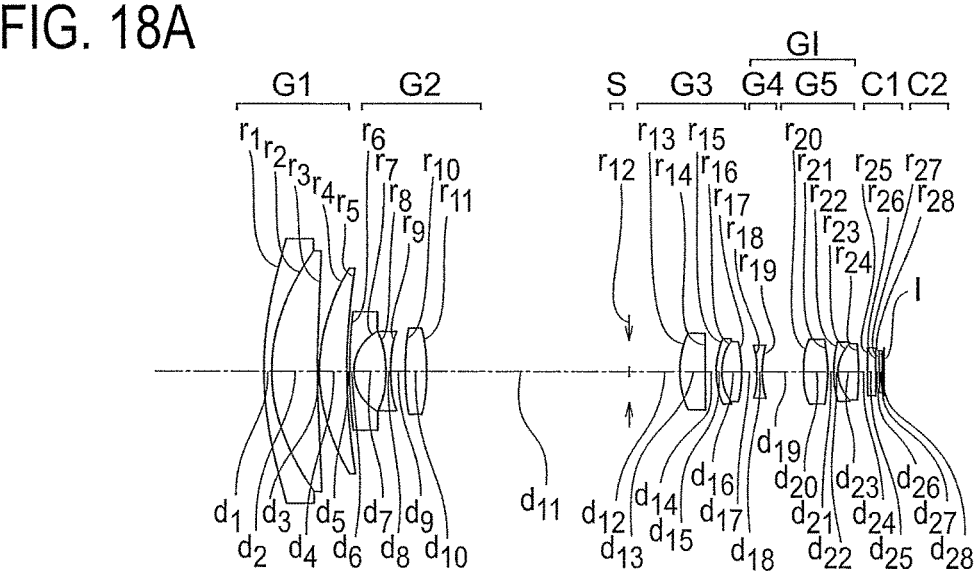
FIG. 18A, FIG. 18B, and FIG. 18C are lens cross-sectional views of a variable magnification optical system of Example 18.
Figure 18B:
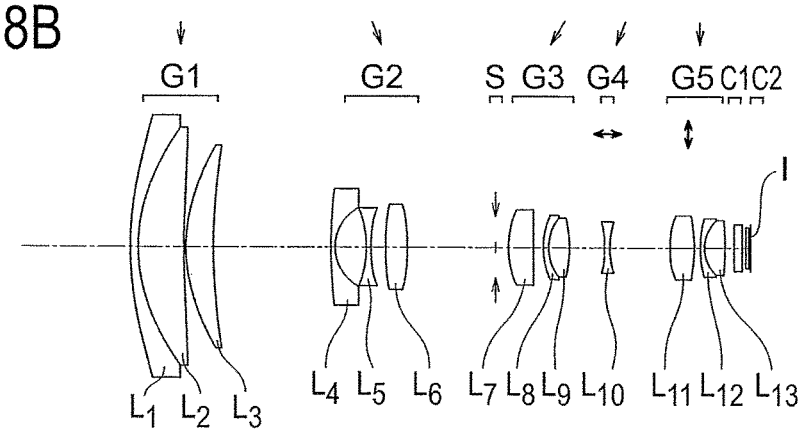
Figure 18C:
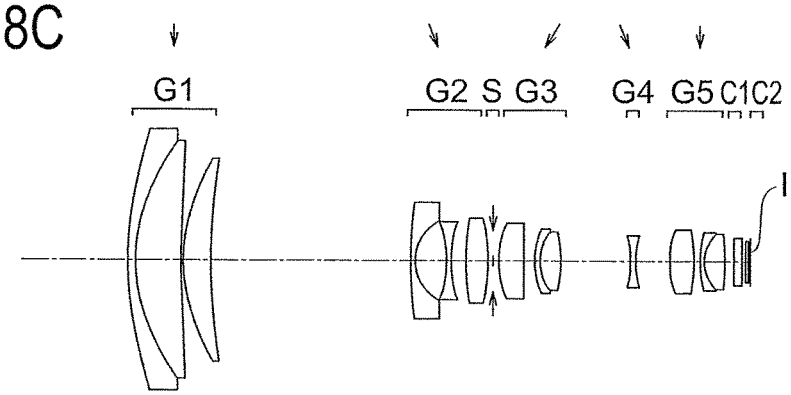
Figure 19A:
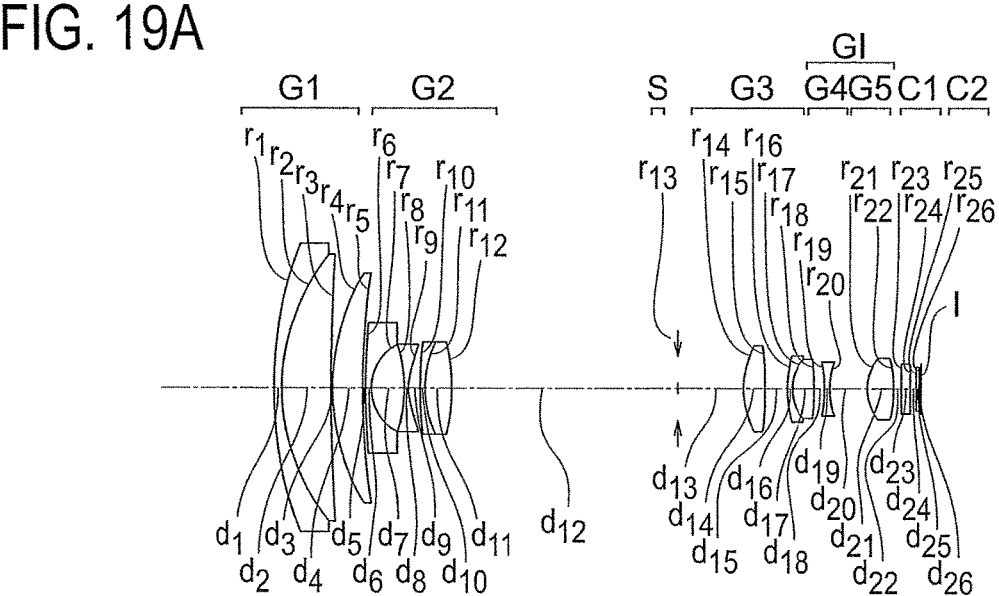
FIG. 19A, FIG. 19B, and FIG. 19C are lens cross-sectional views of a variable magnification optical system of Example 19.
Figure 19B:
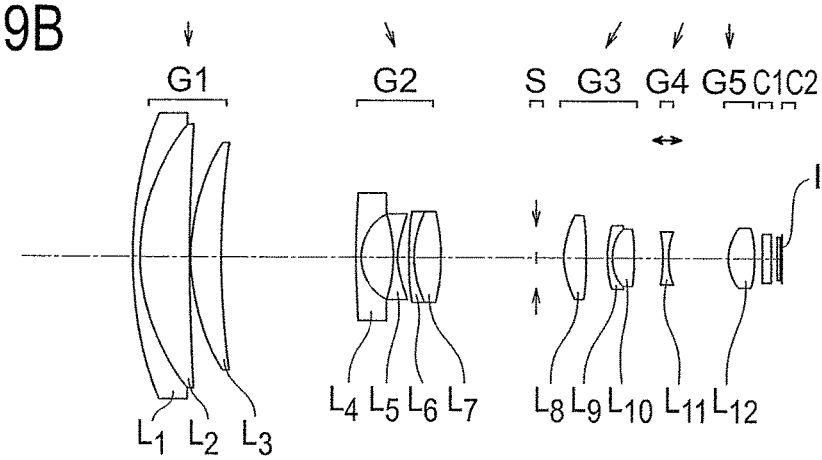
Figure 19C:
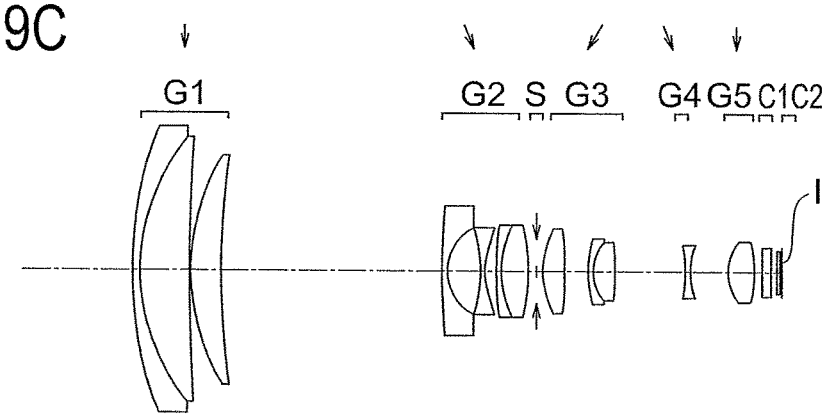
Figure 20A:
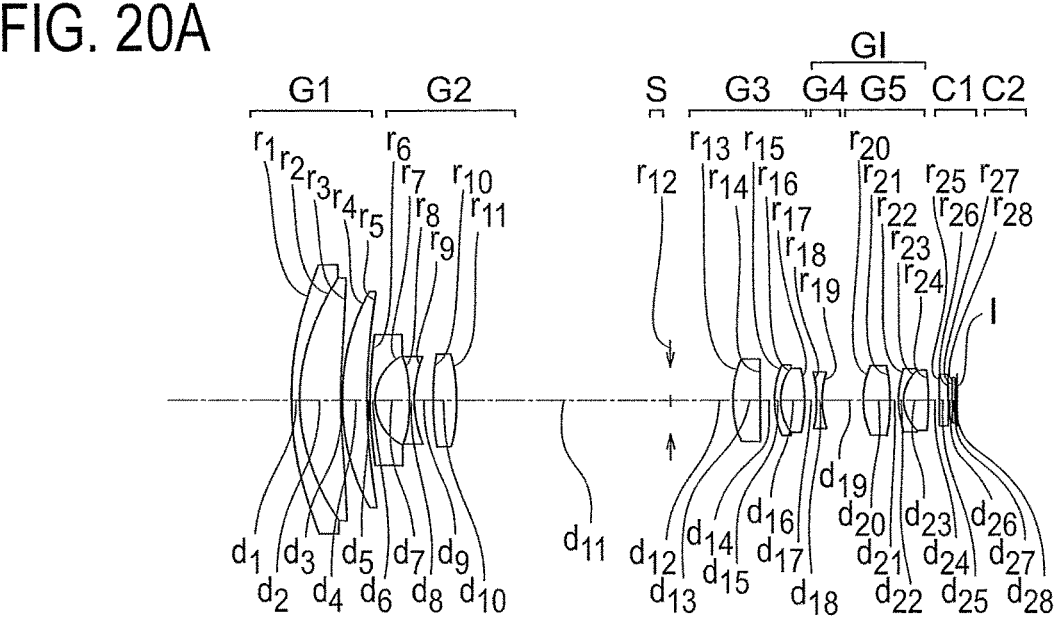
FIG. 20A, FIG. 20B, and FIG. 20C are lens cross-sectional views of a variable magnification optical system of Example 20.
Figure 20B:
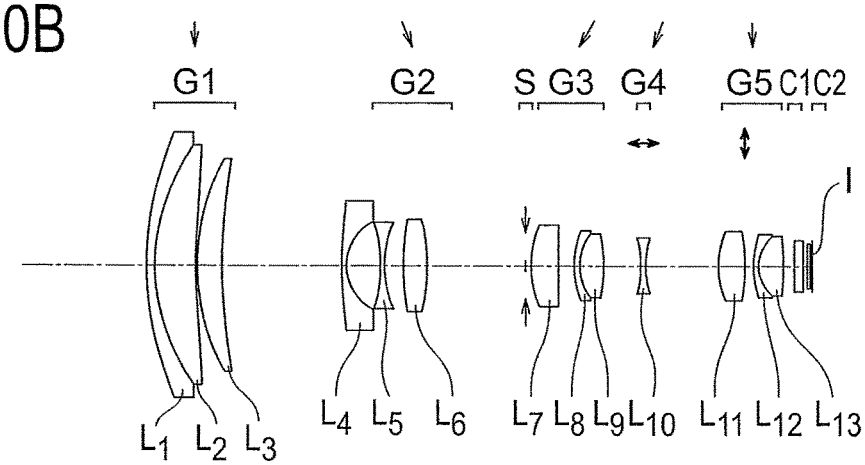
Figure 20C:
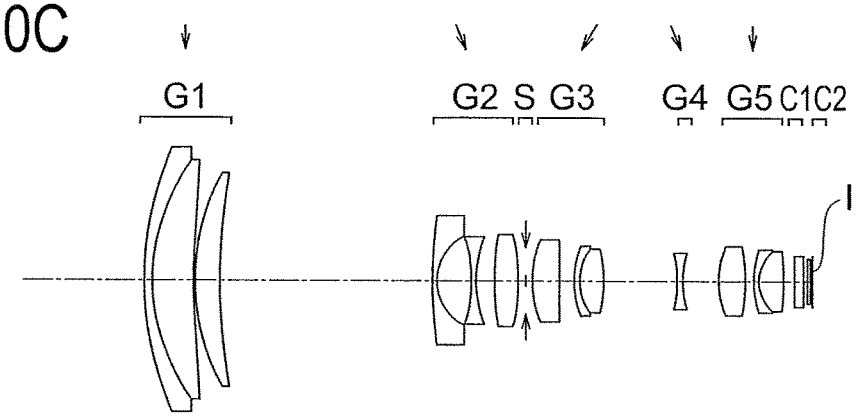
Figure 22A:
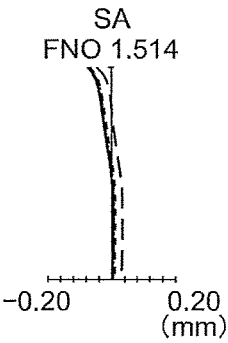
FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams of the variable magnification optical system of Example 2.
Figure 22B:
Figure 22C:
Figure 22D:
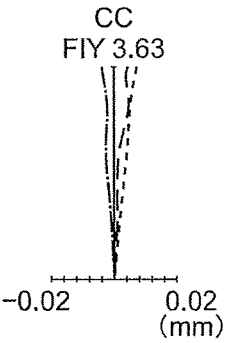
Figure 22E:
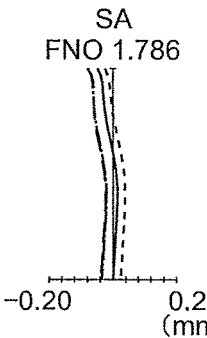
Figure 22F:
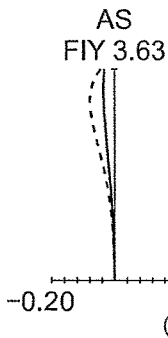
Figure 22G:
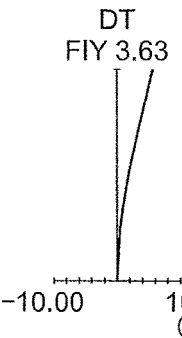
Figure 22H:
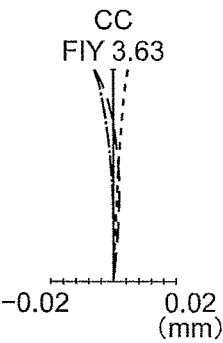
Figure 22I:
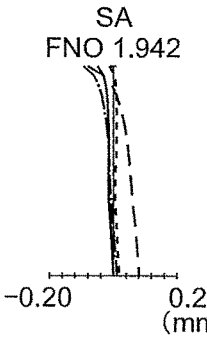
Figure 22J:
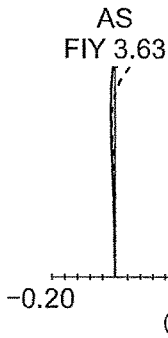
Figure 22K:
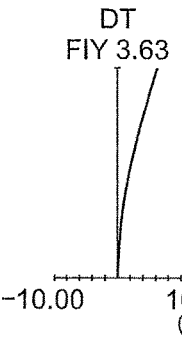
Figure 22L:
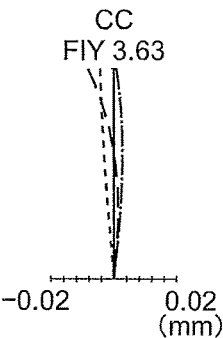
Figure 25A:
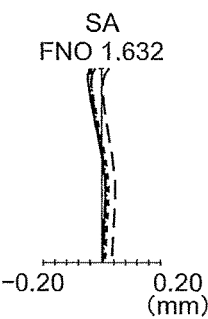
FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L are aberration diagrams of the variable magnification optical system of Example 5.
Figure 25B:
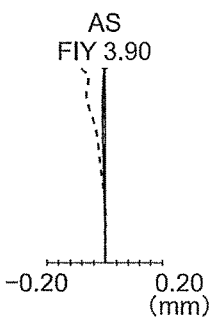
Figure 25C:
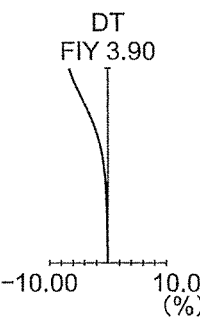
Figure 25D:
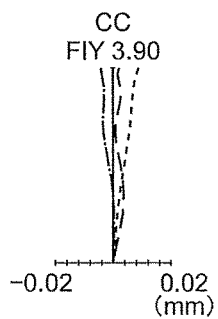
Figure 25E:
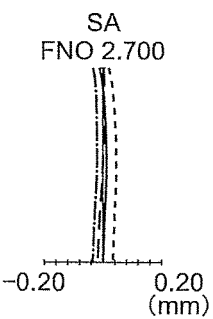
Figure 25F:
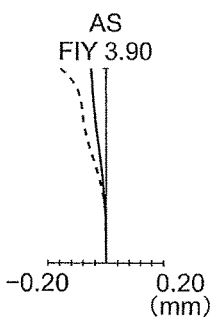
Figure 25G:
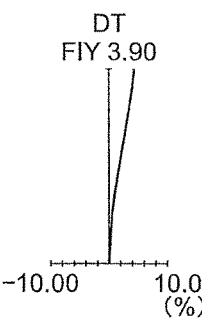
Figure 25H:
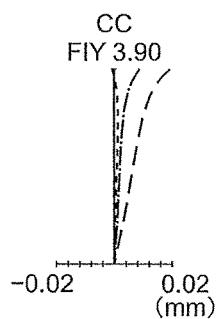
Figure 25I:
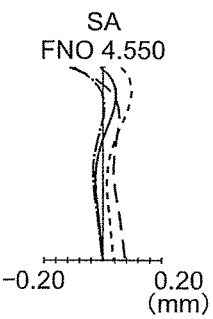
Figure 25J:
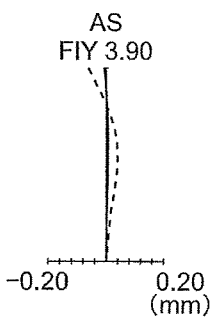
Figure 25K:
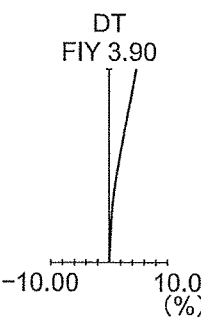
Figure 25L:
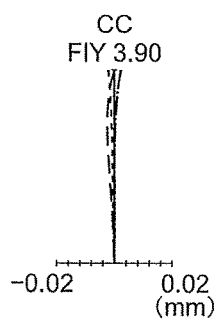
Figure 26A:
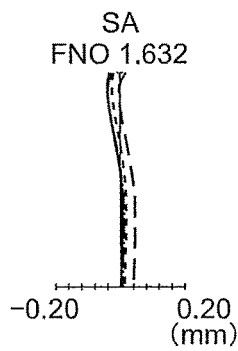
FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams of the variable magnification optical system of Example 6.
Figure 26B:
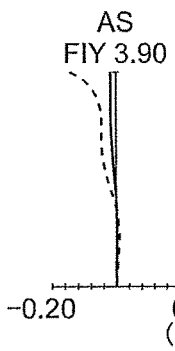
Figure 26C:
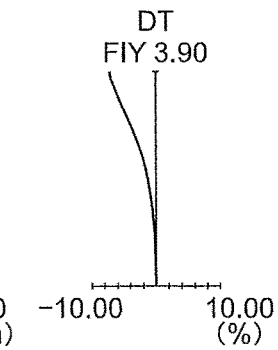
Figure 26D:
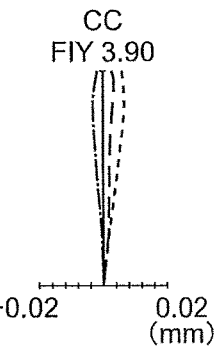
Figure 26E:
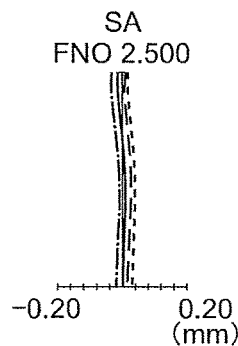
Figure 26F:
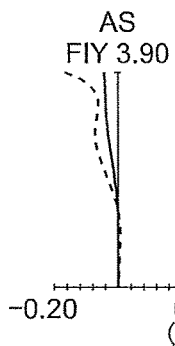
Figure 26G:
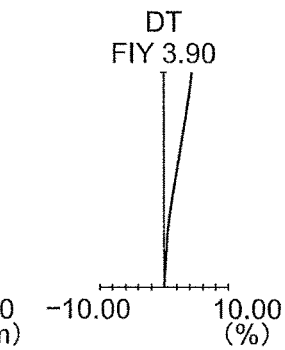
Figure 26H:
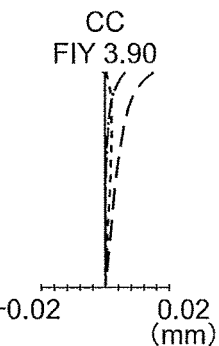
Figure 26I:
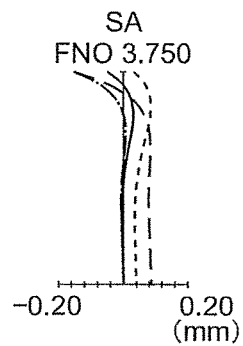
Figure 26J:
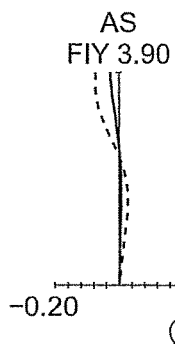
Figure 26K:
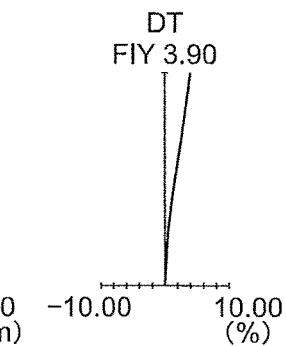
Figure 26L:
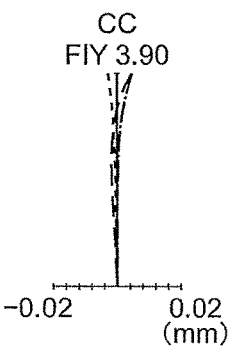
Figure 29A:
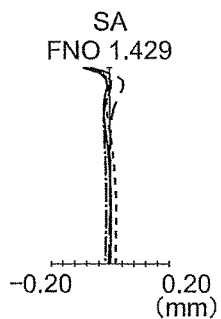
FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L are aberration diagrams of the variable magnification optical system of Example 9.
Figure 29B:
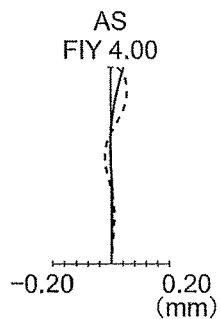
Figure 29C:
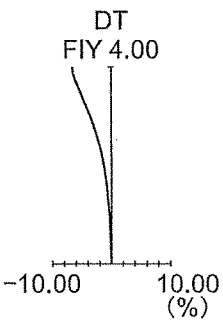
Figure 29D:
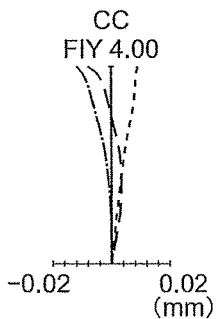
Figure 29E:
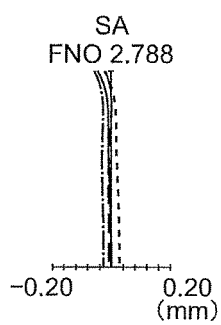
Figure 29F:
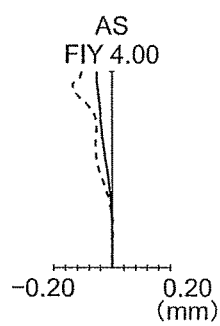
Figure 29G:
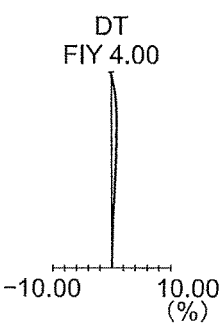
Figure 29H:
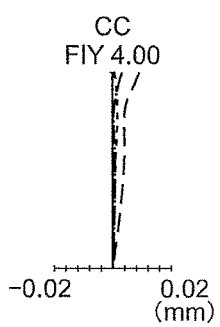
Figure 29I:
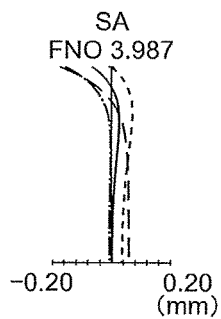
Figure 29J:
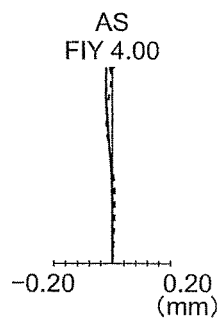
Figure 29K:
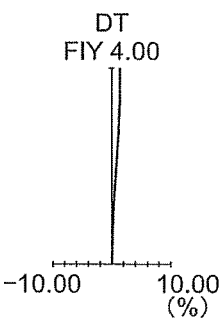
Figure 29L:
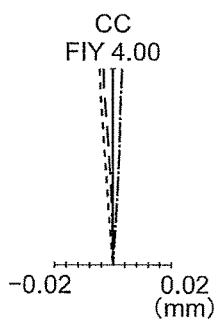
Figure 30A:
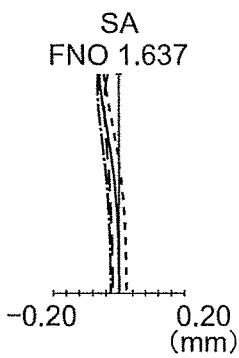
FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams of the variable magnification optical system of Example 10.
Figure 30B:
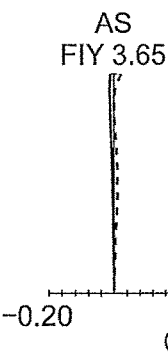
Figure 30C:
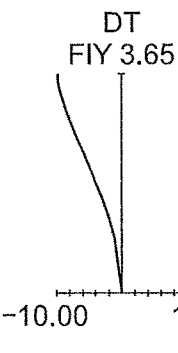
Figure 30D:
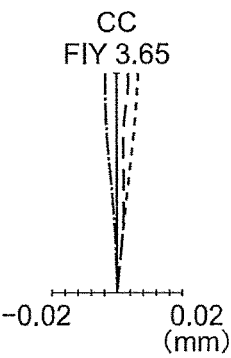
Figure 30E:
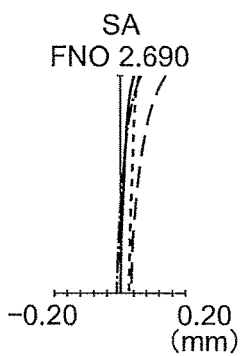
Figure 30F:
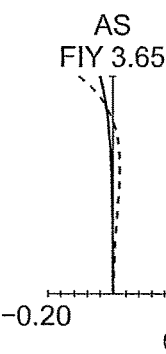
Figure 30G:
Figure 30H:
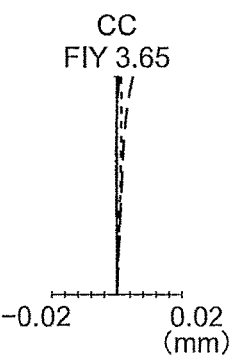
Figure 30I:
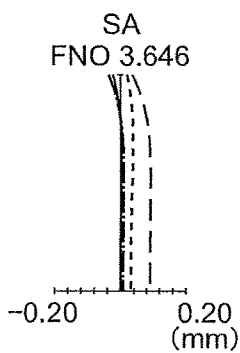
Figure 30J:
Figure 30K:
Figure 30L:
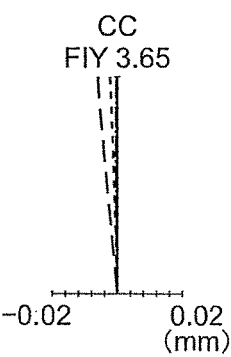
Figure 33A:
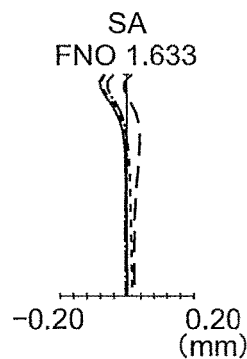
FIG. 33A, FIG. 33B, FIG. 33C, FIG. 33D, FIG. 33E, FIG. 33F, FIG. 33G, FIG. 33H, FIG. 33I, FIG. 33J, FIG. 33K, and FIG. 33L are aberration diagrams of the variable magnification optical system of Example 13.
Figure 33B:
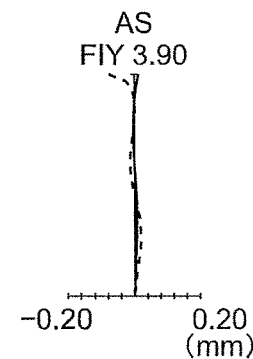
Figure 33C:
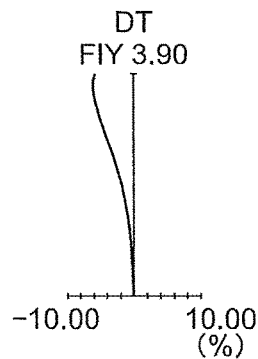
Figure 33D:
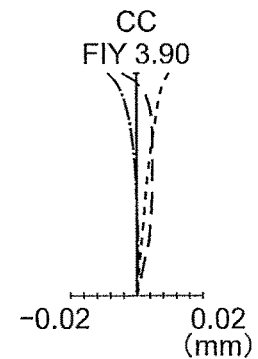
Figure 33E:
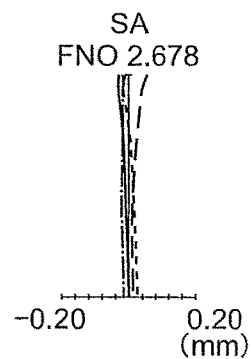
Figure 33F:
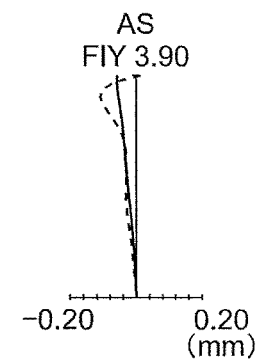
Figure 33G:
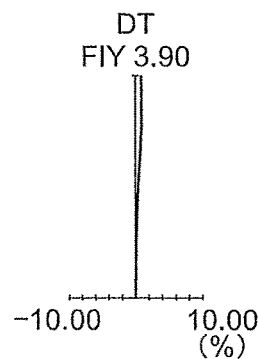
Figure 33H:
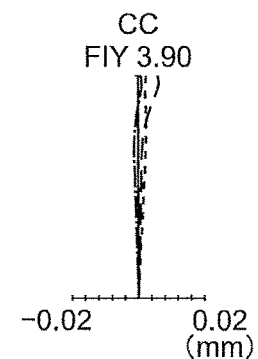
Figure 33I:
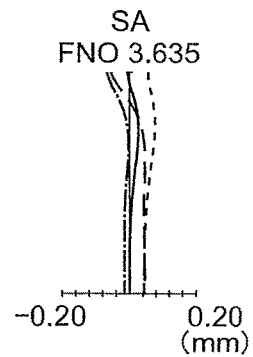
Figure 33J:
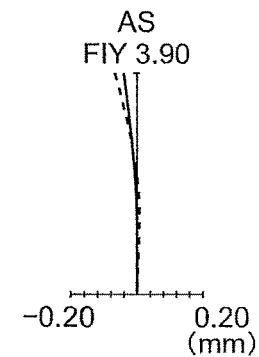
Figure 33K:
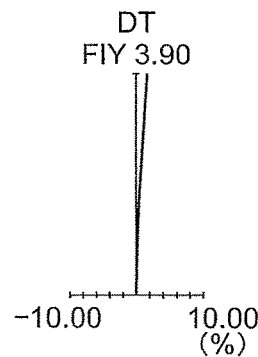
Figure 33L:
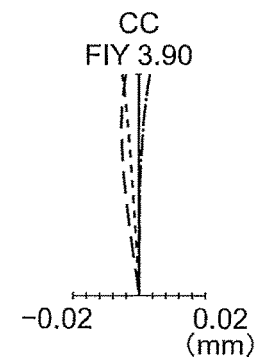
Figure 35A:
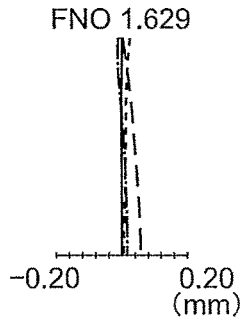
FIG. 35A, FIG. 35B, FIG. 35C, FIG. 35D, FIG. 35E, FIG. 35F, FIG. 35G, FIG. 35H, FIG. 35I, FIG. 35J, FIG. 35K, and FIG. 35L are aberration diagrams of the variable magnification optical system of Example 15.
Figure 35B:
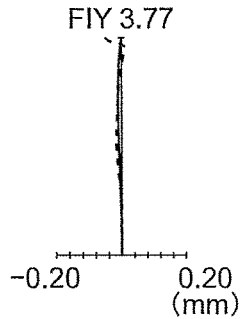
Figure 35C:
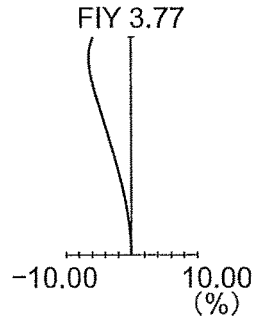
Figure 35D:
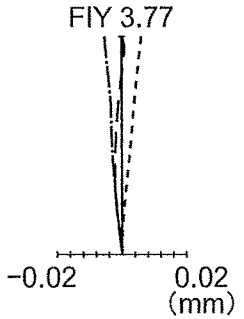
Figure 35E:
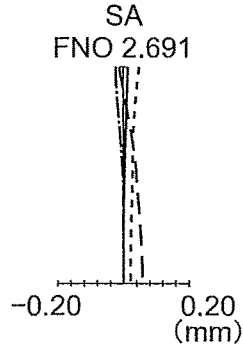
Figure 35F:
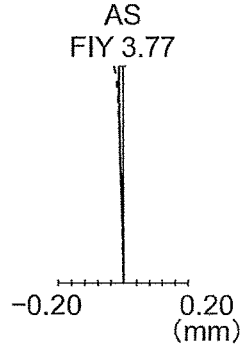
Figure 35G:
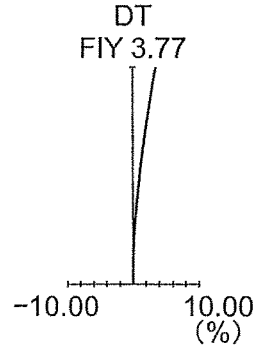
Figure 35H:
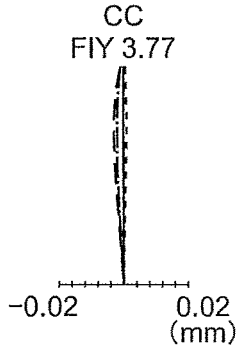
Figure 35I:
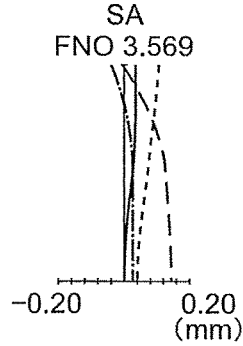
Figure 35J:
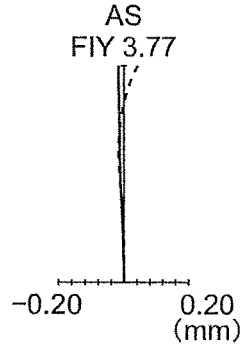
Figure 35K:
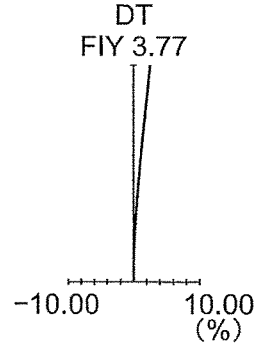
Figure 35L:
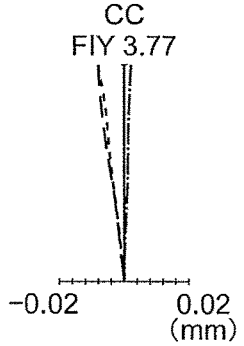
Figure 37A:
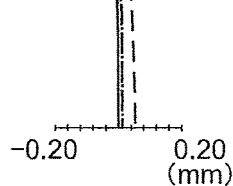
FIG. 37A, FIG. 37B, FIG. 37C, FIG. 37D, FIG. 37E, FIG. 37F, FIG. 37G, FIG. 37H, FIG. 37I, FIG. 37J, FIG. 37K, and FIG. 37L are aberration diagrams of the variable magnification optical system of Example 17.
Figure 37B:
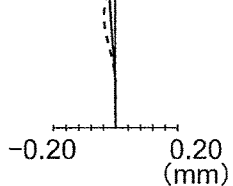
Figure 37C:
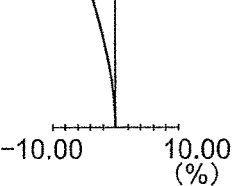
Figure 37D:
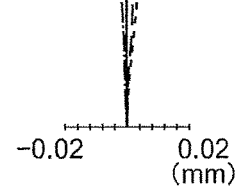
Figure 37E:
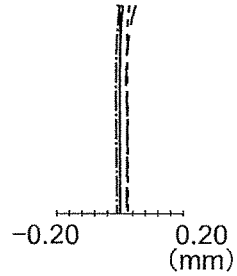
Figure 37F:
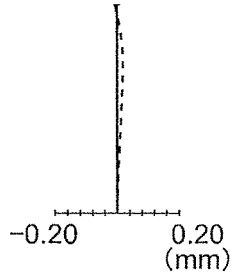
Figure 37G:
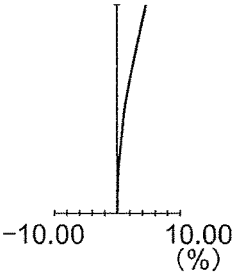
Figure 37H:
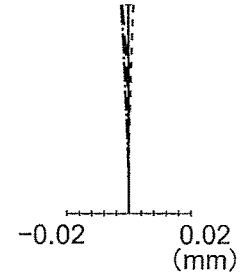
Figure 37I:
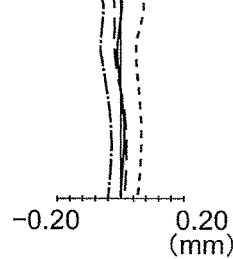
Figure 37J:
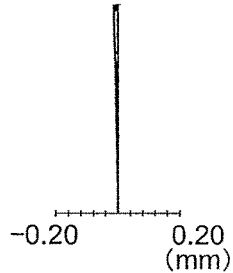
Figure 37K:
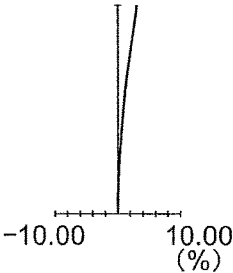
Figure 37L:
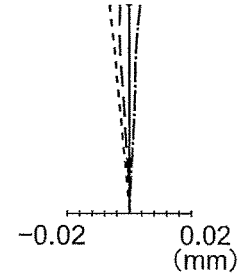
Figure 40A:
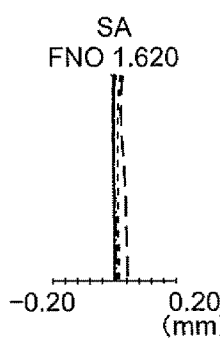
FIG. 40A, FIG. 40B, FIG. 40C, FIG. 40D, FIG. 40E, FIG. 40F, FIG. 40G, FIG. 40H, FIG. 40I, FIG. 40J, FIG. 40K, and FIG. 40L are aberration diagrams of the variable magnification optical system of Example 20.
Figure 40B:
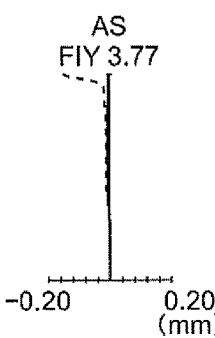
Figure 40C:
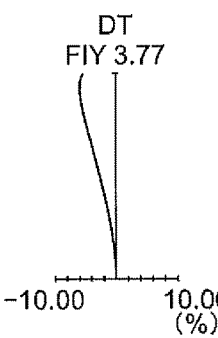
Figure 40D:
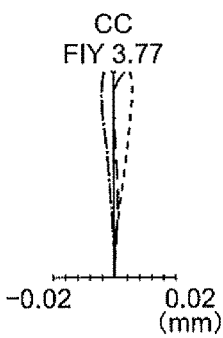
Figure 40E:
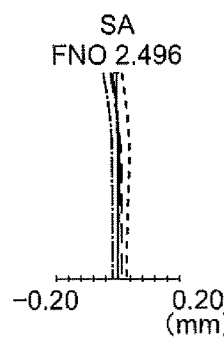
Figure 40F:
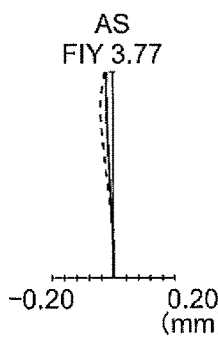
Figure 40G:
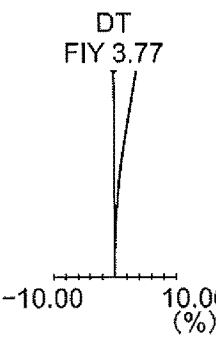
Figure 40H:
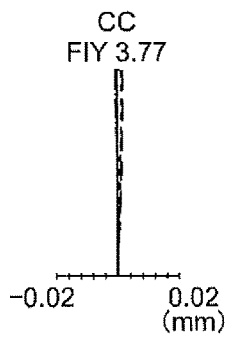
Figure 40I:
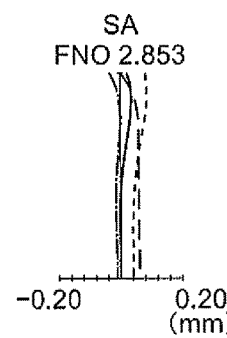
Figure 40J:
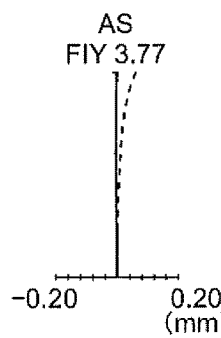
Figure 40K:
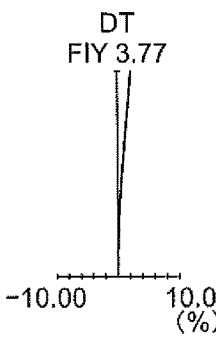
Figure 40L:
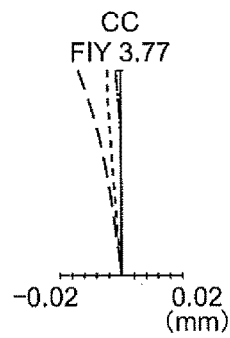

Prior to explanation of Examples, the following is explanation of operations and effects of an embodiment according to an aspect of the present invention. When the operations and effects of the present embodiment are specifically explained, they are explained with specific examples. However, in the same manner as Examples described later, the illustrated aspects are mere part of aspects included in the present invention, and many variations of the aspects exist. Accordingly, the present invention is not limited to the illustrated aspects.

In the following explanation, the term "corrected" means that the aberration amount is equal to or less than an allowable value, with respect to aberration correction. The term "corrected" means that an image blurring amount caused by camera shake is equal to or less than an allowable value, with respect to image stabilization.

The following is explanation of a basic structure of a variable magnification optical system according to a first embodiment to a variable magnification optical system according to a thirteenth embodiment (hereinafter referred to as "variable magnification optical system according to the present embodiment"). When the technical meaning of a similar structure has already been described, explanation thereof is omitted. In addition, with respect to the technical meaning of a conditional expression, for example, because the technical meaning of Conditional Expression (1-1) is the same as the technical meaning of Conditional Expression (1-*) (* means number), explanation of the technical meaning of Conditional Expression (1-*) is omitted. In the following explanation, the lens component means a single lens or a cemented lens.

The first basic configuration of the variable magnification optical system of the embodiments includes: in order from an object side, a first lens unit having a positive refractive power; a second lens unit having a negative refractive power; a third lens unit having a positive refractive power; and an image-side lens unit, the image-side lens unit includes a lens belonging to a first region and a lens belonging to a second region, a refractive power on the basis of all lenses belonging to the first region is a negative refractive power, and a refractive power on the basis of all lenses belonging to the second region is a positive refractive power, and at a time of changing magnification, a distance between the lens units is changeable, and the second lens unit is movable so that a distance between the first lens unit and the second lens unit is widened at a telephoto end than at a wide angle end.

In the first basic configuration described above, the third lens unit is movable. In the following description, a configuration in which the third lens unit is movable is referred to as the second basic configuration.

The third basic configuration of the variable magnification optical system of the present embodiment includes: in order from the object side, a first lens unit having a positive refractive power; and a second lens unit having a negative refractive power. An image-side first positive lens unit having a positive refractive power is included on an image side of the second lens unit. An image-side second positive lens unit having a positive refractive power is included on the image side of the image-side first positive lens unit. At a time of changing magnification, the distance between the lens units is changeable, and the second lens unit is movable so that the distance between the first lens unit and the second lens unit is widened at a telephoto end than at a wide angle end.

In the first basic configuration and the second basic configuration, a plurality of lenses are disposed in the image-side lens unit. A space where the lenses are disposed can be divided into two spaces. One space is referred to as a first region and the other space is referred to as a second region. At least one lens belongs to each of the first region and the second region.

A refractive power on the basis of all lenses belonging to the first region is a negative refractive power. Regarding all the lenses belonging to the first region as one lens unit, the refractive power of the lens unit is a negative refractive power. One lens or a plurality of lenses can belong to the first region.

When one lens belongs to the first region, the refractive power on the basis of all lenses belonging to the first region equals to the refractive power of the one lens. When a plurality of lenses belong to the first region, the refractive power on the basis of all lenses belonging to the first region equals to the refractive power obtained by combining the refractive powers of the lenses.

A refractive power on the basis of all lenses belonging to the second region is a positive refractive power. Regarding all the lenses belonging to the second region as one lens unit, the refractive power of the lens unit is a positive refractive power. One lens or a plurality of lenses can belong to the second region.

When one lens belongs to the second region, the refractive power on the basis of all lenses belonging to the second region equals to the refractive power of the one lens. When a plurality of lenses belong to the second region, the refractive power on the basis of all lenses belonging to the second region equals to the refractive power obtained by combining the refractive powers of the lenses.

In the first basic configuration and the second basic configuration, the diameter of the first lens unit is largest in the optical system. When the first basic configuration or the second basic configuration is used in a variable magnification optical system, the refractive power on the basis of all lenses belonging to the first region is a negative refractive power, and the refractive power on the basis of all lenses belonging to the second region is a positive refractive power. Thus, all the lenses belonging to the two regions can compose a magnifying optical system. As a result, the diameter of the first lens unit can be reduced.

In the first basic configuration and the second basic configuration, the first lens unit, the second lens unit, the third lens unit, all lenses belonging to the first region, and all lenses belonging to the second region can compose an optical system. In this case, refractive powers can be arranged in the order of a positive refractive power, a negative refractive power, a positive refractive power, a negative refractive power, and a positive refractive power. Thus, in the first basic configuration and the second basic configuration, the arrangement of refractive powers is symmetric with respect to the third lens unit. As a result, it becomes possible to ensure a wide angle of view at the wide angle end and to ensure a high zoom ratio, while reducing the overall length of the optical system.

Moreover, in the third basic configuration, the first lens unit, the second lens unit, the image-side first positive lens unit, and the image-side second positive lens unit are included. Thus, in the third basic configuration, refractive powers are easily arranged to be symmetric with respect to the first positive lens unit. As a result, it becomes possible to ensure a wide angle of view at the wide angle end and to ensure a high zoom ratio, while reducing the overall length of the optical system.

Here, a wide angle of view means the case where a half angle of view exceeds 33°. Moreover, a high magnification ratio means the case where a magnification ratio exceeds 5.5 times. However, definitions of the wide angle of view and the magnification ratio are not limited to these values.

In the first basic configuration, the second basic configuration and the third basic configuration, the arrangement of the refractive powers is substantially symmetrical or symmetrical across abroad range of the variable magnification range. Therefore, the whole length of the optical system can be reduced, and aberrations can be corrected across a broad range of the variable magnification range. As to the correction of the aberrations, mainly the curvature of field and the coma can be corrected across a broad range of the variable magnification range.

Moreover, by changing the distance between the lens units at a time of changing magnification, the optical system can be reduced in size, and favorable imaging performance can be ensured in an optical system having a wide angle of view and a high magnification ratio.

The following describes a variable magnification optical system of the first embodiment. The variable magnification optical system of the first embodiment has the above-described first basic configuration, and at a time of changing magnification, the first lens unit and an aperture stop are fixable, the third lens unit is movable, and the third lens unit includes a positive lens and a negative lens, and the following Conditional Expression (1-1) is satisfied:

$$1.52 \leq |fG2/fw| \leq 10.0 \quad (1\text{-}1), \text{ and}$$

$$3.1 \leq fG1/fw \leq 50 \quad (4\text{-}2)$$

where
fG1 is a focal length of the first lens unit,
fG2 is a focal length of the second lens unit, and
fW is a focal length of the variable magnification optical system at the wide angle end.

By making the third lens unit to be movable at a time of changing magnification, can enhance magnifying effect in the third lens unit can be made large. As a result, a high zoom ratio is easily ensured.

When F-number is made small, flare easily occurs. At the time of changing magnification, when the position of the aperture stop can be fixed, an error caused when the F-number is changed can be further reduced. Consequently, occurrence of flare can be reduced.

When the first lens unit is moved at a time of changing magnification, the position of the center of gravity of the whole optical system may be changed. When the position of the center of gravity of the whole optical system is changed, the posture in imaging may be changed from the posture before changing magnification. As described above, when the first lens unit is moved at a time of changing magnification, imaging at a fixed posture may become difficult.

When the first lens unit can be immobilized at a time of changing magnification, changing magnification is enabled with reduced change in posture in imaging. In addition, in the external appearance, no movable portion exists in the lens barrel. Accordingly, when the optical unit is formed using the variable magnification optical system of the present embodiment and the lens barrel, it is possible to form an optical unit with higher durability, higher dust resistance, and higher waterproof property. For example, when the optical unit is used for a monitoring camera, the monitoring camera can be installed outdoors for a long period of time.

To enhance the zoom ratio and reduce the F-number, it is preferable to correct spherical aberration in a wide range of the wavelength area contributing to imaging. The third lens unit disposed close to the aperture stop can greatly be involved in spherical aberration. Spherical aberration can be corrected by using at least a positive lens and a negative lens for the third lens unit. Correction of spherical aberration enables image stabilization as described later.

In a case of exceeding a lower limit value of the Conditional Expression (1-1), an angle of light ray made incident on the second lens unit from the first lens unit from can be prevented from becoming excessively large in off-axis light ray. As a result, the diameter of the first lens unit can be reduced. Furthermore, the occurrence amount of chromatic aberration of magnification and the occurrence amount of distortion near the wide angle end are both reduced.

In a case of falling below an upper limit value of the Conditional Expression (1-1), the refractive power of the second lens unit can be reduced, and therefore, a wider angle of view can be ensured.

In a case of exceeding a lower limit value of Conditional Expression (4-2), the position of an entrance pupil can be prevented from being close to an image position. Thus, the diameter of the first lens unit can be reduced while making angle of view at the wide angle end wide. As a result, it is possible to make the optical system small-sized.

In a case of falling below an upper limit value of Conditional Expression (4-2), a since effect of magnification provided by the first lens unit and the second lens unit is enhanced, it is possible to ensure a high zoom ratio.

The following describes a variable magnification optical system of the second embodiment. The variable magnification optical system of the second embodiment has the above-described first basic configuration, and at a time of changing magnification, the first lens unit and an aperture stop are fixable, and the third lens unit includes a positive lens and a negative lens, and the following Conditional Expressions (1-1), (7), and (32) are satisfied:

$$1.52 \leq |fG2/fw| \leq 10.0 \quad (1\text{-}1),$$

$$1.7 \leq |fG1/fG2| \leq 9.1 \quad (7), \text{ and}$$

$$0.04 \leq \Sigma G1/LTLw \leq 0.35 \quad (32)$$

where
fG1 is the focal length of the first lens unit,
fG2 is the focal length of the second lens unit,
fW is the focal length of the variable magnification optical system at the wide angle end,
ΣG1 is a thickness of the first lens unit, and
LTLw is an overall length of the variable magnification optical system at the wide angle end.

The technical meaning of Conditional Expression (7) is the same as the technical meaning of Conditional Expression (4-2).

In a case of exceeding a lower limit value of the Conditional Expression (32), the whole length of the optical system can be reduced. In a case of falling below an upper limit value of the Conditional Expression (32), it is possible to ensure a space for allowing the second lens unit to move at the time of changing magnification. Therefore, a wide angle of view can be ensured on the wide-angle side, and high zoom ratio can be achieved.

The following describes a variable magnification optical system of the third embodiment. The variable magnification optical system of the third embodiment has the above-described first basic configuration, and at a time of changing magnification, the first lens unit is fixable, the third lens unit is movable, an aperture stop is movable only in one direction or is fixable, and the first lens unit can include a negative lens and a positive lens, the positive lens may be a positive meniscus lens having a convex surface facing the object side, the third lens unit can include a positive lens and a negative lens, and the following Conditional Expression (1-3) is satisfied:

$$1.60 \leq |fG2/fw| \leq 10.0 \quad (1\text{-}3)$$

where
fG2 is the focal length of the second lens unit, and
fW is the focal length of the variable magnification optical system at the wide angle end.

In the variable magnification optical system of the present embodiment, the aperture stop is movable only in one direction or is fixable at a time of changing magnification.

By including a negative lens and a positive lens in the first lens unit, it is possible to ensure a high zoom ratio and to reduce occurrence of chromatic aberration in a broad range of the variable magnification range. Moreover, when the positive lens is made to be a meniscus lens having a convex surface facing the object side, it is possible to reduce variation in astigmatism at a time of changing magnification.

The following describes a variable magnification optical system of the fourth embodiment. The variable magnification optical system of the fourth embodiment has the above-described first basic configuration, and at a time of changing magnification, the first lens unit is fixable, the third lens unit is movable, and an aperture stop is movable only in one direction or is fixable, and the third lens unit can include a positive lens and a negative lens, and the following Conditional Expression (4-1) is satisfied:

$$8.7 \leq fG1/fw \leq 50 \qquad (4\text{-}1)$$

where fG1 is the focal length of the first lens unit, and fW is the focal length of the variable magnification optical system at the wide angle end.

In a case of exceeding a lower limit value of Conditional Expression (4-1), the position of an entrance pupil can be prevented from being close to an image position. Thus, the diameter of the first lens unit can be reduced while making angle of view at the wide angle end wide. As a result, it is possible to make the optical system small-sized.

In a case of falling below an upper limit value of Conditional Expression (4-2), a since effect of magnification provided by the first lens unit and the second lens unit is enhanced, it is possible to ensure a high zoom ratio.

As described above, in the second basic configuration, the third lens unit is movable. By making the third lens unit to be movable at a time of changing magnification, can enhance magnifying effect in the third lens unit can be made large. As a result, a high zoom ratio is easily ensured.

The following describes a variable magnification optical system of the fifth embodiment. The variable magnification optical system of the fifth embodiment has the above-described second basic configuration, and at a time of changing magnification, all lenses belonging to the second region are fixable, the first lens unit can include a negative lens and a positive lens, the positive lens in the first lens unit can be a positive meniscus lens having a convex surface facing the object side, and the following Conditional Expressions (1-1) and (2-1) are satisfied:

$$1.52 \leq |fG2/fw| \leq 10.0 \qquad (1\text{-}1), \text{ and}$$

$$0 \leq \Delta SS/LTLw \leq 0.065 \qquad (2\text{-}1)$$

where fG2 is the focal length of the second lens unit, fW is the focal length of the variable magnification optical system at the wide angle end, ΔSS is a maximum amount of movement of the aperture stop at a time of changing magnification, and LTLw is the overall length of the variable magnification optical system at the wide angle end.

The height of the ray made incident on the second region is changed at a time of changing magnification. When all lenses belonging to the second region are fixed at the time of changing magnification, it is possible to reduce both change in a central light flux diameter and a change in peripheral ray height made incident on the second region. Consequently, it is possible to suppress fluctuations in chromatic aberration of magnification from the wide angle end to the telephoto end, and to secure a small F-number.

The central light flux diameter indicates a diameter of the light flux imaged on the center of the image surface. The peripheral ray height indicates height of a ray imaged on the peripheral portion of the image surface.

When the lens unit is moved in the vicinity of the image surface, dust easily occurs due to movement of the lens unit. The second region is disposed close to the image surface. Therefore, it is possible to reduce the occurrence of dust by making all lenses belonging to the second region to be immovable. Adhesion of dust onto the image pickup surface can be reduced when the image pickup element is disposed on the image surface. Moreover, it is possible to form an arrangement in which a change in F-number is reduced in a broad range of the variable magnification range.

By including a negative lens and a positive lens in the first lens unit, it is possible to ensure a high zoom ratio and to reduce occurrence of chromatic aberration in a broad range of the variable magnification range. Moreover, when the positive lens is made to be a meniscus lens having a convex surface facing the object side, it is possible to reduce variation in astigmatism at a time of changing magnification.

The technical meaning of Conditional Expression (1-1) is as described above.

By satisfying the Conditional Expression (2-1), it is possible to reduce abrupt change in the F-number due to changing magnification. As a result, the amount of a change in the diameter of the aperture stop at the time of changing magnification can be reduced. Furthermore, even in a case where F-number is small, variation in the light amount can be kept small across a broad range of the variable magnification range.

Moreover, electrical means may be used for changing the aperture diameter of the aperture stop. An example of the electric means includes an electric wire for transmitting electric signals. The length of a channel for transmitting the electric signals, that is, the length of the electric wire may change, as the aperture stop is moved at the time of changing magnification. By satisfying the Conditional Expression (2-1), since it is possible to reduce the movement amount of the aperture stop, it is possible to reduce change in length of the electrical wire. Consequently, it is possible to achieve electrical means with a structure with high durability.

The following describes a variable magnification optical system of the sixth embodiment. The variable magnification optical system of the sixth embodiment has the above-described second basic configuration, and at a time of changing magnification, all lenses belonging to the second region are fixable, and the following Conditional Expressions (1-2) and (3) are satisfied:

$$1.61 \leq |fG2/fw| \leq 10.0 \qquad (1\text{-}2), \text{ and}$$

$$-0.067 \leq fG2 \times PG1G2a \leq 0.207 \qquad (3)$$

where fG2 is the focal length of the second lens unit, fW is the focal length of the variable magnification optical system at the wide angle end, PG1G2a is represented by the following expression:

$$PG1G2a = 1/RG1B - 1/RG2F, \text{ where}$$

RG1B is a radius of curvature of the lens surface positioned closest to the image side in the first lens unit, and RG2F is a radius of curvature of the lens surface positioned closest to the object side in the second lens unit.

In a case of exceeding a lower limit value of the Conditional Expression (3), it is possible to make small mainly occurrence of astigmatism and variations in distortion near the wide angle end. As a result, the angle of view at the wide angle end can be increased.

In a case of falling below an upper limit value of the Conditional Expression (3), it is possible to make the refractive power of the second lens unit large. Therefore, even when the angle of view at the wide angle end is increased, the diameter of the second lens unit can be made small. As a result, it is possible to make the optical system small-sized.

The following describes a variable magnification optical system of the seventh embodiment. The variable magnification optical system of the seventh embodiment has the above-described second basic configuration, and at a time of changing magnification, the first lens unit is fixable, the first lens unit can include a negative lens and a positive lens, the positive lens can be a positive meniscus lens having a convex surface facing the object side, the third lens unit can include a positive lens and a negative lens, and the following Conditional Expressions (1-3) and (2-2) are satisfied:

$$1.60 \leq |fG2/fw| \leq 10.0 \quad (1\text{-}3), \text{ and}$$

$$0 \leq \Delta SS/LTLw \leq 0.11 \quad (2\text{-}2)$$

where
fG2 is the focal length of the second lens unit,
fW is the focal length of the variable magnification optical system at the wide angle end,
ΔSS is the maximum amount of movement of the aperture stop at a time of changing magnification, and
LTLw is the overall length of the variable magnification optical system at the wide angle end.

By making the first lens unit to be fixable at a time of changing magnification, it is possible to obtain the operation effects described on the variable magnification optical system of the first embodiment.

The following describes a variable magnification optical system of the eighth embodiment. The variable magnification optical system of the eighth embodiment has the above-described second basic configuration, and at a time of changing magnification, the first lens unit is fixable, the third lens unit can include a positive lens and a negative lens, and the following Conditional Expressions (2-2) and (4-1) are satisfied:

$$0 \leq \Delta SS/LTLw \leq 0.11 \quad (2\text{-}2), \text{ and}$$

$$8.7 \leq fG1/fw \leq 50 \quad (4\text{-}1)$$

where
ΔSS is the maximum amount of movement of the aperture stop at a time of changing magnification,
LTLw is the overall length of the variable magnification optical system at the wide angle end,
fG1 is the focal length of the first lens unit, and
fW is the focal length of the variable magnification optical system at the wide angle end.

The following describes a variable magnification optical system of the ninth embodiment. The variable magnification optical system of the ninth embodiment has the above-described third basic configuration, and at a time of changing magnification, an aperture stop is fixable, and the following Conditional Expressions (28-1), (29-1), and (32) are satisfied:

$$35.3° \leq \Omega Hw/2 \leq 70.0° \quad (28\text{-}1),$$

$$7.0 \leq ft/fw \leq 120.0 \quad (29\text{-}1), \text{ and}$$

$$0.04 \leq \Sigma G1/LTLw \leq 0.35 \quad (32)$$

where
ΩHw is a total angle of view in the horizontal direction at the wide angle end,
ft is the focal length of the variable magnification optical system at the telephoto end,
fW is the focal length of the variable magnification optical system at the wide angle end,
ΣG1 is the thickness of the first lens unit, and LTLw is the overall length of the variable magnification optical system at the wide angle end.

When F-number is made small, flare easily occurs. At the time of changing magnification, when the position of the aperture stop can be fixed, an error caused when the F-number is changed can be further reduced. Consequently, occurrence of flare can be reduced.

In a case of exceeding a lower limit value of the Conditional Expression (28-1), the image pickup device can capture images covering a wider area. Therefore, in the case of using a variable magnification optical system of the present embodiment for a monitoring camera, for example, blind spots can be reduced. In the case of using a variable magnification optical system of the present embodiment for a camera for a television conference, a plurality of persons can be captured in the image even when the room size is small. In a case of falling below an upper limit value of the Conditional Expression (28-1), because the diameter of the first lens unit will not increase, it is possible to make the optical system small-sized.

In a case of exceeding a lower limit value of the Conditional Expression (29-1), it is possible to obtain a high-definition image. For this reason, for example, in the case of using a variable magnification optical system of the present embodiment for the monitoring camera, it is possible to photograph a license plate of an automobile and/or a face of a person clearly. In a case of falling below an upper limit value of the Conditional Expression (29-1), it is possible to shorten the whole length of the optical system. Consequently, it is possible to make the optical system small-sized.

The technical meaning of Conditional Expression (32) is as described above.

The following describes a variable magnification optical system of the tenth embodiment. The variable magnification optical system of the tenth embodiment has the above-described third basic configuration, and the following Conditional Expressions (28-2), (29-2), and (30-1) are satisfied:

$$33.4° \leq \Omega Hw/2 \leq 70.0° \quad (28\text{-}2),$$

$$5.0 \leq ft/fw \leq 65.0 \quad (29\text{-}2), \text{ and}$$

$$0.60 \leq FNOw \leq 1.84 \quad (30\text{-}1)$$

where
FNOw is an F-number at the wide angle end.

In a case of exceeding a lower limit value of the Conditional Expression (30-1), it is possible to suppress occurrence of spherical aberration and occurrence of astigmatism near the wide angle end in each of the first lens unit, the second lens unit, and the third lens unit.

In a case of falling below an upper limit value of the Conditional Expression (30-1), sufficient brightness can be ensured at the wide angle end. Therefore, in the case of using a variable magnification optical system of the present embodiment for a monitoring camera, a favorable image can be obtained in monitoring in cloudy weather or at night.

The following describes a variable magnification optical system of the eleventh embodiment. The variable magnification optical system of the eleventh embodiment has the above-described third basic configuration, and the following Conditional Expressions (29-3), (30-2), and (31) are satisfied:

$$10.0 \leq ft/fw \leq 65.0 \quad (29\text{-}3),$$

$$0.60 \leq FNOw \leq 1.62 \quad (30\text{-}2), \text{ and}$$

$$0.70 \leq FNOt \leq 5.5 \quad (31)$$

where

FNOt is an F-number at the telephoto end.

In a case of exceeding a lower limit value of the Conditional Expression (31), it is possible to suppress occurrence of spherical aberration and occurrence of astigmatism near the telephoto end in each of the first lens unit, the second lens unit, and the third lens unit.

In a case of falling below an upper limit value of the Conditional Expression (31), sufficient brightness can be ensured at the telephoto end. Therefore, in the case of using a variable magnification optical system of the present embodiment for a monitoring camera, a favorable image can be obtained in monitoring in cloudy weather or at night.

The following describes a variable magnification optical system of the twelfth embodiment. The variable magnification optical system of the twelfth embodiment has the above-described third basic configuration. In addition, the first lens unit is fixable at a time of changing magnification, and the following Conditional Expressions (29-4), (33), (35), and (32-1) are satisfied:

$$10.2 \leq ft/fw \leq 120.0 \tag{29-4}$$

$$0.0 \leq ft/fw + 143.9 \times \tan(\Omega Hw/2) - 121.88 \leq 110 \tag{33}$$

$$2.5 \text{ mm} \leq Rimg \leq 22.0 \text{ mm} \tag{35}$$, and $$0.04 \leq \Sigma G1/LTLw \leq 0.33 \tag{32-1}$$

where

Rimg is a radius of an image circle at an image pickup element.

For example, in a monitoring camera, there are cases where a visual field range at the wide angle end is checked, or a predetermined area is enlarged to check the predetermined area in detail. In view of acquisition of more detailed information, the zoom ratio may be increased.

In the variable magnification optical system, the imaging area can be proportional to f×tan ω (f is a focal length, and ω is an angle of view). For this reason, as the horizontal angle of view is narrowed at the wide angle end, the information amount in the imaging area may reduce in proportion to tan of the angle of view. Specifically, reduction rate of the information amount is equal to or higher than the change rate of the angle of view.

When the horizontal angle of view at the wide angle end is narrow, the information amount can be compensated by more increasing the zoom ratio and more narrowing the angle of view at the telephoto end than those in the case where the horizontal angle of view at the wide angle end is wide. In a monitoring camera, it is more preferable that more information amount is obtained by image pickup. In use for a monitoring camera, the information amount can be compensated by further narrowing the angle of view at the telephoto end. In a case of exceeding a lower limit value of Conditional Expression (33), a sufficient information amount can be obtained.

By satisfying Conditional Expression (35), a high resolution can be obtained. In a case of exceeding a lower limit value of Conditional Expression (35), when a high resolution is secured, since the sensitivity of an image pickup element improved, a favorable image is obtained. The high resolution means, for example, resolution of a high-definition television, or resolution higher than the resolution of the high-definition television.

The following describes a variable magnification optical system of the thirteenth embodiment. The variable magnification optical system of the thirteenth embodiment has the above-described third basic configuration, and the first lens unit is fixable at a time of changing magnification, and the following Conditional Expressions (29-5), (34), (35-1), and (32-1) are satisfied:

$$6.1 \leq ft/fw \leq 120.0 \tag{29-5}$$

$$0.0 \leq ft/fw + 126.52 \times \tan(\Omega Hw/2) - 101.91 \leq 120 \tag{34}$$

$$3.3 \text{ mm} \leq Rimg \leq 22.0 \text{ mm} \tag{35-1}$$, and $$0.04 \leq \Sigma G1/LTLw \leq 0.33 \tag{32-1}$$

The technical meaning of Conditional Expression (34) is the same as that of Conditional Expression (33).

By making the first lens unit to be fixable at a time of changing magnification, and it is possible to obtain the operation effects described on the variable magnification optical system of the first embodiment.

In the variable magnification optical system of the ninth embodiment to the variable magnification optical system of the thirteenth embodiment, the image-side first positive lens unit may be the third lens unit, and no lens unit may be disposed between the third lens unit and the second lens unit.

The variable magnification optical system of the ninth embodiment to the variable magnification optical system of the thirteenth embodiment, each include, in order from the object side, the first lens unit, the second lens unit, the third lens unit, and the image-side lens unit, in which the image-side lens unit includes a lens belonging to the first region and a lens belonging to the second region, the refractive power on the basis of all lenses belonging to the first region is a negative refractive power and the refractive power on the basis of all lenses belonging to the second region is a positive refractive power, and all the lenses belonging to the second region may compose the image-side second positive lens unit.

By doing this, it is possible to obtain the operation effects described on the first basic configuration and the second basic configuration in the third basic configuration.

In the variable magnification optical system of the ninth embodiment to the variable magnification optical system of the thirteenth embodiment, the third lens unit may be movable at a time of changing magnification. By making the third lens unit to be movable at a time of changing magnification can enhance zoom action in the third lens unit. As a result, a high zoom ratio is easily ensured.

In the variable magnification optical system of the first embodiment to the variable magnification optical system of the sixth embodiment, and the variable magnification optical system of the ninth to the thirteenth embodiment, the following Conditional Expression (2-2) can be satisfied:

$$0 \leq \Delta SS/LTLw \leq 0.11 \tag{2-2}$$

where

ΔSS is the maximum amount of movement of the aperture stop at a time of changing magnification, and LTLw is the overall length of the variable magnification optical system at the wide angle end.

In the variable magnification optical system of the fourth embodiment, and the variable magnification optical system of the eighth embodiment to the variable magnification optical system of the thirteenth embodiment, the following Conditional Expression (1-1) can be satisfied:

$$1.52 \leq |fG2/fw| \leq 10.0 \tag{1-1}$$

where fG2 is the focal length of the second lens unit, and fW is the focal length of the variable magnification optical system at the wide angle end.

In the variable magnification optical system of the first embodiment to the fifth embodiment, and the variable magnification optical system of the seventh embodiment to the variable magnification optical system of the thirteenth embodiment, the following Conditional Expression (3) can be satisfied:

$$-0.067 \leq fG2 \times PG1G2a \leq 0.207 \quad (3)$$

where fG2 is the focal length of the second lens unit,

PG1G2a is represented by the following expression:

$$PG1G2a = 1/RG1B - 1/RG2F, \text{ where}$$

RG1B is a radius of curvature of the lens surface positioned closest to the image side in the first lens unit, and RG2F is a radius of curvature of the lens surface positioned closest to the object side in the second lens unit.

In the variable magnification optical system of the present embodiment, the following Conditional Expression (5) can be satisfied:

$$-0.20 \leq (LTLt - LTLw)/LTLw \leq 0.46 \quad (5)$$

where

LTLt is a overall length of the variable magnification optical system at the telephoto end, and LTLw is the overall length of the variable magnification optical system at the wide angle end.

In a case of exceeding a lower limit value of the Conditional Expression (5), it is possible to suppress an increase in the curvature of field near the wide angle end, while ensuring a high magnification ratio. Moreover, it is possible to suppress an occurrence of spherical aberration near the telephoto end. Therefore, favorable imaging performance can be obtained.

In a case of falling below an upper limit value of Conditional Expression (5), the amount of movement of the first lens unit can be reduced even in a case where the first lens unit moves at a time of changing magnification. Therefore, it is possible to perform changing magnification in a state where variation in the position at a time of imaging is reduced.

In the variable magnification optical system of the second embodiment, the variable magnification optical system of the third embodiment, the variable magnification optical system of the fifth embodiment to the variable magnification optical system of the seventh embodiment, and the variable magnification optical system of the ninth embodiment to the variable magnification optical system of the thirteenth embodiment, the following Conditional Expression (4-2) can be satisfied:

$$3.1 \leq fG1/Fw \leq 50 \quad (4\text{-}2)$$

where fG1 is the focal length of the first lens unit, and fW is the focal length of the variable magnification optical system at the wide angle end.

In the variable magnification optical system of the present embodiment, the following Conditional Expression (6) can be satisfied:

$$0.1 \leq fG1/ft \leq 3.0 \quad (6)$$

where fG1 is the focal length of the first lens unit, and ft is the focal length of the variable magnification optical system at the telephoto end.

The technical meaning of Conditional Expression (6) is the same as the technical meaning of Conditional Expression (4-1).

In the variable magnification optical system of the first embodiment, and the variable magnification optical system of the third embodiment to the variable magnification optical system of the thirteenth embodiment, the following Conditional Expression (7) can be satisfied:

$$1.7 \leq |fG1/fG2| \leq 9.1 \quad (7)$$

where fG1 is the focal length of the first lens unit, and fG2 is the focal length of the second lens unit.

The technical meaning of Conditional Expression (7) is the same as the technical meaning of Conditional Expression (4-1).

In the variable magnification optical system of the present embodiment, the following Conditional Expression (8) can be satisfied:

$$1.0 \leq fG3/fw \leq 9.0 \quad (8)$$

where fG3 is a focal length of the third lens unit, and fW is the focal length of the variable magnification optical system at the wide angle end.

In a case of exceeding a lower limit value (8), the occurrence amount of spherical aberration in the third lens unit is mainly reduced. Therefore, small F-number can be ensured at the wide angle end. In a case of falling below an upper limit value of the Conditional Expression (8), the magnifying effect of the third lens unit is increased. As a result, a high magnification ratio can be ensured.

In the variable magnification optical system of the present embodiment, the following Conditional Expression (9) can be satisfied:

$$-14\% < DTw < 5\% \quad (9)$$

where

DTw is a distortion amount at the maximum angle of view at the wide angle end, and is indicated with the following Equation:

$$DTw = (IHw1 - IHw2)/IHw2 \times 100(\%),$$

IHw1 is a real image height when light flux including the ray of the maximum angle of view is imaged on the image surface at the wide angle end, IHw2 is a paraxial image height when light flux including the ray of the maximum angle of view is imaged on the image surface at the wide angle end, and both image heights are image heights at the time of focusing to an infinite object point.

In a case of exceeding a lower limit value of Conditional Expression (9), since distortion of the image becomes small, it is possible to pick up the subject accurately. In a case of falling below an upper limit value of Conditional Expression (9), an image with less distortion (an image with inconspicuous distortion) is obtained.

In the variable magnification optical system of the present embodiment, the third lens unit can include a predetermined positive lens that satisfies the following Conditional Expression (10)

$$63 \leq vdG3P1 \leq 100.0 \quad (10)$$

where vdG3P1 is Abbe number of the predetermined positive lens.

In a case of exceeding a lower limit value of the Conditional Expression (10), the longitudinal chromatic aberration in the third lens unit will be reduced. Therefore, even when the magnification ratio is increased, favorable imaging performance can be ensured across a broad range of the variable magnification range.

In the variable magnification optical system of the present embodiment, the third lens unit can include a first positive lens and a cemented lens, the cemented lens can consist of a negative lens and a biconvex positive lens, or the cemented lens can consist of a positive lens and a negative lens, and can have a meniscus shape having a convex surface facing the object side.

It is possible to make high correction effect of longitudinal chromatic aberration and correction effect of chromatic aberration of magnification by including the cemented lens. In addition, it is possible to make high correction effect of spherical aberration and correction effect of coma mainly with the first positive lens and the cemented surface of the cemented lens.

Furthermore, among lenses composing the cemented lens, by making a lens on the image side to be a biconvex positive lens, it is possible to further increase correction effect of spherical aberration and correction effect of coma. As a result, a high zoom ratio and a small F-number are easily obtained.

In the variable magnification optical system of the present embodiment, at a time of changing magnification, all the lenses belonging to the first region are movable so that the distance between the third lens unit and all the lenses belonging to the first region changes.

By doing this, correction on curvature of field can be performed in abroad range of the variable magnification range. Thus, a favorable imaging performance is obtained. All the lenses belonging to the first region can be regarded as composing one lens unit. Therefore, at a time of moving, all the lenses belonging to the first region move as one unit.

In the variable magnification optical system of the present embodiment, at a time of changing magnification, all the lenses belonging to the first region are movable so that the distance between the third lens unit and all the lenses belonging to the first region is widened at the telephoto end than at the wide angle end.

By doing this, correction on curvature of field can be performed in a broad range of the variable magnification range. Thus, a favorable imaging performance is obtained.

In the variable magnification optical system of the present embodiment, at a time of changing magnification from the wide angle end to the telephoto end, all the lenses belonging to the first region can move along a locus convex towards the object side.

By doing this, correction on curvature of field can be performed in a broad range of the variable magnification range. Thus, a favorable imaging performance is obtained.

In the variable magnification optical system of the present embodiment, all the lenses belonging to the first region are fixable at a time of changing magnification.

By doing this, it is possible to eliminate the necessity of a space for moving all the lenses belonging to a first region of a fourth lens unit at a time of changing magnification. Thus, it is possible to make the optical system small-sized. Moreover, By doing this, it is possible to eliminate the necessity of a moving mechanism. Thus, the size of the optical unit can be reduced.

In the variable magnification optical system of the present embodiment, all the lenses belonging to the second region are fixable at a time of changing magnification.

The second region can be disposed close to the first region. When all the lenses belonging to the second region are fixed at a time of changing magnification, an actuator for changing magnification may not be disposed in the vicinity of the first region. Accordingly, when focusing is performed by all the lenses belonging to the first region, an actuator for focusing can be disposed in the vicinity of the first region. As a result, the size of the focus unit can be reduced. The focus unit can be formed of, for example, a focusing lens unit and an actuator for focusing.

Furthermore, the operation effects described on the variable magnification optical system of the fifth embodiment can be provided.

In the variable magnification optical system of the present embodiment, all the lenses belonging to the first region are movable at a time of focusing.

In this case, all the lenses belonging to the first region are used as a focusing lens unit. When all the lenses belonging to the second region are regarded as one lens unit, the focusing lens unit having a negative refractive power can be disposed between the third lens unit having a positive refractive power and the lens unit having a positive refractive power. Therefore, it is possible to increase in the magnification of the focusing lens unit. As a result, focus sensitivity in the focusing lens unit can be increased. Focus sensitivity refers to the ratio of the amount of movement of an image on an image forming surface to the amount of movement of the focusing lens unit. The amounts of movement are measured in an optical axis direction.

Since it is possible to make focus sensitivity high, it is possible to perform focusing with a smaller amount of movement. Moreover, the variation in imaging performance at a time of focusing can be also reduced. Thus, it is possible to perform focusing at a high speed while favorable imaging performance being maintained.

In the variable magnification optical system of the present embodiment, only one negative lens may belong to the first region and is movable at a time of focusing.

In this case, all the lenses belonging to the first region are used as a focusing lens unit. By composing a focusing lens unit with one negative lens, it is possible to reduce the weight of the focusing lens unit. As a result, it is possible to perform focusing at a higher speed.

In the variable magnification optical system of the present embodiment, a predetermined negative lens that satisfies the following Conditional Expression (11) can be disposed in the first region:

$$51.0 \le vdGI1N1 \le 100.0 \tag{11}$$

where vdGI1N1 is Abbe number of a predetermined negative lens.

In a case of exceeding a lower limit value of the Conditional Expression (11), it is possible to make small variation in chromatic aberration at the time of focusing, that is, variation in longitudinal chromatic aberration or in chromatic aberration of magnification. Therefore, favorable imaging performance can be obtained at the time of focusing.

As a method for suppressing chromatic aberration, a method in which a positive lens having a higher dispersion than that of the negative lens is disposed in the first region is available. However, when a positive lens is disposed in the first region, the weight of all the lenses belonging to the first region may be increased. By satisfying the Conditional Expression (11), it will be no longer necessary to dispose a high-dispersion positive lens in the first region. In this case, it is possible to prevent the weight of all the lenses belonging to the first region from increasing. Therefore, it is possible to perform focusing at a high speed in a case of performing the focusing by all the lenses belonging to the first region.

In the variable magnification optical system of the present embodiment, all the lenses belonging to the second region can be divided into lenses belonging to a first sub-lens unit and lenses belonging to a second sub-lens unit, the first sub-lens unit has a positive refractive power, and the second sub-lens unit can include a negative lens and a positive lens.

In order to further increase an angle of view at the wide angle end as well as to achieve a high zoom ratio, occurrence amount of chromatic aberration of magnification in all the lenses belonging to the second region as a whole may be reduced. If a part of all the lenses belonging to the second region can be caused to belong to the second sub-lens unit, and the second sub-lens unit can include a negative lens and a positive lens, it is possible to correct chromatic aberration of magnification.

However, when the chromatic aberration of magnification is selectively corrected, astigmatism and/or coma may occur. Accordingly, when only the chromatic aberration of magnification is selectively suppressed, an adverse influence may occur on imaging performance. In this case, the first sub-lens unit having a positive refractive power can be disposed on the object side of the second sub-lens unit. By doing this, it is possible to enhance the aberration correction ability in all the lenses belonging to the second region as a whole. Consequently, it is possible to correct the chromatic aberration of magnification, and to correct the astigmatism and/or the coma.

Disposing the first sub-lens unit and the second sub-lens unit in a separated state can enhance the aberration correction ability in all the lenses belonging to the second region. An air space with a certain width can be provided between the first sub-lens unit and the second sub-lens unit.

In the variable magnification optical system of the present embodiment, the first sub-lens unit can include lenses without an air space.

By doing this, it is possible to reduce the thickness, in the optical axis direction, of all the lenses belonging to the second region as a whole. As a result, it is possible to secure a moving space for lens units that move at a time of changing magnification, and to suppress occurrence of chromatic aberration of magnification of a high order.

In the variable magnification optical system of the present embodiment, the second sub-lens unit can include a negative lens and a positive lens.

In the variable magnification optical system of the present embodiment, the negative lens and the positive lens in the second sub-lens unit can be cemented together.

By doing this, it is possible to suppress occurrence of coma of a high order or occurrence of astigmatism of a high order.

In the variable magnification optical system of the present embodiment, the following Conditional Expression (12) can be satisfied:

$$0.1 \leq fGI2SUB1/fGI2 \leq 3.0 \tag{12}$$

where
fI2SUB1 is a focal length of the first sub-lens unit, and
fGI2 is a focal length on the basis of all the lenses belonging to the second region.

By satisfying Conditional Expression (12), it is possible to suppress occurrence of coma or occurrence of astigmatism.

The focal length on the basis of all the lenses belonging to the second region is the inverse of the refractive power on the basis of all the lenses belonging to the second region. Thus, the focal length in a case where only one lens belongs to the second region or a plurality of lenses belong to the second region can be obtained on the basis of the same concept used for obtaining the refractive power on the basis of all lenses belonging to the second region.

In the variable magnification optical system of the present embodiment, the following Conditional Expression (13) can be satisfied:

$$0.1 \leq |fGI2SUB1/fGI1| \leq 3.0 \tag{13}$$

where
fGI2SUB1 is the focal length of the first sub-lens unit, and
fGI1 is a focal length on the basis of all the lenses belonging to the first region.

By satisfying Conditional Expression (13), it is possible to suppress occurrence of coma or occurrence of astigmatism. In addition, in a case of performing the focusing by all the lenses belonging to the first region, it is possible to reduce variation in curvature of field at a time of focusing.

The focal length on the basis of all the lenses belonging to the first region is the inverse of the refractive power on the basis of all the lenses belonging to the first region. Thus, the focal length in a case where only one lens belongs to the first region or a plurality of lenses belong to the first region can be obtained on the basis of the same concept used for obtaining the refractive power on the basis of all lenses belonging to the first region.

In the variable magnification optical system of the present embodiment, the following Conditional Expression (14) can be satisfied:

$$0.020 \leq DGI2SUB12a/fGI2 \leq 0.5 \tag{14}$$

where
DGI2SUB12a is an air space between the first sub-lens unit and the second sub-lens unit, and
fGI2 is the focal length on the basis of all the lenses belonging to the second region.

In a case of falling below an upper limit value of the Conditional Expression (14), it is possible to reduce the thickness, in the optical axis direction, of all the lenses belonging to the second region as a whole. Therefore, it is possible to secure a moving space for lens units that move at a time of changing magnification. As a result, a high magnification ratio can be ensured.

In the variable magnification optical system of the present embodiment, the following Conditional Expression (15) can be satisfied:

$$0.1 \leq DGI2SUB12a/fw \leq 2.0 \tag{15}$$

where
DGI2SUB12a is the air space between the first sub-lens unit and the second sub-lens unit, and
fW is the focal length of the variable magnification optical system at the wide angle end.

In a case of exceeding a lower limit value of the Conditional Expression (15), it is possible to suppress occurrence of coma or occurrence of astigmatism.

In a case of falling below an upper limit value of the Conditional Expression (15), it is possible to reduce the thickness, in the optical axis direction, of all the lenses belonging to the second region as a whole. Therefore, it is possible to secure a moving space for lens units that move at a time of changing magnification. As a result, a high magnification ratio can be ensured.

In the variable magnification optical system of the present embodiment, the first sub-lens unit can be moved in a direction orthogonal to the optical axis.

When the image pickup apparatus is held with the hand, the image pickup apparatus may be shaken due to camera shake in some cases. When a shake is applied to the optical system due to camera shake, a clear image cannot be obtained due to influence of the shake. Image stabilization may be performed in the optical system, to obtain a clearer image with higher resolution.

For example, in the case where the image pickup apparatus is fixed on a tripod or the image pickup apparatus is fixed on the external wall of a building, when a shake occurs on the side on which the image pickup apparatus is fixed, the shake may be transmitted to the image pickup apparatus. Such a shake may be regarded as the same as a shake caused by camera shake. Accordingly, such a shake in the above case may be regarded as being included in a shake caused by camera shake.

As described above, all the lenses belonging to the second region can be divided into lenses belonging to the first sub-lens unit and lenses belonging to the second sub-lens unit. If such a structure can be adopted, it is possible to correct chromatic aberration of magnification, astigmatism, and coma as described above. Furthermore, if such a structure can be adopted, it is possible to dispose the first sub-lens unit closer to the image side, and to dispose all the lenses belonging to the first region having a negative refractive power in proximity to the object side of the first sub-lens unit having a positive refractive power. Therefore, it is possible to make the magnification of the first sub-lens unit to be high.

Enhancing the magnification of the first sub-lens unit can enhance the ratio of the movement amount when the lens or the lens unit is moved in a perpendicular direction with respect to the optical axis to the movement amount of the image on the image surface (hereinafter referred to as "image stabilization sensitivity"), in the first sub-lens unit. For this reason, it is possible to perform image stabilization in the first sub-lens unit. As described above, adopting the structure of dividing all the lenses belonging to the second region into two sub-lens unit enables image stabilization with a small movement amount. In addition, the small movement amount enables image stabilization with higher followability.

In addition, when the lens unit moved at the time of changing magnification includes a lens performing image stabilization, an error may occur in the detected camera shake amount, due to change of the lens position caused by changing magnification. When all the lenses belonging to the second region are fixed at the time of changing magnification, it is possible to educe an error.

In the variable magnification optical system of the present embodiment, the first sub-lens unit may consist of one positive lens.

In the variable magnification optical system of the present embodiment, the following Conditional Expression (16) can be satisfied:

$$0.3 < |MGI2SUB1back \times (MGI2SUB1-1)| < 1.5 \quad (16)$$

where

MGGI2SUB1back is a lateral magnification of a predetermined optical system,

MGGI2SUB1 is a lateral magnification of the first sub-lens unit, the predetermined optical system is an optical system including entire lenses positioned closer to the image side than the first sub-lens unit is, and the lateral magnification is lateral magnification obtained at a time of focusing to an object at infinity.

By satisfying the Conditional Expression (16), it is possible to suppress occurrence of astigmatism or occurrence of coma. By exceeding a lower limit value of the Conditional Expression (16), it is possible to improve the image stabilization sensitivity. In this case, because the movement amount of the first sub-lens unit can be reduced, it is possible to improve followability of the first sub-lens unit to camera shake.

In the variable magnification optical system of the present embodiment, the first sub-lens unit includes a positive lens, and the following Conditional Expression (17) can be satisfied:

$$52 \le vdGI2SUB1P \le 100 \quad (17)$$

where vdGI2SUB1P is Abbe number of the positive lens in the first sub-lens unit.

In a case of exceeding a lower limit of Conditional Expression (17), it is possible to suppress occurrence of chromatic aberration of magnification. Moreover, in a case of performing image stabilization with the first sub-lens unit, it is possible to suppress occurrence of chromatic aberration.

In the variable magnification optical system of the present embodiment, the first sub-lens unit can include one positive lens.

By doing this, it is possible to reduce the weight of the first sub-lens unit. As a result, in a case of performing image stabilization with the first sub-lens unit, it is possible to improve followability with respect to camera shake.

In the variable magnification optical system of the present embodiment, the first sub-lens unit can include one positive lens, and the second sub-lens unit can include one negative lens and one positive lens.

By doing this, it is possible to correct the chromatic aberration of magnification, and to suppress occurrence of the astigmatism and/or occurrence of the coma. Moreover, it is possible to reduce the thickness, in the optical axis direction, of all the lenses belonging to the second region as a whole. Therefore, it is possible to secure a moving space for lens units that move at a time of changing magnification. As a result, a high magnification ratio can be ensured.

In the variable magnification optical system of the present embodiment, the following Conditional Expression (18) can be satisfied:

$$18.0 \le vdGI2SUB2N \le 100 \quad (18)$$

where vdGI2SUB2N is minimum. Abbe number among Abbe numbers of negative lenses in the second sub-lens unit.

In a case of exceeding a lower limit value of the Conditional Expression (18), occurrence of a secondary spectrum can be suppressed. Moreover, occurrence of the chromatic aberration of magnification can be suppressed.

In the variable magnification optical system of the present embodiment, the aperture stop can be disposed closer to the image side than the second lens unit is, and closer to the object side than the surface closest to the image side in the third lens unit is.

Thus, the diameters of the first lens unit, the second lens unit, and the third lens unit can be reduced. Furthermore, since the arrangement of refractive powers can be symmetric with respect to the third lens unit and the aperture stop, it is possible to reduce the overall length of the optical system.

In the variable magnification optical system of the present embodiment, the aperture stop can be disposed between the second lens unit and the third lens unit.

Thus, the diameters of the first lens unit, and the diameters of the second lens unit can be reduced.

In the variable magnification optical system of the present embodiment, the aperture stop is fixable at a time of changing magnification.

When the aperture stop is fixed at the time of changing magnification, it is possible to reduce abrupt change in the F-number due to changing magnification. Consequently, even in a case where F-number is small, a stable light amount can be secured in a broad range of the variable magnification range.

Moreover, electrical means may be used for changing the aperture diameter of the aperture stop. An example of the electric means includes an electric wire for transmitting electric signals. When the aperture stop is fixed at the time of changing magnification, since it is possible to reduce the movement amount of the aperture stop, it is possible to reduce change in length of the electrical wire. Consequently, it is possible to achieve electrical means with a structure with high durability.

In the variable magnification optical system of the first embodiment and the variable magnification optical system of the second embodiment, the first lens unit is fixable at a time of changing magnification.

In the variable magnification optical system of the present embodiment, the following Conditional Expression (19) can be satisfied:

$$2.0 \leq fG1/fG3 \leq 10.0 \tag{19}$$

where fG1 is the focal length of the first lens unit, and fG3 is the focal length of the third lens unit.

In a case of exceeding a lower limit value (19), the magnifying effect of the third lens unit can be increased. Therefore, a high magnification ratio can be ensured.

In a case of falling below an upper limit value of the Conditional Expression (19), the occurrence of spherical aberration or occurrence of coma in the third lens unit is suppressed. As a result, small F-number can be obtained.

In the variable magnification optical system of the present embodiment, the following Conditional Expression (20) can be satisfied:

$$0.5 \leq |fG3/fGI1| \leq 2.0 \tag{20}$$

where fG3 is the focal length of the third lens unit, and fGI1 is the focal length on the basis of all the lenses belonging to the first region.

In a case of exceeding a lower limit value of the Conditional Expression (20), it is possible to suppress occurrence of curvature of field in all the lenses belonging to the second region as a whole. As a result, favorable imaging performance can be obtained across a broad range of the variable magnification range.

In a case of falling below an upper limit value of the Conditional Expression (20), it is possible to suppress occurrence of astigmatism in all the lenses belonging to the second region as a whole does not increase. As a result, it is possible to suppress a biased blur state of the image due to an assembly error.

In the variable magnification optical system of the present embodiment, the following Conditional Expression (21) can be satisfied:

$$0.20 \leq fG2/fGI1 \leq 2.0 \tag{21}$$

where fG2 is the focal length of the second lens unit, and fGI1 is the focal length on the basis of all the lenses belonging to the first region.

In a case of exceeding a lower limit value of Conditional Expression (21), it is possible to suppress occurrence of chromatic aberration of magnification in the second lens unit. In a case of falling below an upper limit value of Conditional Expression (21), it is possible to enhance the zooming function in the second lens unit. Therefore, a high magnification ratio can be ensured.

In the variable magnification optical system of the present embodiment, the following Conditional Expression (22) can be satisfied:

$$0.20 \leq |fG2/fG3| \leq 2.0 \tag{22}$$

where fG2 is the focal length of the second lens unit, and fG3 is the focal length of the third lens unit.

In a case of exceeding a lower limit value of Conditional Expression (22), it is possible to suppress occurrence of chromatic aberration of magnification in the second lens unit. In a case of falling below an upper limit value of Conditional Expression (22), it is possible to enhance the zooming function in the second lens unit. Therefore, a high magnification ratio can be ensured.

In the variable magnification optical system of the present embodiment, the following Conditional Expression (23) can be satisfied:

$$0.5 \leq |fGI1/fGI2| \leq 2.0 \tag{23}$$

where fGI1 is the focal length on the basis of all the lenses belonging to the first region, and fGI2 is the focal length on the basis of all the lenses belonging to the second region.

In a case of exceeding a lower limit value of the Conditional Expression (23), it is possible to make F-number small. In a case of falling below an upper limit value of the Conditional Expression (23), it is possible to suppress occurrence of astigmatism.

In the variable magnification optical system of the present embodiment, the third lens unit can move to be positioned closer to the object side at the telephoto end than at the wide angle end.

By doing this, it is possible to enhance the zooming function in the third lens unit. Therefore, a high magnification ratio can be ensured.

In the variable magnification optical system of the first embodiment, the variable magnification optical system of the second embodiment, the variable magnification optical system of the fourth embodiment, the variable magnification optical system of the fifth embodiment, and the variable magnification optical system of the eighth embodiment to the variable magnification optical system of the thirteenth embodiment, the first lens unit can include a negative lens and a positive meniscus lens having a convex surface facing the object side.

By doing this, the operation effects described on the variable magnification optical system of the third embodiment can be provided.

In the variable magnification optical system of the present embodiment, the first lens unit can further include one positive lens. Moreover, in the variable magnification optical system of the present embodiment, the first lens unit can include a negative lens and two positive lenses.

By doing this, it is possible to suppress occurrence of spherical aberration in the first lens unit in the vicinity of the telephoto end. Thus, a high zoom ratio can be ensured. Furthermore, at least one of the two positive lenses can be a meniscus lens having a convex surface facing the object side. By doing this, it is possible to correct spherical aberration and to reduce variation of astigmatism occurring at a time of changing magnification.

In the variable magnification optical system of the present embodiment, the first lens unit can include a negative lens and a positive lens, in order from the object side. In the variable magnification optical system of the present embodiment, the negative lens and the positive lens can be disposed in proximity to each other, and the following Conditional Expression (24) can be satisfied:

$$-0.1 \leq fG1 \times PG1NPa \leq 0.27 \qquad (24)$$

where
fG1 is the focal length of the first lens unit,
PG1NPa is represented by the following expression:

$$PG1NPa=1/RG1NB-1/RG1PF, \text{ where}$$

RG1NB is a radius of curvature of an image-side lens surface of the negative lens in the first lens unit, and
RG1PF is a radius of curvature of an object-side lens surface of the positive lens in the first lens unit.

In a case of exceeding a lower limit value of the Conditional Expression (24), it is possible to suppress occurrence of astigmatism near the telephoto end. In a case of falling below an upper limit value of the Conditional Expression (24), it is possible to suppress occurrence of spherical aberration near the telephoto end.

In the variable magnification optical system of the present embodiment, the negative lens in the first lens unit and the positive lens in the first lens unit can be cemented together.

By doing this, it is possible to correct chromatic aberration.

In the variable magnification optical system of the present embodiment, the following Conditional Expression (25) can be satisfied:

$$2.0 \leq fGI2SUB1/fw \leq 12 \qquad (25)$$

where
fGI2SUB1 is the focal length of the first sub-lens unit, and
fW is the focal length of the variable magnification optical system at the wide angle end.

By doing this, it is possible to suppress occurrence of astigmatism or occurrence of coma.

In the variable magnification optical system of the present embodiment, the following Conditional Expression (26) can be satisfied:

$$-1 \leq SFGI2SUB1 \leq 0.95 \qquad (26)$$

where
SFGI2SUB1 is represented by the following expression:

$$SFGI2SUB1=(RGI2SUB1f+RGI2SUB1r)/(RGI2SUB1f-RGI2SUB1r), \text{ where}$$

RGI2SUB1f is a radius of curvature of the lens surface positioned closest to the object side in the first sub-lens unit, and
RGI2SUB1r is a radius of curvature of the lens surface positioned closest to the image side in the first sub-lens unit.

By satisfying Conditional Expression (26), it is possible to suppress occurrence of astigmatism or occurrence of coma in the first sub-lens unit. in a case of performing image stabilization with the first sub-lens unit, since asymmetry of spherical aberration or asymmetry of astigmatism increases, favorable imaging performance can be obtained.

In the variable magnification optical system of the present embodiment, the following Conditional Expression (27) can be satisfied:

$$0.03 \leq \Delta G3M/LTLw \leq 0.3 \qquad (27)$$

where
ΔG3M is an amount of movement of the third lens unit moved from the wide angle end to the telephoto end, and
LTLw is the overall length of the variable magnification optical system at the wide angle end.

In a case of exceeding a lower limit value of Conditional Expression (27), zoom action in the third lens unit can be obtained. Thus, a high zoom ratio can be ensured.

In a case of falling below an upper limit value of Conditional Expression (27), since the amount of movement of lens units that move at a time of changing magnification can be reduced, the speed of changing magnification is improved. Furthermore, in a case of ensuring a small F-number in the vicinity of the telephoto end in particular, the diameter of the third lens unit can be reduced. Therefore, it is possible to reduce occurrence of spherical aberration in the third lens unit.

In the variable magnification optical system of the fifth embodiment, the variable magnification optical system of the sixth embodiment, and the variable magnification optical system of the ninth embodiment to the variable magnification optical system of the thirteenth embodiment, the third lens unit can include a positive lens and a negative lens.

By doing this, the operation effects described on the variable magnification optical system of the first embodiment can be provided.

In the variable magnification optical system of the first embodiment to the variable magnification optical system of the eighth embodiment, and the variable magnification optical system of the eleventh embodiment to the variable magnification optical system of the thirteenth embodiment, the following Conditional Expression (28) can be satisfied:

$$33.4° \leq \Omega Hw/2 \leq 70.0° \qquad (28)$$

where
ΩHw is the total angle of view in the horizontal direction at the wide angle end.

The technical meaning of Conditional Expression (28) is the same as the technical meaning of Conditional Expression (28-1).

In the variable magnification optical systems of the first embodiment to the variable magnification optical systems of the eighth embodiment, the following Conditional Expression (29) can be satisfied:

$$5.0 \leq ft/fw \leq 120.0 \qquad (29)$$

where
ft is the focal length of the variable magnification optical system at the telephoto end, and
fW is the focal length of the variable magnification optical system at the wide angle end.

The technical meaning of Conditional Expression (29) is the same as the technical meaning of Conditional Expression (29-1).

In the variable magnification optical system of the first embodiment to the variable magnification optical system of the ninth embodiment, the variable magnification optical system of the twelfth embodiment, and the variable magnification optical system of the thirteenth embodiment, the following Conditional Expression (30) can be satisfied:

$$0.60 \leq FNOw \leq 2.5 \qquad (30)$$

where
FNOw is an F-number at the wide angle end.

The technical meaning of Conditional Expression (30) is the same as the technical meaning of Conditional Expression (30-1).

In the variable magnification optical system of the present embodiment, the following Conditional Expression (31) can be satisfied:

$$0.70 \leq FNOt \leq 5.5 \qquad (31)$$

where

FNOt is an F-number at the telephoto end.

The technical meaning of Conditional Expression (31) is as described above.

In the variable magnification optical system of the present embodiment, the aperture stop is movable only in one direction or is fixable at a time of changing magnification.

At a time of changing magnification, the aperture stop is movable along the optical axis. At the time of changing magnification, when the movement direction of the aperture stop is reversed in the middle, an error may occur in the position of the aperture stop with respect to the image surface. An error of the position is caused by backlash, for example, in the movement mechanism using a gear. The position of the aperture stop can be always stabilized by setting the movement direction of the aperture stop only in one direction at the time of changing magnification. The F-number is changed together with changing magnification. When the position of the aperture stop is stabilized, the position of the aperture stop can be made agree or substantially agree with the position at a time of design. Consequently, it is possible to reduce an error at a time when the F-number is changed.

When F-number is made small, flare easily occurs. At the time of changing magnification, when the position of the aperture stop can be fixed, an error caused when the F-number is changed can be further reduced. Consequently, occurrence of flare can be reduced.

In the variable magnification optical system of the present embodiment, a negative lens and a positive lens can be caused to belong to the second region.

In a case where chromatic aberration of magnification is large in all lenses belonging to the second region as a whole, this chromatic aberration of magnification can be suppressed mainly in the second lenmay increase the variation in chromatic aberration of magnification at a time of changing magnification can be increased. Thus, a case where obtaining favorable imaging performance in a broad range of the variable magnification range is difficult may occur.

In order to further increase an angle of view at the wide angle end as well as to ensure a high zoom ratio, it is preferable that occurrence amount of chromatic aberration of magnification in all lenses belonging to the second region be reduced. By making a negative lens and a positive lens to be included in the second region, it is possible to correct chromatic aberration of magnification.

In the variable magnification optical system of the first embodiment, the variable magnification optical system of the third embodiment to the variable magnification optical system of the eighth embodiment, the variable magnification optical system of the tenth embodiment, and the variable magnification optical system of the eleventh embodiment, the following Conditional Expression (32) can be satisfied:

$$0.04 \leq \Sigma G1/LTLw \leq 0.35 \qquad (32)$$

where

ΣG1 is the thickness of the first lens unit, and

LTLw is the overall length of the variable magnification optical system at the wide angle end.

The technical meaning of Conditional Expression (32) is as described above.

In the variable magnification optical system of the first embodiment to the variable magnification optical system of the eleventh embodiment, and the variable magnification optical system of the thirteenth embodiment, the following Conditional Expression (33) can be satisfied:

$$0.0 \leq ft/fw + 143.9 \times \tan(\Omega Hw/2) - 121.88 \leq 110 \qquad (33)$$

where fW is the focal length of the variable magnification optical system at the wide angle end, ft is the focal length of the variable magnification optical system at the telephoto end, and ΩHw is the total angle of view in the horizontal direction at the wide angle end.

The technical meaning of Conditional Expression (33) is as described above.

In the variable magnification optical system of the first embodiment to the variable magnification optical system of the twelfth embodiment, the following Conditional Expression (34) can be satisfied:

$$0.0 \leq ft/fw + 126.52 \times \tan(\Omega Hw/2) - 101.91 \leq 120 \qquad (34)$$

where fW is the focal length of the variable magnification optical system at the wide angle end, ft is the focal length of the variable magnification optical system at the telephoto end, and ΩHw is the total angle of view in the horizontal direction at the wide angle end.

The technical meaning of Conditional Expression (34) is as described above.

The image pickup apparatus according to the present embodiment includes an optical system, and an image pickup element having an image pickup surface and converting an image formed on the image pickup surface with the optical system into an electrical signal, wherein the optical system is the variable magnification optical system according to the present embodiment.

It is possible to provide an image pickup apparatus capable of acquiring an image of high image quality.

In the image pickup apparatus according to the present embodiment, the following Conditional Expression (35) can be satisfied:

$$2.5 \text{ mm} \leq Rimg \leq 22.0 \text{ mm} \qquad (35)$$

where

Rimg is the radius of an image circle at an image pickup element.

The technical meaning of Conditional Expression (35) is as described above.

The variable magnification optical system of the present embodiment includes a predetermined resin negative lens that has an aspheric surface and satisfies the following Conditional Expression (36), and the predetermined resin negative lens can be disposed in the first region:

$$1.4 \leq ndGl1N1 \leq 1.55 \qquad (36)$$

where ndGl1N1 is a refractive index on d-line of the predetermined resin negative lens.

By disposing a resin negative lens in the first region, it is advantageous for cost reduction. Specifically, by configuring a resin negative lens as an aspheric lens, it is advantageous for both ensuring high imaging performance and cost reduction.

By ensuring a refractive index of the predetermined resin negative lens so as not to fall below a lower limit value of Conditional Expression (36), it becomes easy to ensure the negative refractive power of the predetermined resin negative lens sufficiently. By making so as not to exceed an upper limit value of Conditional Expression (36), it is advantageous for reduction in the material cost of the negative lens.

The variable magnification optical system of the present embodiment includes a predetermined resin positive lens that has an aspheric surface and satisfies the following Conditional Expression (37), and the predetermined resin positive lens can be a positive lens positioned closest to the object side among the positive lenses in the first sub-lens unit:

$$1.4 \le ndGI2SUB1P \le 1.55 \qquad (37)$$

where
ndGI2SUB1P is a refractive index on d-line of the predetermined resin positive lens.

By disposing a resin positive lens in the first sub-lens unit, it is advantageous for cost reduction. Specifically, by configuring a resin positive lens as an aspheric lens, it is advantageous for both ensuring high imaging performance and cost reduction.

By ensuring refractive index of the predetermined resin positive lens so as not to fall below a lower limit value of Conditional Expression (37), it becomes easy to ensure the positive refractive power of the predetermined resin positive lens sufficiently. By making so as not to exceed an upper limit value of Conditional Expression (37), it is advantageous for a reduction in the material cost of the positive lens.

In variable magnification optical system of the present embodiment, the second lens unit consists of, in order from the object side, a first negative lens, a second negative lens, and a cemented doublet lens, the second negative lens consists of a resin negative lens, the cemented doublet lens consists of a negative lens and a positive lens, and the following Conditional Expression (38) can be satisfied:

$$0.7 \le |fG22/RG2C| \le 2 \qquad (38)$$

where
fG22 is a focal length of the second negative lens, and
RG2C is a radius of paraxial curvature of the cemented surface of the cemented doublet lens.

The second lens unit consists of, in order from the object side, the first negative lens, the second negative lens, and the cemented doublet lens. By using a resin negative lens for the second negative lens, it is advantageous for cost reduction. Furthermore, by disposing the cemented doublet lens in the second lens unit, it is possible to correct sufficiently chromatic aberration that is not corrected in a resin negative lens.

By making so as not to fall below a lower limit value of Conditional Expression (38), the absolute value of the radius of curvature of the cemented surface of the cemented doublet lens is made to be small. By doing this, it becomes easy to reduce chromatic aberration of magnification. A sufficient negative refractive power of the second negative lens is ensured so as not to exceed an upper limit value of Conditional Expression (38). By doing this, since the negative refractive power in the negative lens unit can be shared with a plurality of negative lenses, it is advantageous for correction of astigmatism or correction of coma.

The resin negative lens can be configured as an aspheric lens. By doing this, it is advantageous for both ensuring high imaging performance and cost reduction.

In the variable magnification optical system of the present embodiment, the second lens unit consists of, in order from the object side, the first negative lens, the second negative lens, and the cemented doublet lens, the cemented doublet lens consists of the negative lens and the positive lens, a lens belonging to the second region consists of one positive lens, and the following Conditional Expression (39) and is satisfied:

$$0.7 \le RG2C/fGI2 \le 1.9 \qquad (39)$$

where
RG2C is the radius of paraxial curvature of the cemented surface of the cemented doublet lens, and
fGI2 is the focal length on the one positive lens belonging to the second region.

The second lens unit consists of, in order from the object side, the first negative lens, the second negative lens, and the cemented doublet lens. By doing this, it becomes easy to suppress occurrence of off-axis aberration, and to perform sufficiently correction of chromatic aberration of magnification even when a lens in the second region is to be one positive lens.

By making so as not to fall below a lower limit value of Conditional Expression (39), an appropriated positive refractive power in the second region can be ensured. In addition, when an image pickup element is disposed on an image surface, an inclination of a ray incident on an image pickup surface can easily be reduced. By making so as not to exceed an upper limit value of Conditional Expression (39), it is possible to obtain sufficiently effect of correction of chromatic aberration of magnification on the cemented surface.

The first lens unit may include, in order from the object side, a negative meniscus lens having a convex surface facing the object side, a positive lens having an object-side surface being convex on the object side, and a positive meniscus lens having a convex surface facing the object side.

In the second lens unit, the lens closest to the object side may be a negative lens having an image-side surface being convex on the object side. The second lens unit may include, in order from the image side, a biconvex positive lens, and a negative lens having an object-side surface that is a concave surface facing the object side. The second lens unit may include, in order from the object side, a negative lens, a negative lens, and a positive lens. Specifically, the second lens unit may include a negative lens having an image-side surface that is a concave surface facing the image side, a biconcave negative lens, and a biconvex positive lens.

In the third lens unit, the lens closest to the object side may be a positive lens having an object-side surface that is a convex surface facing the object side. In the third lens unit, the lens closest to the image side may be a biconvex positive lens. The third lens unit may include, in order from the object side, a positive lens, a negative lens, and a positive lens. Specifically, the third lens unit may include, in order from the object side, a positive lens having an object-side surface that is a convex surface facing the object side, a negative meniscus lens having a convex surface facing the object side, and a biconvex positive lens.

A biconcave negative lens may belong to the first region.

The lens belonging to the second region and closest to the object side may be a biconvex positive lens. The lens belonging to the second region and closest to the image side may have an object-side surface that is a convex surface facing the object side. To the second region, in order from the object side, a positive lens, a negative lens, and a positive lens may belong. Specifically, to the second region, a biconvex positive lens, a negative meniscus lens having a convex surface facing the object side, and a positive lens having an object-side surface that is a convex surface facing the object side, may belong.

The distance between the first lens unit and the second lens unit may be widened at a time of changing magnification from the wide angle end to the telephoto end. The distance between the second lens unit and the third lens unit may be narrowed at a time of changing magnification from the wide angle end to the telephoto end. The distance between the third lens unit and all lenses belonging to the first region as a whole may be widened at a time of changing magnification from the wide angle end to the telephoto end.

Examples of the image pickup apparatus are a digital camera, a video camera, a monitoring camera, and a camera for a television conference system.

Imaging needs in digital cameras and video cameras include, for example, two imaging needs. The first one is a demand for imaging a large building, and a demand for shooting a commemorative picture with a vast background. The second one is a demand for imaging with one imaging lens from imaging of a wide range to enlarged imaging of a subject.

To satisfy the first need, the view angle of the optical system may be increased. To satisfy the second need, the magnification ratio of the optical system may be increased. As an exemplary optical system satisfying these two needs, a variable magnification optical system having a half angle of view of 33 degrees or greater, and a magnification ratio of five times or higher is available. A variable magnification optical system having such specifications can be said to be an easy-to-use variable magnification optical system, because such an optical system can be used for various applications in capturing images.

Examples of needs in a monitoring camera include monitoring in a wider range, and monitoring with a higher magnification. For example, monitoring with a higher magnification enables easy identification of the numbers of the license plate, and identification of the person.

Other needs in the television conference system include a need for a capability for enabling users to see the entire conference room, or for seeing a part of the conference room more in detail.

Based on these, there might be greater needs for optical systems with a greater angle of view at the wide angle end, and with a magnification ratio exceeding five times, in applications for such image pickup apparatuses.

Moreover, there are cases where mobility is important in digital cameras and video cameras. Herein, the mobility indicates, for example, easy portability, stability in hand-held shooting, and high focus speed. To achieve excellent mobility of the apparatus, the optical system may have a small size and light weight. Moreover, in a monitoring camera, the optical system may be required to achieve reduction in size and reduction in diameter, because the place in which the monitoring camera is installed may be limited.

Moreover, when the image pickup apparatus may be shaken due to camera shake, in a case of capturing images at a low speed, the images may become blurry in some cases. In order to obtain clear images, F-number may be made small.

The variable magnification optical system according to the present embodiment can mainly be used for an optical system of an image pickup apparatus using an electronic image pickup element. In this case, the half angle of view can be set to 40° or more. The half angle of view may be set to 42° or more. The following is correspondence between the half angle of view and the focal length.

| Half Angle of View | Focal Length |
|---|---|
| 40° or more | 25.7 mm or less |
| 42° or more | 24 mm or less |

The variable magnification optical system according to the present embodiment can secure a wide angle of view at the wide angle end and a small F-number, and enables favorable correction of aberrations. In addition, the variable magnification optical system according to the present embodiment achieves excellent mobility and excellent degree of freedom of installment, and includes an optical system with a small size and a small diameter. The variable magnification optical system according to the present embodiment can provide an image pickup optical system effective for stable imaging and rapid imaging without missing an imaging chance.

The variable magnification optical system and the optical apparatus described above can satisfy a plurality of structures simultaneously. In this manner, a favorable variable magnification optical system and a favorable optical apparatus can be obtained. Any combination of the structure may be adopted. For each of the conditional expressions, only the upper limit value or the lower limit value of the numerical value range of a more limited conditional expression can be limited.

At least one of Conditional Expressions (5) to (35) can be combined with the basic configurations of the variable magnification optical system of the present embodiment. From this combination, Conditional Expressions (1-1) to (1-3), (2-1), (2-2), (3), and (4) can be excluded.

For each of conditional expressions, the lower limit value or the upper limit value may be changed as follows.

The following applies to Conditional Expressions (1-1), (1-2), and (1-3).

The lower limit value can be set any one of 1.60, 1.65, 1.71, 1.77, 1.78, 1.80, 1.91, 1.95, 2.00, 2.10, 2.12, 2.20, 2.29, and 2.50.

The upper limit value can be set any one of 8.26, 6.53, 4.79, 4.50, 4.20, 4.00, 3.80, 3.50, and 3.06.

The following applies to Conditional Expressions (2-1) and (2-2).

The upper limit value can be set any one of 0.099, 0.088, 0.076, 0.07, 0.065, 0.050, and 0.030.

The following applies to Conditional Expression (3).

The lower limit value can be set any one of −0.065, −0.060, −0.056, −0.050, −0.046, −0.035, and −0.020.

The upper limit value can be set any one of 0.190, 0.164, 0.150, 0.121, 0.080, 0.077, 0.050, and 0.03.

The following applies to Conditional Expressions (4-1) and (4-2).

The lower limit value can be set any one of 4.0, 5.5, 6.0, 7.9, 8.0, 8.7, 9.0, 9.7, 10.0, 10.3, 10.7, 11.0, 11.7, and 12.71.

The upper limit value can be set any one of 42.9, 35.7, 35.0, 30.0, 28.6, 27.0, 25.0, and 21.46.

The following applies to Conditional Expression (5).

The lower limit value can be set any one of −0.16, −0.11, −0.07, −0.05, −0.03, and 0.00.

The upper limit value can be set any one of 0.40, 0.35, 0.30, 0.25, 0.14, 0.11, 0.05, and 0.03.

The following applies to Conditional Expression (6).

The lower limit value can be set any one of 0.3, 0.5, 0.6, 0.7, 0.8, and 0.90.

The upper limit value can be set any one of 2.6, 2.5, 2.3, 2.0, 1.9, 1.8, and 1.57.

The following applies to Conditional Expression (7).

The lower limit value can be set any one of 2.7, 3.5, 3.6, 4.0, 4.5, 4.6, and 5.54.

The upper limit value can be set any one of 8.7, 8.4, 8.2, 7.8, and 7.33.

The following applies to Conditional Expression (8).

The lower limit value can be set any one of 1.5, 2.0, 2.1, 2.5, 2.6, and 3.15.

The upper limit value can be set any one of 8.1, 8.0, 7.5, 7.2, 7.0, 6.5, 6.4, and 5.49.

The following applies to Conditional Expression (9) (unit: %).

The lower limit value can be set any one of −13, −12, −11, and −9.80.

The upper limit value can be set any one of 3, 0, −2, and −4.69.

The following applies to Conditional Expression (10).

The lower limit value can be set any one of 64, 65, 66, 67, 68.63, 70, 74, and 80.

The upper limit value can be set any one of 95, 91, 86, and 81.54.

The following applies to Conditional Expression (11).

The lower limit value can be set any one of 53.1, 54, 55.2, 56, 57.3, 59, 59.38, and 65.

The upper limit value can be set any one of 95.4, 90.8, 86.2, and 81.54.

The following applies to Conditional Expression (12).

The lower limit value can be set anyone of 0.3, 0.5, 0.6, 0.7, 0.8, and 1.04.

The upper limit value can be set any one of 2.6, 2.5, 2.2, 2.0, 1.8, 1.6, and 1.44.

The following applies to Conditional Expression (13).

The lower limit value can be set any one of 0.3, 0.5, 0.6, 0.7, 0.87, and 0.9.

The upper limit value can be set anyone of 2.6, 2.5, 2.2, 2.0, 1.8, 1.6, and 1.34.

The following applies to Conditional Expression (14).

The lower limit value can be set any one of 0.026, 0.03, 0.04, and 0.06.

The upper limit value can be set any one of 0.43, 0.40, 0.37, 0.35, 0.30, 0.28, and 0.24.

The following applies to Conditional Expression (15).

The lower limit value can be set any one of 0.11, 0.12, 0.13, and 0.15.

The upper limit value can be set any one of 1.75, 1.70, 1.50, 1.49, 1.24, 1.20, and 0.99.

The following applies to Conditional Expression (16).

The lower limit value can be set any one of 0.35, 0.37, 0.40, 0.45, 0.50, 0.52, and 0.60.

The upper limit value can be set any one of 1.33, 1.30, 1.20, 1.15, 1.00, 0.98, and 0.81.

The following applies to Conditional Expression (17).

The lower limit value can be set any one of 54, 55, 56, 58, 59, 59.38, 63, and 67.

The upper limit value can be set any one of 95, 91, 86, and 81.54.

The following applies to Conditional Expression (18).

The lower limit value can be set any one of 18.5, 18.90, 19, 20, 23, and 25.

The upper limit value can be set any one of 91, 82, 73, and 63.85.

The following applies to Conditional Expression (19).

The lower limit value can be set any one of 2.3, 2.6, 2.8, 2.9, and 3.26.

The upper limit value can be set any one of 8.5, 7.0, 6.5, 5.6, 5.5, and 4.09.

The following applies to Conditional Expression (20).

The lower limit value can be set any one of 0.62, 0.7, 0.75, 0.85, 0.87, and 1.00.

The upper limit value can be set any one of 1.8, 1.7, 1.5, and 1.30.

The following applies to Conditional Expression (21).

The lower limit value can be set any one of 0.25, 0.29, 0.35, 0.38, 0.40, 0.47, 0.53, and 0.56.

The upper limit value can be set any one of 1.70, 1.50, 1.40, 1.20, 1.10, 1.00, and 0.80.

The following applies to Conditional Expression (22).

The lower limit value can be set any one of 0.25, 0.27, 0.34, 0.35, 0.40, 0.41, 0.45, and 0.48.

The upper limit value can be set any one of 1.7, 1.50, 1.4, 1.20, 1.00, 0.90, and 0.73.

The following applies to Conditional Expression (23).

The lower limit value can be set any one of 0.63, 0.75, 0.88, and 1.00.

The upper limit value can be set any one of 1.83, 1.65, 1.48, and 1.30.

The following applies to Conditional Expression (24).

The lower limit value can be set any one of −0.05 and −0.01.

The upper limit value can be set any one of 0.2, 0.15, 0.1, and 0.05.

The following applies to Conditional Expression (25).

The lower limit value can be set any one of 2.3, 2.7, 3.0, 3.1, 3.2, 3.35, and 4.0.

The upper limit value can be set any one of 10.5, 10.0, 8.9, 8.0, 7.4, 7.0, and 5.80.

The following applies to Conditional Expression (26).

The lower limit value can be set any one of −0.99, −0.98, −0.97, −0.80, and −0.70.

The upper limit value can be set any one of 0.78, 0.70, 0.50, 0.60, 0.43, 0.30, 0.25, and −0.30.

The following applies to Conditional Expression (27).

The lower limit value can be set any one of 0.04, 0.05, 0.06, and 0.07.

The upper limit value can be set any one of 0.27, 0.25, 0.24, 0.21, 0.20, and 0.18.

The following applies to Conditional Expressions (28), (28-1), and (28-2) (unit: ° (degree)).

The lower limit value can be set any one of 34.7, 35.6, 36.0, 36.1, 36.2, 36.5, 37.0, 37.4, 38.8, 39.0, and 41.0.

The upper limit value can be set any one of 63.8, 57.6, 51.3, and 45.1.

The following applies to Conditional Expressions (29), (29-1), (29-2), (29-3) (29-4), and (29-5).

The lower limit value can be set any one of 6.8, 7.8, 8.6, 9.5, 10.0, 10.2, 10.4, 10.5, 11.0, 12.0, 12.1, 12.5, 13.5, 14.0, 15.0, and 18.0.

The upper limit value can be set any one of 100.0, 65.0, 53.8, 55.0, 45.0, 42.5, 35.0, 31.3, 25.0, 22.0, and 20.0.

The following applies to Conditional Expressions (30), (30-1), and (30-2).

The lower limit value can be set any one of 0.80, 0.85, 0.96, 1.12, 1.27, and 1.43.

The upper limit value can be set any one of 2.31, 2.12, 2.00, 1.92, 1.80, 1.75, 1.73, 1.70, and 1.65.

The following applies to Conditional Expression (31).

The lower limit value can be set any one of 0.80, 1.09, 1.37, 1.66, and 1.94.

The upper limit value can be set any one of 5.28, 5.10, 5.06, 5.00, 4.83, 4.70, 4.61, 4.30, 4.00, and 3.50.

The following applies to Conditional Expressions (32) and (32-1).

The lower limit value can be set any one of 0.05, 0.06, 0.08, and 0.09.

The upper limit value can be set any one of 0.33, 0.30, 0.26, 0.25, 0.21, 0.20, and 0.16.

The following applies to Conditional Expression (33).

The lower limit value can be set anyone of 1.5, 2.0, 2.9, 4.0, 4.4, 5.0, and 5.8.

The upper limit value can be set any one of 100, 92, 75, 73, 70, 60, 55, 50, 40, and 36.8.

The following applies to Conditional Expression (34).

The lower limit value can be set any one of 3.0, 5.9, 7.0, 8.0, 8.9, 10.0, and 11.8.

The upper limit value can be set any one of 100, 90, 80, 70, 59, 55, 50, 40, and 39.3.

The following applies to Conditional Expressions (35) and (35-1) (unit: mm).

The lower limit value can be set any one of 2.8, 3.0, 3.3, 3.4, 3.5, 3.6, 3.8, and 4.1.

The upper limit value can be set any one of 17.5, 13.0, 8.5, and 4.0.

The following applies to Conditional Expression (36).

The lower limit value can be set any one of 1.45 and 1.5.

The upper limit value can be set any one of 1.54 and 1.535.

The following applies to Conditional Expression (37).

The lower limit value can be set any one of 1.45 and 1.5.

The upper limit value can be set any one of 1.54 and 1.535.

The following applies to Conditional Expression (38).

The lower limit value can be set any one of 0.8 and 0.9.

The upper limit value can be set any one of 1.5 and 1.1.

The following applies to Conditional Expression (39).

The lower limit value can be set any one of 1.0 and 1.21.

The upper limit value can be set any one of 1.4 and 1.31.

For Conditional Expressions (36), (37), (38), and (39), limiting the lower limit value or the upper limit value as described above ensures the effects, which is preferable.

The following is detailed explanation of examples of the variable magnification optical system based on drawings. The examples do not limit the present invention.

The following is explanation of lens cross-sectional views of each of the examples.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, FIG. 18A, FIG. 19A, and FIG. 20A show a cross-sectional view at a wide angle end.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, FIG. 18B, FIG. 19B, and FIG. 20B show a cross-sectional view at an intermediate focal length state.

FIG. 10, FIG. 2C, FIG. 3C, FIG. 4C, FIG. 5C, FIG. 6C, FIG. 7C, FIG. 8C, FIG. 9C, FIG. 100, FIG. 11C, FIG. 12C, FIG. 13C, FIG. 14C, FIG. 15C, FIG. 16C, FIG. 17C, FIG. 18C, FIG. 19C, and FIG. 20C show a cross-sectional view at a telephoto end The following is explanation of aberration diagrams of each of the examples.

FIG. 21A, FIG. 22A, FIG. 23A, FIG. 24A, FIG. 25A, FIG. 26A, FIG. 27A, FIG. 28A, FIG. 29A, FIG. 30A, FIG. 31A, FIG. 32A, FIG. 33A, FIG. 34A, FIG. 35A, FIG. 36A, FIG. 37A, FIG. 38A, FIG. 39A, and FIG. 40A show a spherical aberration (SA) at a wide angle end.

FIG. 21B, FIG. 22B, FIG. 233, FIG. 24B, FIG. 25B, FIG. 26B, FIG. 27B, FIG. 28B, FIG. 29B, FIG. 30B, FIG. 31B, FIG. 32B, FIG. 33B, FIG. 34B, FIG. 35B, FIG. 36B, FIG. 37B, FIG. 38B, FIG. 39B, and FIG. 40B show an astigmatism (AS) at a wide angle end.

FIG. 21C, FIG. 22C, FIG. 23C, FIG. 24C, FIG. 250, FIG. 26C, FIG. 27C, FIG. 28C, FIG. 29C, FIG. 30C, FIG. 31C, FIG. 32C, FIG. 33C, FIG. 34C, FIG. 35C, FIG. 36C, FIG. 37C, FIG. 38C, FIG. 39C, and FIG. 40C show a distortion (DT) at a wide angle end.

FIG. 21D, FIG. 22D, FIG. 23D, FIG. 24D, FIG. 25D, FIG. 26D, FIG. 27D, FIG. 28D, FIG. 29D, FIG. 30D, FIG. 31D, FIG. 32D, FIG. 33D, FIG. 34D, FIG. 35D, FIG. 36D, FIG. 37D, FIG. 38D, FIG. 39D, and FIG. 40D show a chromatic aberration of magnification (CC) at a wide angle end.

In addition, FIG. 21E, FIG. 22E, FIG. 23E, FIG. 24E, FIG. 25E, FIG. 26E, FIG. 27E, FIG. 28E, FIG. 29E, FIG. 30E, FIG. 31E, FIG. 32E, FIG. 33E, FIG. 34E, FIG. 35E, FIG. 36E, FIG. 37E, FIG. 38E, FIG. 39E, and FIG. 40E show a spherical aberration (SA) at an intermediate focal length state.

FIG. 21F, FIG. 22F, FIG. 23F, FIG. 24F, FIG. 25F, FIG. 26F, FIG. 27F, FIG. 28F, FIG. 29F, FIG. 30F, FIG. 31F, FIG. 32F, FIG. 33F, FIG. 34F, FIG. 35F, FIG. 36F, FIG. 37F, FIG. 38F, FIG. 39F, and FIG. 40F shows an astigmatism (AS) at an intermediate focal length state.

FIG. 21G, FIG. 22G, FIG. 23G, FIG. 24G, FIG. 25G, FIG. 26G, FIG. 27G, FIG. 28G, FIG. 29G, FIG. 30G, FIG. 31G, FIG. 32G, FIG. 33G, FIG. 34G, FIG. 35G, FIG. 36G, FIG. 37G, FIG. 38G, FIG. 39G, and FIG. 40G show a distortion (DT) at an intermediate focal length state.

FIG. 21H, FIG. 22H, FIG. 23H, FIG. 24H, FIG. 25H, FIG. 26H, FIG. 27H, FIG. 28H, FIG. 29H, FIG. 30H, FIG. 31H, FIG. 32H, FIG. 33H, FIG. 34H, FIG. 35H, FIG. 36H, FIG. 37H, FIG. 38H, FIG. 39H, and FIG. 40H show a chromatic aberration of magnification (CC) at an intermediate focal length state.

In addition, FIG. 21I, FIG. 22I, FIG. 23I, FIG. 24I, FIG. 25I, FIG. 26I, FIG. 27I, FIG. 28I, FIG. 29I, FIG. 30I, FIG. 31I, FIG. 32I, FIG. 33I, FIG. 34I, FIG. 35I, FIG. 36I, FIG. 37I, FIG. 38I, FIG. 39I, and FIG. 40I show a spherical aberration (SA) at a telephoto end.

FIG. 21J, FIG. 22J, FIG. 23J, FIG. 24J, FIG. 25J, FIG. 26J, FIG. 27J, FIG. 28J, FIG. 29J, FIG. 30J, FIG. 31J, FIG. 32J, FIG. 33J, FIG. 34J, FIG. 35J, FIG. 36J, FIG. 37J, FIG. 38J, FIG. 39J, and FIG. 40J show an astigmatism (AS) at a telephoto end.

FIG. 21K, FIG. 22K, FIG. 23K, FIG. 24K, FIG. 25K, FIG. 26K, FIG. 27K, FIG. 28K, FIG. 29K, FIG. 30K, FIG. 31K, FIG. 32K, FIG. 33K, FIG. 34K, FIG. 35K, FIG. 36K, FIG. 37K, FIG. 38K, FIG. 39K, and FIG. 40K show a distortion (DT) at a telephoto end.

FIG. 21L, FIG. 22L, FIG. 23L, FIG. 24L, FIG. 25L, FIG. 26L, FIG. 27L, FIG. 28L, FIG. 29L, FIG. 30L, FIG. 31L, FIG. 32L, FIG. 33L, FIG. 34L, FIG. 35L, FIG. 36L, FIG. 37L, FIG. 38L, FIG. 39L, and FIG. 40L show a chromatic aberration of magnification (CC) at a telephoto end.

Both the lens cross-sectional views and the aberration diagrams are diagrams at a time of focusing to an object at infinity.

A variable magnification optical system of Example 1 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit Gi1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a biconvex positive lens L8, a biconcave negative lens L9, and a biconvex positive lens L10. Here, the biconvex positive lens L8 and the biconcave negative lens L9 are cemented together.

The fourth lens unit G4 includes a biconcave negative lens L11.

The fifth lens unit G5 includes a biconvex positive lens L12, a negative meniscus lens L13 having a convex surface facing the object side, and a biconvex positive lens L14. Here, the negative meniscus lens L13 and the biconvex positive lens L14 are cemented together.

A first sub-lens unit includes the biconvex positive lens L12. A second sub-lens unit includes the negative meniscus lens L13 and the biconvex positive lens L14.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L12 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L11, and both surfaces of the biconvex positive lens L12.

A variable magnification optical system of Example 2 includes, in order from the object side, a first lens unit G1 having a positive refractive power, a second lens unit G2 having a negative refractive power, a third lens unit G3 having a positive refractive power, and an image-side lens unit Gi1 having a positive refractive power. An aperture stop S is disposed between the second lens unit G2 and the third lens unit G3.

The image-side lens unit Gi1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a positive meniscus lens L13 having a convex surface facing the object side. Here, the negative meniscus lens L12 and the positive meniscus lens L13 are cemented together.

A first sub-lens unit includes the biconvex positive lens L11. A second sub-lens unit includes the negative meniscus lens L12 and the positive meniscus lens L13.

At a time of changing magnification, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 3 includes, in order from the object side, a first lens unit G1 having a positive refractive power, a second lens unit G2 having a negative refractive power, a third lens unit G3 having a positive refractive power, and an image-side lens unit Gi1 having a positive refractive power. An aperture stop S is disposed between the second lens unit G2 and the third lens unit G3.

The image-side lens unit Gi1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a positive meniscus lens L13 having a convex surface facing the object side. Here, the negative meniscus lens L12 and the positive meniscus lens L13 are cemented together.

A first sub-lens unit includes the biconvex positive lens L11. A second sub-lens unit includes the negative meniscus lens L12 and the positive meniscus lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 4 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a biconvex positive lens L8, a biconcave negative lens L9, and a biconvex positive lens L10. Here, the biconvex positive lens L8 and the biconcave negative lens L9 are cemented together.

The fourth lens unit G4 includes a biconcave negative lens L11.

The fifth lens unit G5 includes a biconvex positive lens L12, a negative meniscus lens L13 having a convex surface facing the object side, and a biconvex positive lens L14. Here, the negative meniscus lens L13 and the biconvex positive lens L14 are cemented together.

A first sub-lens unit includes the biconvex positive lens L12. A second sub-lens unit includes the negative meniscus lens L13 and the biconvex positive lens L14.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L12 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L11, and both surfaces of the biconvex positive lens L12.

A variable magnification optical system of Example 5 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 6 includes, in order from the object side, a first lens unit G1 having a positive refractive power, a second lens unit G2 having a negative refractive power, a third lens unit G3 having a positive refractive power, and an image-side lens unit Gl having a positive refractive power. An aperture stop S is disposed between the second lens unit G2 and the third lens unit G3.

The image-side lens unit Gl includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, a negative meniscus lens L6 having a convex surface facing the image side, and a biconvex positive lens L7.

The third lens unit G3 includes a biconvex positive lens L8, a negative meniscus lens L9 having a convex surface facing the object side, and a biconvex positive lens L10. Here, the negative meniscus lens L9 and the biconvex positive lens L10 are cemented together.

The fourth lens unit G4 includes a biconcave negative lens L11.

The fifth lens unit G5 includes a biconvex positive lens L12, a negative meniscus lens L13 having a convex surface facing the object side, and a biconvex positive lens L14. Here, the negative meniscus lens L13 and the biconvex positive lens L14 are cemented together.

A first sub-lens unit includes the biconvex positive lens L12. A second sub-lens unit includes the negative meniscus lens L13 and the biconvex positive lens L14.

At a time of changing magnification, the first lens unit G1 is fixed, the second lens unit G2 moves toward an image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L12 moves in a direction orthogonal to the optical axis.

An aspherical surface is provided on each of eight surfaces in total, that is, both surfaces of the biconcave negative lens L5, both surfaces of the biconvex positive lens L8, both surfaces of the biconcave negative lens L11, and both surfaces of the biconvex positive lens L12.

A variable magnification optical system of Example 7 includes, in order from the object side, a first lens unit G1 having a positive refractive power, a second lens unit G2 having a negative refractive power, a third lens unit G3 having a positive refractive power, and an image-side lens unit Gl having a positive refractive power. An aperture stop S is disposed between the second lens unit G2 and the third lens unit G3.

The image-side lens unit Gl includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 moves toward the image side and thereafter moves toward the object side, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 8 includes, in order from the object side, a first lens unit G1 having a positive refractive power, a second lens unit G2 having a negative refractive power, a third lens unit G3 having a positive refractive power, and an image-side lens unit Gl having a positive refractive power. An aperture stop S is disposed between the second lens unit G2 and the third lens unit G3.

The image-side lens unit Gl includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 9 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S moves toward the image side.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 10 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a positive meniscus lens L7 having a convex surface facing the object side, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of six surfaces in total, that is, both surfaces of the biconcave negative lens L5, both surfaces of the positive meniscus lens L7, and both surfaces of the biconvex positive lens L11.

A variable magnification optical system of Example 11 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a biconvex positive lens L2, and a positive meniscus lens L3 having a convex surface facing the object side. Here, the negative meniscus lens L1 and the biconvex positive lens L2 are cemented together.

The second lens unit G2 includes a biconcave negative lens L4, a biconcave negative lens L5, and a biconvex positive lens L6.

The third lens unit G3 includes a positive meniscus lens L7 having a convex surface facing the object side, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the positive meniscus lens L7, both surfaces of the biconcave negative lens L10, and both surfaces of the biconvex positive lens L11.

A variable magnification optical system of Example 12 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the image side, and a negative meniscus lens L13 having a convex surface facing the object side, and a biconvex positive lens L14. Here, the biconvex positive lens L11 and the negative meniscus lens L12 are cemented together. The negative meniscus lens L13 and the biconvex positive lens L14 are cemented together.

A first sub-lens unit includes the biconvex positive lens L11 and the negative meniscus lens L12. A second sub-lens unit includes the negative meniscus lens L13 and the biconvex positive lens L14.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 and the negative meniscus lens L12 move in a direction orthogonal to the optical axis.

An aspherical surface is provided on each of seven surfaces in total, that is, both surfaces of the biconcave negative lens L5, both surfaces of the biconvex positive lens L7, both surfaces of the biconcave negative lens L10, and the object-side surface of the biconvex positive lens L11.

A variable magnification optical system of Example 13 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 14 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens positioned closest to the object side in a fourth lens unit G4 belongs to the first region. The rest of lenses belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10, a biconvex positive lens L11, a negative meniscus lens L12 having a convex surface facing the object side, and a biconvex positive lens L13. Here, the negative meniscus lens L12 and the biconvex positive lens L13 are cemented together.

At a time of changing magnification, the first lens unit G1 moves toward the image side and thereafter moves toward the object side, the second lens unit G2 moves toward the image side, the third lens unit G3 moves toward the object side, and the fourth lens unit G4 is fixed. The aperture stop S is fixed.

At a time of focusing, the biconcave negative lens L10 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 15 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, a biconcave negative lens L6, and a biconvex positive lens L7. Here, the biconcave negative lens L6 and the biconvex positive lens L7 are cemented together.

The third lens unit G3 includes a biconvex positive lens L8, a negative meniscus lens L9 having a convex surface facing the object side, and a biconvex positive lens L10. Here, the negative meniscus lens L9 and the biconvex positive lens L10 are cemented together.

The fourth lens unit G4 includes a biconcave negative lens L11.

The fifth lens unit G5 includes a biconvex positive lens L12, a negative meniscus lens L13 having a convex surface facing the object side, and a biconvex positive lens L14. Here, the negative meniscus lens L13 and the biconvex positive lens L14 are cemented together.

A first sub-lens unit includes the biconvex positive lens L12. A second sub-lens unit includes the negative meniscus lens L13 and the biconvex positive lens L14.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L12 moves in a direction orthogonal to the optical axis.

An aspherical surface is provided on each of eight surfaces in total, that is, both surfaces of the biconcave negative lens L5, both surfaces of the biconvex positive lens L8, both surfaces of the biconcave negative lens L11, and both surfaces of the biconvex positive lens L12.

A variable magnification optical system of Example 16 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, a negative meniscus lens L6 having a convex surface facing the object side, and a biconvex positive lens L7. Here, the negative meniscus lens L6 and the biconvex positive lens L7 are cemented together.

The third lens unit G3 includes a biconvex positive lens L8, a negative meniscus lens L9 having a convex surface facing the object side, and a biconvex positive lens L10. Here, the negative meniscus lens L9 and the biconvex positive lens L10 are cemented together.

The fourth lens unit G4 includes a biconcave negative lens L11.

The fifth lens unit G5 includes a biconvex positive lens L12.

A first sub-lens unit includes the biconvex positive lens L12. A second sub-lens unit includes no lens.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis.

An aspherical surface is provided on each of eight surfaces in total, that is, both surfaces of the biconcave negative lens L5, both surfaces of the biconvex positive lens L8, both surfaces of the biconcave negative lens L11, and both surfaces of the biconvex positive lens L12.

A variable magnification optical system of Example 17 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconcave positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a negative meniscus lens L10 having a convex surface facing the object side.

The fifth lens unit G5 includes a biconvex positive lens L11, a biconcave negative lens L12, and a biconvex positive lens L13. Here, the biconcave negative lens L12 and the biconvex positive lens L13 are cemented together.

A first sub-lens unit includes the biconvex positive lens L11. A second sub-lens unit includes the biconcave negative lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the negative meniscus lens L10, and both surfaces of the biconvex positive lens L11.

A variable magnification optical system of Example 18 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconcave positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13.

Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

A variable magnification optical system of Example 19 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, a negative meniscus lens L6 having a convex surface facing the object side, and a biconvex positive lens L7. Here, the negative meniscus lens L6 and the biconvex positive lens L7 are cemented together.

The third lens unit G3 includes a biconvex positive lens L8, a negative meniscus lens L9 having a convex surface facing the object side, and a biconvex positive lens L10. Here, the negative meniscus lens L9 and the biconvex positive lens L10 are cemented together.

The fourth lens unit G4 includes a biconcave negative lens L11.

The fifth lens unit G5 includes a biconvex positive lens L12.

A first sub-lens unit includes the biconvex positive lens L12. A second sub-lens unit includes no lens.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis.

An aspherical surface is provided on each of eight surfaces in total, that is, both surfaces of the biconcave negative lens L5, both surfaces of the biconvex positive lens L8, both surfaces of the biconcave negative lens L11, and both surfaces of the biconvex positive lens L12.

A variable magnification optical system of Example 20 includes, in order from the object side, a first lens unit G1 having a positive refractive power, a second lens unit G2 having a negative refractive power, a third lens unit G3 having a positive refractive power, and an image-side lens unit G1 having a positive refractive power. An aperture stop S is disposed between the second lens unit G2 and the third lens unit G3.

The image-side lens unit G1 includes a lens belonging to a first region and a lens belonging to a second region. A lens included in a fourth lens unit G4 belongs to the first region. A lens included in a fifth lens unit G5 belongs to the second region.

The first lens unit G1 includes a negative meniscus lens L1 having a convex surface facing the object side, a positive meniscus lens L2 having a convex surface facing the object side, and a positive meniscus lens L3 having a convex surface facing the object side. Here, the negative meniscus lens L1 and the positive meniscus lens L2 are cemented together.

The second lens unit G2 includes a negative meniscus lens L4 having a convex surface facing the object side, a biconcave negative lens L5, and a biconcave positive lens L6.

The third lens unit G3 includes a biconvex positive lens L7, a negative meniscus lens L8 having a convex surface facing the object side, and a biconvex positive lens L9. Here, the negative meniscus lens L8 and the biconvex positive lens L9 are cemented together.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Here, the negative meniscus lens L12 and the biconvex positive lens L13 are cemented together.

A first sub-lens unit includes the biconvex positive lens L11. A second sub-lens unit includes the negative meniscus lens L12 and the biconvex positive lens L13.

At a time of changing magnification, the first lens unit G1 is fixed, the second lens unit G2 moves toward the image side, the third lens unit G3 moves toward the object side, the fourth lens unit G4 moves toward the object side and thereafter moves toward the image side, and the fifth lens unit G5 is fixed. The aperture stop S is fixed.

At a time of focusing, the fourth lens unit G4 moves along the optical axis. At a time of image stabilization, the biconvex positive lens L11 moves in a direction orthogonal to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

Table 1A, Table 1B, Table 1C, Table 1D, Table 1E, Table 1F, Table 1G, Table 1H, Table 1I, and Table 1J illustrate a result of classification of the lens units based on two criteria. The lens unit can be classified, based on whether the space from the adjacent lens is changed. The space from the adjacent lens is changed at a time of changing magnification and at a time of focusing. Classification of the lens units differs between the case where the lens units are classified based on change in space at a time of changing magnification and the case where the lens units are classified based on change in space at a time of focusing.

For example, in Example 14, the following is classification in the case where the lens units are classified based on change in space at a time of changing magnification.
 First lens unit: L1, L2, L3
 Second lens unit: L4, L5, L6
 Third lens unit: L7, L8, L9
 Fourth lens unit: L10, L11, L12, L13

The following is classification in the case where the lens units are classified based on change in space at a time of focusing.
 First lens unit: L1, L2, L3, L4, L5, L6, L7, L8, L9
 Second lens unit: L10
 Third lens unit: L11, L12, L13

As described above, the number of lens units and the number of lenses included in one lens unit differ between the case where the lens units are classified based on change in space at a time of changing magnification, and the case where the lens units are classified based on change in space at a time of focusing.

When a group of lenses formed of the smallest number of lenses is regarded as one lens unit, the following is the lens units in the case where the lens units are classified based on change in space at a time of changing magnification and change in space at a time of focusing.
 First lens unit: L1, L2, L3
 Second lens unit: L4, L5, L6
 Third lens unit: L7, L8, L9
 Fourth lens unit: L10
 Fifth lens unit: L11, L12, L13

Table 1A to Table 1J illustrate the case where the lens units are classified based on change in space only at a time of changing magnification as "Classification 1", and the case where the lens units are classified based on change in space at a time of changing magnification and change in space at a time of focusing as "Classification 2".

TABLE 1A

|  | Example 1 | Example 2 |
|---|---|---|
| Classification 1 | five lens units | five lens units |
| Classification 2 | five lens units | five lens units |

TABLE 1B

|  | Example 3 | Example 4 |
|---|---|---|
| Classification 1 | five lens units | five lens units |
| Classification 2 | five lens units | five lens units |

TABLE 1C

|  | Example 5 | Example 6 |
|---|---|---|
| Classification 1 | five lens units | five lens units |
| Classification 2 | five lens units | five lens units |

TABLE 1D

|  | Example 7 | Example 8 |
|---|---|---|
| Classification 1 | five lens units | five lens units |
| Classification 2 | five lens units | five lens units |

TABLE 1E

|  | Example 9 | Example 10 |
|---|---|---|
| Classification 1 | five lens units | five lens units |
| Classification 2 | five lens units | five lens units |

TABLE 1F

|  | Example 11 | Example 12 |
|---|---|---|
| Classification 1 | five lens units | five lens units |
| Classification 2 | five lens units | five lens units |

TABLE 1G

|  | Example 13 | Example 14 |
|---|---|---|
| Classification 1 | five lens units | four len units |
| Classification 2 | five lens units | five lens units |

TABLE 1H

|  | Example 15 | Example 16 |
|---|---|---|
| Classification 1 | five lens units | five lens units |
| Classification 2 | five lens units | five lens units |

TABLE 1I

|  | Example 17 | Example 18 |
|---|---|---|
| Classification 1 | five lens units | five lens units |
| Classification 2 | five lens units | five lens units |

TABLE 1J

|  | Example 19 | Example 20 |
|---|---|---|
| Classification 1 | five lens units | five lens units |
| Classification 2 | five lens units | five lens units |

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and * denotes an aspheric surface.

Further, in Zoom data, f denotes a focal length of the variable magnification optical system, FNO. denotes an F number, ω denotes a half angle of view, IH denotes an image height, LTL denotes a lens total length of the optical system, and BF denotes a back focus. In the example 1 to the example 14, back focus is a distance from a rearmost lens surface to a paraxial image surface. In the example 1 to the example 14, back focus is a unit which is expressed upon air conversion of a distance from a rearmost lens surface to a paraxial image surface. The lens total length is a distance from a frontmost lens surface to the rearmost lens surface plus back focus. WE denotes a wide angle end, ST denotes a intermediate focal length state, TE denotes a telephoto end.

Further, in Unit focal length, each of f1, f2 . . . is a focal length of each lens unit.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

Example 1

Unit mm

Surface data

| Surface no. | r | d | nd | vd |
|---|---|---|---|---|
| Object plane | ∞ | ∞ | | |
| 1 | 64.888 | 1.600 | 1.92119 | 23.96 |
| 2 | 33.816 | 6.000 | 1.69680 | 55.53 |
| 3 | 93.839 | 0.250 | | |
| 4 | 50.074 | 3.950 | 1.90043 | 37.37 |
| 5 | 182.722 | Variable | | |
| 6 | 129.581 | 0.950 | 1.73400 | 51.47 |
| 7 | 10.626 | 6.850 | | |
| 8* | −24.505 | 0.800 | 1.80610 | 40.92 |
| 9* | 18.035 | 4.640 | | |
| 10 | 66.156 | 3.400 | 1.92119 | 23.96 |
| 11 | −46.676 | Variable | | |
| 12 (Stop) | ∞ | Variable | | |
| 13* | 23.155 | 5.524 | 1.80610 | 40.92 |
| 14* | −98.693 | 3.934 | | |
| 15 | 18.761 | 3.200 | 1.49700 | 81.54 |
| 16 | −933.988 | 1.000 | 1.92119 | 23.96 |
| 17 | 13.426 | 1.000 | | |
| 18 | 20.814 | 3.900 | 1.64000 | 60.08 |
| 19 | −35.161 | Variable | | |
| 20* | −29.981 | 0.500 | 1.59201 | 67.02 |
| 21* | 16.255 | Variable | | |
| 22* | 14.288 | 3.880 | 1.58313 | 59.38 |
| 23* | −40.359 | 1.000 | | |
| 24 | 20.801 | 1.000 | 1.95375 | 32.32 |
| 25 | 8.900 | 6.031 | 1.61800 | 63.40 |
| 26 | −31.832 | 1.000 | | |
| 27 | ∞ | 0.500 | 1.51633 | 64.14 |
| 28 | ∞ | | | |
| Image plane | ∞ | | | |

Aspherical surface data

8th surface k = 0.0000
A4 = 1.7482e−004, A6 = −2.4934e−006, A8 = 1.0920e−008,
A10 = 0.0000e+000, A12 = 0.0000e+000

9th surface k = 0.0000
A4 = 6.8473e−005, A6 = −2.7581e−006, A8 = 1.4844e−008,
A10 = 0.0000e+000, A12 = 0.0000e+000

13th surface k = 0.0000
A4 = −8.7499e−006, A6 = 2.9691e−008, A8 = −9.9775e−010,
A10 = 0.0000e+000, A12 = 0.0000e+000

14th surface k = 0.0000
A4 = 8.0659e−006, A6 = 1.1496e−009, A8 = −9.9167e−010,
A10 = 0.0000e+000, A12 = 0.0000e+000

20th surface k = 0.0000
A4 = 2.2878e−005, A6 = −4.7492e−008, A8 = 0.0000e+000,
A10 = 0.0000e+000, A12 = 0.0000e+000

21th surface k = 0.0000
A4 = −4.7326e−006, A6 = −4.0833e−007, A8 = 0.0000e+000
A10 = 0.0000e+000, A12 = 0.0000e+000

22th surface k = 0.0000
A4 = 8.8542e−006, A6 = 4.8420e−008, A8 = −5.7167e−009,
A10 = 0.0000e+000, A12 = 0.0000e+000

23th surface k = 0.0000
A4 = 1.2194e−004, A6 = −3.1253e−007, A8 = −4.6580e−009,
A10 = 0.0000e+000, A12 = 0.0000e+000

Zoom data

| | WE | ST | TE |
|---|---|---|---|
| f(mm) | 3.879 | 13.893 | 54.897 |
| FNO. | 1.618 | 2.749 | 3.267 |
| 2ω | 92.1 | 29.1 | 7.6 |
| IH | 3.75 | 3.75 | 3.75 |
| LTL | 135.256 | 135.256 | 135.256 |
| BF(mm) | 4.837 | 4.837 | 4.837 |
| d5 | 0.603 | 22.474 | 43.510 |
| d11 | 44.183 | 22.312 | 1.276 |
| d12 | 16.443 | 1.397 | 1.198 |
| d19 | 1.800 | 7.622 | 19.144 |
| d21 | 7.981 | 17.205 | 5.882 |

Unit focal length

| f1 = 75.59 | f2 = −10.64 | f3 = 21.17 | f4 = −17.73 | f5 = 13.612 |
|---|---|---|---|---|

Example 2

Unit mm

Surface data

| Surface no. | r | d | nd | vd |
|---|---|---|---|---|
| Object plane | ∞ | ∞ | | |
| 1 | 79.899 | 1.400 | 1.85478 | 24.80 |
| 2 | 32.607 | 8.940 | 1.49700 | 81.54 |
| 3 | 1000.000 | 0.150 | | |
| 4 | 35.987 | 5.450 | 1.88300 | 40.76 |
| 5 | 164.946 | Variable | | |
| 6 | 104.033 | 0.800 | 1.75500 | 52.32 |
| 7 | 9.400 | 6.078 | | |
| 8* | −16.013 | 0.800 | 1.85135 | 40.10 |
| 9* | 25.928 | 0.820 | | |
| 10 | 34.051 | 2.700 | 2.00069 | 25.46 |
| 11 | −40.768 | Variable | | |
| 12 (Stop) | ∞ | Variable | | |
| 13* | 18.994 | 3.400 | 1.82080 | 42.71 |
| 14* | −71.296 | 0.100 | | |
| 15 | 22.007 | 0.550 | 1.95375 | 32.32 |
| 16 | 9.099 | 5.700 | 1.59282 | 68.63 |
| 17 | −23.038 | Variable | | |
| 18* | −14.983 | 0.550 | 1.51633 | 64.14 |
| 19* | 10.800 | Variable | | |
| 20* | 17.448 | 5.108 | 1.49700 | 81.54 |
| 21* | −10.532 | 0.930 | | |
| 22 | 19.003 | 0.500 | 1.92286 | 18.90 |
| 23 | 8.000 | 3.421 | 1.77250 | 49.60 |
| 24 | 35.643 | 1.296 | | |
| 25 | ∞ | 0.500 | 1.51633 | 64.14 |
| 26 | ∞ | | | |
| Image plane | ∞ | | | |

-continued

Unit mm

Aspherical surface data

8th surface k = 0.0000
A4 = 1.9595e−004, A6 = −6.1387e−006, A8−1.0994e−007,
A10 = −1.1196e−009, A12 = 4.9945e−012

9th surface k = 0.0000
A4 = 1.1314e−004, A6 = −4.9909e−006, A8 = 7.6399e−008,
A10 = −4.9153e−010, A12 = 8.8021e−013

13th surface k = 0.0000
A4 = −3.9083e−005, A6 = 6.4009e−007, A8 = −2.5768e−008,
A10 = 7.0236e−011, A12 = 0.0000e+000

14th surface k = 0.0000
A4 = 2.1155e−005, A6 = 1.4442e−007, A8 = −2.0687e−008,
A10 = 4.8026e−011, A12 = 0.0000e+000

18th surface k = 0.0000
A4 = −4.6715e−004, A6 = 1.7233e−005, A8 = −1.8295e−007,
A10 = −2.7967e−010, A12 = 0.0000e+000

19th surface k = 0.0000
A4 = −7.2145e−004, A6 = 1.1989e−005, A8 = −6.8457e−008,
A10 = −1.2951e−009, A12 = 0.0000e+000

20th surface k = 0.0000
A4 = −4.1120e−005, A6 = −1.9540e−006, A8 = −4.5284e−008,
A10 = 4.1918e−010, A12 = 0.0000e+000

21th surface k = 0.0000
A4 = 3.1290e−004, A6 = −1.9889e−006, A8 = −3.3856e−008,
A10 = 3.7000e−010, A12 = 0.0000e+000

Zoom data

|  | WE | ST | TE |
|---|---|---|---|
| f(mm) | 4.200 | 13.740 | 50.997 |
| FNO. | 1.514 | 1.786 | 1.942 |
| 2ω | 85.3 | 28.1 | 7.7 |
| IH | 3.63 | 3.63 | 3.63 |
| LTL | 99.2657 | 99.2657 | 99.2657 |
| BF(mm) | 5.126 | 5.126 | 5.126 |
| d5 | 0.602 | 18.308 | 31.055 |
| d11 | 31.119 | 13.413 | 0.666 |
| d12 | 7.153 | 3.006 | 0.433 |
| d17 | 2.470 | 5.001 | 7.277 |
| d19 | 5.399 | 7.015 | 7.312 |

Unit focal length

| f1 = 53.36 | f2 = −9.63 | f3 = 13.21 | f4 = −12.07 | f5 = 12.04 |

Example 3

Unit mm

Surface data

| Surface no. | r | d | nd | νd |
|---|---|---|---|---|
| Object plane | ∞ | ∞ | | |
| 1 | 75.005 | 1.400 | 1.85478 | 24.80 |
| 2 | 35.351 | 9.100 | 1.49700 | 81.54 |
| 3 | 556.142 | 0.150 | | |
| 4 | 37.613 | 5.301 | 1.83481 | 42.73 |
| 5 | 144.781 | Variable | | |
| 6 | 112.563 | 0.800 | 1.77250 | 49.60 |
| 7 | 9.600 | 6.939 | | |
| 8* | −18.115 | 0.800 | 1.85135 | 40.10 |
| 9* | 19.642 | 0.973 | | |
| 10 | 29.276 | 3.050 | 2.00069 | 25.46 |
| 11 | −40.460 | Variable | | |
| 12(Stop) | ∞ | Variable | | |
| 13* | 19.371 | 3.417 | 1.80610 | 40.88 |
| 14* | −95.803 | 1.305 | | |
| 15 | 17.752 | 1.543 | 2.00069 | 25.46 |
| 16 | 9.050 | 4.903 | 1.49700 | 81.54 |
| 17 | −31.352 | Variable | | |
| 18* | −26.225 | 0.900 | 1.51633 | 64.14 |
| 19* | 11.820 | Variable | | |
| 20* | 23.406 | 4.507 | 1.59201 | 67.02 |
| 21* | −13.918 | 0.978 | | |
| 22 | 31.153 | 0.523 | 1.92286 | 20.88 |
| 23 | 8.029 | 3.973 | 1.90043 | 37.37 |
| 24 | 56.536 | 1.056 | | |
| 25 | ∞ | 0.500 | 1.51633 | 64.14 |
| 26 | ∞ | | | |
| Image plane | ∞ | | | |

Aspherical surface data

8th surface k = 0.0000
A4 = 1.8040e−004, A6 = −5.7306e−006, A8 = 1.2223e−007,
A10 = −1.3608e−009, A12 = 5.5850e−012

9th surface k = 0.0000
A4 = 9.3568e−005, A6 = −5.6706e−006, A8 = 1.2598e−007,
A10 = −1.4641e−009, A12 = 6.6486e−012

13th surface k = 0.0000
A4 = −1.5444e−006, A6 = −3.8162e−007, A8 = 7.5409e−009,
A10 = −1.4410e−010, A12 = −7.4949e−013

14th surface k = 0.0000
A4 = 3.2224e−005, A6 = −5.6443e−007, A8 = 9.1400e−009,
A10 = −2.2515e−010, A12 = 2.2946e−013

18th surface k = 0.0000
A4 = −4.6655e−004, A6 = 4.0797e−006, A8 = 1.1116e−007,
A10 = −3.0034e−010, A12 = −2.9231e−011

19th surface k = 0.0000
A4 = −5.5913e−004, A6 = −3.7692e−007, A8 = 1.5657e−007,
A10 = 1.9342e−009, A12 = −8.2074e−011

20th surface k = 0.0000
A4 = 2.4142e−005, A6 = −3.4236e−006, A8 = 3.9403e−008,
A10 = −1.0748e−009, A12 = 0.0000e+000

21th surface k = 0.0000
A4 = 1.9598e−004, A6 = −2.1474e−006, A8 = −7.1613e−009,
A10 = −3.4423e−010, A12 = 0.0000e+000

Zoom data

|  | WE | ST | TE |
|---|---|---|---|
| f(mm) | 4.120 | 14.360 | 58.297 |
| FNO. | 1.484 | 2.397 | 3.013 |
| 2ω | 87.4 | 28.0 | 7.0 |

-continued

Unit mm

| | | | |
|---|---|---|---|
| IH | 3.75 | 3.75 | 3.75 |
| LTL | 110.266 | 110.266 | 110.266 |
| BF(mm) | 4.886 | 4.886 | 4.886 |
| d5 | 0.604 | 20.072 | 34.919 |
| d11 | 35.519 | 16.051 | 1.204 |
| d12 | 9.690 | 3.553 | 1.192 |
| d17 | 2.297 | 5.869 | 10.080 |
| d19 | 6.708 | 9.273 | 7.423 |

Unit focal length f1 = 58.80  f2 = −9.82  f3 = 15.69  f4 = −15.65  f5 = 12.89

Example 4

Unit mm

Surface data

| Surface no. | r | d | nd | vd |
|---|---|---|---|---|
| Object plane | ∞ | ∞ | | |
| 1 | 76.710 | 1.600 | 2.00100 | 29.13 |
| 2 | 37.117 | 7.550 | 1.69680 | 55.53 |
| 3 | 201.575 | 0.250 | | |
| 4 | 40.159 | 4.858 | 1.72916 | 54.68 |
| 5 | 132.825 | Variable | | |
| 6 | 148.223 | 0.950 | 1.77250 | 49.60 |
| 7 | 9.956 | 6.392 | | |
| 8* | −25.165 | 0.800 | 1.80610 | 40.92 |
| 9* | 18.527 | 4.337 | | |
| 10 | 64.054 | 3.400 | 1.92119 | 23.96 |
| 11 | −46.576 | Variable | | |
| 12(Stop) | ∞ | Variable | | |
| 13* | 24.473 | 4.017 | 1.80610 | 40.92 |
| 14* | −62.292 | 3.643 | | |
| 15 | 24.045 | 3.200 | 1.49700 | 81.54 |
| 16 | −556.986 | 1.000 | 1.92119 | 23.96 |
| 17 | 15.005 | 1.095 | | |
| 18 | 22.945 | 3.900 | 1.59282 | 68.63 |
| 19 | −27.960 | Variable | | |
| 20* | −25.861 | 0.500 | 1.61881 | 63.85 |
| 21* | 18.383 | Variable | | |
| 22* | 18.201 | 4.600 | 1.61881 | 63.85 |
| 23* | −32.610 | 2.568 | | |
| 24 | 16.399 | 1.000 | 2.00069 | 25.46 |
| 25 | 8.700 | 5.000 | 1.61800 | 63.40 |
| 26 | −43.134 | 1.128 | | |
| 27 | ∞ | 0.300 | 1.51633 | 64.14 |
| 28 | ∞ | | | |
| Image plane | ∞ | | | |

Aspherical surface data

8th surface k = 0.0000
A4 = 1.6593e−004, A6 = −2.5010e−006, A8 = 1.2225e−008,
A10 = 0.0000e+000, A12 = 0.0000e+000

9th surface k = 0.0000
A4 = 4.9560e−005, A6 = −2.6403e−006, A8 = 1.4805e−008,
A10 = 0.0000e+000, A12 = 0.0000e+000

13th surface k = 0.0000
A4 = −7.5125e−006, A6 = 5.6081e−010, A8 = −2.6193e−010,
A10 = 0.0000e+000, A12 = 0.0000e+000

-continued

Unit mm

14th surface k = 0.0000
A4 = 1.4926e−005, A6 = −4.4055e−008, A8 = 0.0000e+000,
A10 = 0.0000e+000, A12 = 0.0000e+000

20th surface k = 0.0000
A4 = −6.3082e−005, A6 = 1.0321e−006, A8 = 0.0000e+000,
A10 = 0.0000e+000, A12 = 0.0000e+000

21th surface k = 0.0000
A4 = −1.0288e−004, A6 = 5.8458e−007, A8 = 0.0000e+000,
A10 = 0.0000e+000, A12 = 0.0000e+000

22th surface k = 0.0000
A4 = 1.7962e−005, A6 = −1.7638e−007, A8 = −3.2203e−009,
A10 = 0.0000e+000, A12 = 0.0000e+000

23th surface k = 0.0000
A4 = 1.0249e−004, A6 = −3.9344e−007, A8 = −2.9394e−009,
A10 = 0.0000e+000, A12 = 0.0000e+000

Zoom data

| | WE | ST | TE |
|---|---|---|---|
| f(mm) | 3.879 | 14.587 | 54.900 |
| FNO. | 1.629 | 2.899 | 3.904 |
| 2ω | 91.8 | 27.9 | 7.7 |
| IH | 3.75 | 3.75 | 3.75 |
| LTL | 134.108 | 134.108 | 134.108 |
| BF(mm) | 4.836 | 4.836 | 4.836 |
| d5 | 0.600 | 23.230 | 40.809 |
| d11 | 41.479 | 18.849 | 1.270 |
| d12 | 14.640 | 2.035 | 1.200 |
| d19 | 1.900 | 8.491 | 19.033 |
| d21 | 9.993 | 16.007 | 6.300 |

Unit focal length f1 = 70.72  f2 = −9.96  f3 = 20.66  f4 = −17.29  f5 = 13.54

Example 5

Unit mm

Surface data

| Surface no. | r | d | nd | vd |
|---|---|---|---|---|
| Object plane | ∞ | ∞ | | |
| 1 | 199.306 | 1.399 | 1.80000 | 29.84 |
| 2 | 32.031 | 9.078 | 1.49700 | 81.54 |
| 3 | 851.036 | 0.142 | | |
| 4 | 41.945 | 5.484 | 1.88300 | 40.76 |
| 5 | 447.322 | Variable | | |
| 6 | 379.186 | 0.804 | 1.72916 | 54.68 |
| 7 | 10.430 | 6.056 | | |
| 8* | −47.652 | 0.700 | 1.85135 | 40.10 |
| 9* | 13.546 | 2.670 | | |
| 10 | 41.658 | 3.435 | 2.00069 | 25.46 |
| 11 | −59.189 | Variable | | |
| 12(Stop) | ∞ | Variable | | |
| 13* | 16.453 | 3.782 | 1.80610 | 40.88 |
| 14* | −327.730 | 3.188 | | |
| 15 | 29.515 | 0.548 | 2.00330 | 28.27 |
| 16 | 9.664 | 7.671 | 1.59282 | 68.63 |
| 17 | −35.054 | Variable | | |
| 18* | −90.511 | 0.579 | 1.59201 | 67.02 |

-continued

Unit mm

| | | | | |
|---|---|---|---|---|
| 19* | 10.214 | Variable | | |
| 20* | 10.590 | 5.579 | 1.49700 | 81.54 |
| 21* | −23.498 | 0.485 | | |
| 22 | 292.471 | 0.780 | 2.00330 | 28.27 |
| 23 | 8.983 | 5.674 | 1.75500 | 52.32 |
| 24 | −18.709 | 1.124 | | |
| 25 | ∞ | 0.500 | 1.51633 | 64.14 |
| 26 | ∞ | | | |
| Image plane | ∞ | | | |

Aspherical surface data

8th surface k = 0.0000
A4 = 2.1442e−004, A6 = −6.7628e−006, A8 = 7.8379e−008,
A10 = −4.3245e−010, A12 = 8.9576e−013
9th surface k = 0.0000
A4 = 2.1161e−005, A6 = −6.7283e−006, A8 = 8.0061e−008,
A10 = −3.6146e−010, A12 = 1.3238e−013
13th surface k = 0.0000
A4 = −1.9429e−005, A6 = 2.5853e−007, A8 = −3.0991e−009,
A10 = 1.5612e−011, A12 = 0.0000e+000
14th surface k = 0.0000
A4 = 1.8155e−005, A6 = 3.4291e−007, A8 = −4.9516e−009,
A10 = 2.7105e−011, A12 = 0.0000e+000
18th surface k = 0.0000
A4 = 2.6163e−004, A6 = −8.5542e−006, A8 = 9.0393e−008,
A10 = 3.4898e−010, A12 = 0.0000e+000
19th surface k = 0.0000
A4 = 2.2932e−004, A6 = −8.2385e−006, A8 = 1.3535e−009,
A10 = 2.2109e−009, A12 = 0.0000e+000
20th surface k = 0.0000
A4 = −4.4389e−006, A6 = 4.2930e−007, A8 = −3.0414e−008,
A10 = 4.3590e−010, A12 = 0.0000e+000
21th surface k = 0.0000
A4 = 3.6450e−004, A6 = −2.4905e−006, A8 = −9.7499e−010,
A10 = 4.6858e−010, A12 = 0.0000e+000

Zoom data

| | WE | ST | TE |
|---|---|---|---|
| f(mm) | 3.650 | 12.992 | 52.666 |
| FNO. | 1.632 | 2.700 | 4.550 |
| 2ω | 97.7 | 32.1 | 8.1 |
| IH | 3.90 | 3.90 | 3.90 |
| LTL | 134.694 | 134.694 | 134.694 |
| BF(mm) | 4.954 | 4.954 | 4.954 |
| d5 | 0.603 | 21.952 | 36.810 |
| d11 | 37.203 | 15.854 | 0.996 |
| d12 | 24.545 | 10.467 | 1.276 |
| d17 | 1.891 | 6.392 | 25.644 |
| d19 | 7.444 | 17.021 | 6.960 |

Unit focal length f1 = 72.82   f2 = −9.93   f3 = 18.45   f4 = −15.47   f5 = 14.11

Example 6

Unit mm

Surface data

| Surface no. | r | d | nd | vd |
|---|---|---|---|---|
| Object plane | ∞ | ∞ | | |
| 1 | 160.145 | 1.400 | 1.80000 | 29.84 |
| 2 | 32.500 | 9.170 | 1.49700 | 81.54 |
| 3 | 847.880 | 0.150 | | |
| 4 | 41.118 | 5.420 | 1.88300 | 40.76 |
| 5 | 324.195 | Variable | | |
| 6 | 307.320 | 0.800 | 1.75500 | 52.32 |
| 7 | 10.350 | 6.112 | | |
| 8* | −54.466 | 0.700 | 1.82080 | 42.71 |
| 9* | 16.731 | 2.792 | | |
| 10 | −35.832 | 1.504 | 2.00100 | 29.13 |
| 11 | −86.581 | 0.150 | | |
| 12 | 74.375 | 2.800 | 2.00069 | 25.46 |
| 13 | −34.468 | Variable | | |
| 14(Stop) | ∞ | Variable | | |
| 15* | 15.689 | 3.700 | 1.80610 | 40.88 |
| 16* | −823.175 | 2.682 | | |
| 17 | 27.870 | 0.549 | 2.00330 | 28.27 |
| 18 | 9.161 | 6.213 | 1.59282 | 68.63 |
| 19 | −52.888 | Variable | | |
| 20* | −60.286 | 0.550 | 1.49700 | 81.54 |
| 21* | 10.800 | Variable | | |
| 22* | 10.697 | 5.700 | 1.49700 | 81.54 |
| 23* | −25.946 | 1.000 | | |
| 24 | 207.060 | 0.500 | 2.00100 | 29.13 |
| 25 | 8.700 | 5.300 | 1.74100 | 52.64 |
| 26 | −19.281 | 1.000 | | |
| 27 | ∞ | 0.500 | 1.51633 | 64.14 |
| 28 | ∞ | | | |
| Image plane | ∞ | | | |

Aspherical surface data

8th surface k = 0.0000
A4 = = 1.7269e−004, A6 = −4.9963e−006, A8 = 5.4713e−008,
A10 = −2.7019e−010, A12 = 2.7246e−013
9th surface k = 0.0000
A4 = 4.4452e−005, A6 = −4.9766e−006, A8 = 5.7002e−008,
A10 = −2.6888e−010, A12 = 1.5129e−013
15th surface k = 0.0000
A4 = −1.6223e−005, A6 = 8.2504e−008, A8 = −5.5426e−010,
A10 = 7.4366e−012, A12 = 0.0000e+000
16th surface k = 0.0000
A4 = 1.8730e−005, A6 = 9.2568e−008, A8 = −3.3102e−010,
A10 = 5.4108e−012, A12 = 0.0000e+000
20th surface k = 0.0000
A4 = 6.7698e−005, A6 = −3.6946e−006, A8 = 6.8717e−008,
A10 = −1.1558e−010, A12 = 0.0000e+000
21th surface k = 0.0000
A4 = 1.6916e−005, A6 = −4.2381e−006, A8 = 2.7232e−008,
A10 = 1.0014e−009, A12 = 0.0000e+000
22th surface k = 0.0000
A4 = −1.4544e−006, A6 = 8.5123e−007, A8 = −4.1792e−008,
A10 = 4.5516e−010, A12 = 0.0000e+000

-continued

Unit mm

23th surface k = 0.0000
A4 = 3.6019e−004, A6 = −2.3466e−006, A8 = −1.3355e−008,
A10 = 4.7183e−010, A12 = 0.0000e+000

Zoom data

|   | WE | ST | TE |
|---|---|---|---|
| f(mm) | 3.780 | 13.740 | 54.613 |
| FNO. | 1.632 | 2.500 | 3.750 |
| 2ω | 96.0 | 30.4 | 7.9 |
| IH | 3.90 | 3.90 | 3.90 |
| LTL | 135.767 | 135.767 | 135.767 |
| BF(mm) | 4.830 | 4.830 | 4.830 |
| d5 | 0.603 | 21.848 | 36.537 |
| d13 | 36.926 | 15.681 | 0.992 |
| d14 | 24.308 | 10.064 | 1.292 |
| d19 | 1.799 | 6.269 | 22.454 |
| d21 | 10.109 | 19.883 | 12.470 |

Unit focal length f1 = 69.31   f2 = −10.33   f3 = 18.95   f4 = −18.38   f5 = 14.89

Example 7

Unit mm

Surface data

| Surface no. | r | d | nd | vd |
|---|---|---|---|---|
| Object plane | ∞ | ∞ | | |
| 1 | 96.913 | 1.600 | 1.92119 | 23.96 |
| 2 | 35.025 | 6.931 | 1.51633 | 64.14 |
| 3 | 275.273 | 0.250 | | |
| 4 | 42.405 | 4.600 | 1.91082 | 35.25 |
| 5 | 264.575 | Variable | | |
| 6 | 264.575 | 0.950 | 1.78800 | 47.37 |
| 7 | 10.900 | 5.812 | | |
| 8* | −120.313 | 0.800 | 1.85135 | 40.10 |
| 9* | 15.518 | 5.151 | | |
| 10 | 45.483 | 2.700 | 1.92286 | 20.88 |
| 11 | −120.498 | Variable | | |
| 12(Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | Variable | | |
| 20* | 13.004 | 3.800 | 1.58313 | 59.38 |
| 21* | −850.000 | 3.800 | | |
| 22 | 18.320 | 0.600 | 2.00100 | 29.13 |
| 23 | 8.400 | 5.727 | 1.61800 | 63.40 |
| 24 | −31.484 | 2.042 | | |
| 25 | ∞ | 0.500 | 1.51633 | 64.14 |
| 26 | ∞ | | | |
| Image plane | ∞ | | | |

Aspherical surface data

8th surface k = 0.0000
A4 = 1.5897e−004, A6 = −4.6243e−006, A8 = 6.0294e−008,
A10 = −4.3744e−010, A12 = 1.4215e−012

-continued

Unit mm

9th surface k = 0.0000
A4 = 5.4622e−005, A6 = −4.8681e−006, A8 = 6.2006e−008,
A10 = −4.3749e−010, A12 = 1.3677e−012

13th surface k = 0.0000
A4 = −9.8650e−007, A6 = −3.4395e−007, A8 = 9.0517e−009,
A10 = −1.4953e−010, A12 = 9.3464e−013

14th surface k = 0.0000
A4 = 2.4705e−005, A6 = −4.07596−007, A8 = 1.0962e−008,
A10 = −2.0152e−010, A12 = 1.4434e−012

18th surface k = 0.0000
A4 = 1.5541e−004, A6 = −6.7393e−006, A8 = 2.3846e−007,
A10 = −5.0744e−009, A12 = 5.5675e−011

19th surface k = 0.0000
A4 = 1.4156e−004, A6 = −9.5105e−006, A8 = 3.6964e−007,
A10 = −8.9290e−009, A12 = 1.0492e−010

20th surface k = 0.0000
A4 = 2.1326e−005, A6 = −1.5883e−006, A8 = 2.2701e−008,
A10 = −3.9311e−010, A12 = 1.3883e−012

21th surface k = 0.0000
A4 = 8.9785e−005, A6 = −2.2240e−006, A8 = 4.2912e−008,
A10 = −8.1741e−010, A12 = 4.8550e−012

Zoom data

|   | WE | ST | TE |
|---|---|---|---|
| f(mm) | 3.845 | 13.900 | 77.003 |
| FNO. | 1.639 | 2.771 | 3.979 |
| 2ω | 94.8 | 31.2 | 5.8 |
| IH | 3.90 | 3.90 | 3.90 |
| LTL | 135.2667 | 135.2528 | 139.7458 |
| BF(mm) | 5.871 | 5.871 | 5.871 |
| d5 | 0.395 | 20.0741 | 43.8461 |
| d11 | 39.582 | 19.889 | 0.610 |
| d12 | 25.298 | 4.990 | 0.583 |
| d17 | 1.752 | 8.023 | 19.687 |
| d19 | 2.881 | 16.918 | 9.661 |

Unit focal length f1 = 69.54   f2 = −10.66   f3 = 21.10   f4 = −16.72   f5 = 15.86

Example 8

Unit mm

Surface data

| Surface no. | r | d | nd | vd |
|---|---|---|---|---|
| Object plane | ∞ | ∞ | | |
| 1 | 174.579 | 1.400 | 1.80000 | 29.84 |
| 2 | 35.672 | 8.850 | 1.49700 | 81.54 |
| 3 | 846.852 | 0.142 | | |
| 4 | 46.242 | 5.450 | 1.88300 | 40.76 |
| 5 | 503.947 | Variable | | |
| 6 | 608.187 | 0.800 | 1.72916 | 54.68 |
| 7 | 11.045 | 6.440 | | |
| 8* | −41.892 | 0.800 | 1.85135 | 40.10 |

-continued

| Unit mm | | | | |
|---|---|---|---|---|
| 9* | 15.068 | 3.754 | | |
| 10 | 54.830 | 2.850 | 2.00069 | 25.46 |
| 11 | −49.253 | Variable | | |
| 12 (Stop) | ∞ | Variable | | |
| 13* | 16.798 | 4.877 | 1.80610 | 40.88 |
| 14* | −2972.491 | 3.910 | | |
| 15 | 25.830 | 0.550 | 1.85478 | 24.80 |
| 16 | 9.052 | 5.700 | 1.49700 | 81.54 |
| 17 | −40.825 | Variable | | |
| 18* | −31.896 | 1.380 | 1.49700 | 81.54 |
| 19* | 10.200 | Variable | | |
| 20* | 10.500 | 5.000 | 1.49700 | 81.54 |
| 21* | −20.340 | 0.700 | | |
| 22 | 95.162 | 1.615 | 1.90043 | 37.37 |
| 23 | 8.501 | 5.906 | 1.59282 | 68.63 |
| 24 | −14.871 | 1.128 | | |
| 25 | ∞ | 0.500 | 1.51633 | 64.14 |
| 26 | ∞ | | | |
| Image plane | ∞ | | | |

Aspherical surface data

8th surface k = 0.0000
A4 = 2.2800e−004, A6 = −6.3166e−006, A8 = 7.5900e−008,
A10 = −4.8721e−010, A12 = 1.3111e−012

9th surface k = 0.0000
A4 = 7.6805e−005, A6 = −6.4505e−006, A8 = 8.1051e−008,
A10 = −5.0046e−010, A12 = 1.2224e−012

13th surface k = 0.0000
A4 = −1.3874e−005, A6 = 9.2101e−008, A8 = −1.27506−009,
A10 = 4.5831e−012, A12 = 0.0000e+000

14th surface k = 0.0000
A4 = 1.8428e−005, A6 = 1.1861e−007, A8 = −1.8441e−009,
A10 = 7.7544e−012, A12 = 0.0000e+000

18th surface k = 0.0000
A4 = 3.2017e−004, A6 = −8.1773e−006, A8 = 1.1561e−007,
A10 = −5.8900e−010, A12 = 0.0000e+000

19th surface k = 0.0000
A4 = 2.8555e−004, A6 = −9.2426e−006, A8 = 1.1518e−007,
A10 = −5.4828e−010, A12 = 0.0000e+000

20th surface k = 0.0000
A4 = −2.3455e−005, A6 = −6.4648e−007, A8 = −6.5063e−009,
A10 = 4.9943e−011, A12 = 0.0000e+000

21th surface k = 0.0000
A4 = 3.0743e−004, A6 = −2.5978e−006, A8 = 1.4475e−008,
A10 = 8.9142e−012, A12 = 0.0000e+000

Zoom data

| | WE | ST | TE |
|---|---|---|---|
| f(mm) | 3.717 | 12.998 | 53.454 |
| FNO. | 1.633 | 2.590 | 3.821 |
| 2ω | 97.4 | 32.8 | 8.2 |
| IH | 4.00 | 4.00 | 4.00 |
| LTL | 135.766 | 135.766 | 135.766 |
| BF(mm) | 4.957 | 4.957 | 4.957 |
| d5 | 0.602 | 22.368 | 40.929 |
| d11 | 41.325 | 19.559 | 0.998 |
| d12 | 23.659 | 7.523 | 1.295 |

-continued

| Unit mm | | | |
|---|---|---|---|
| d17 | 1.797 | 6.550 | 21.462 |
| d19 | 3.301 | 14.684 | 6.000 |

Unit focal length

| | | | | |
|---|---|---|---|---|
| f1 = 75.26 | f2 = −11.08 | f3 = 19.75 | f4 = −15.38 | f5 = 14.11 |

Example 9

| Unit mm | | | | |
|---|---|---|---|---|
| Surface data | | | | |
| Surface no. | r | d | nd | vd |
| Object plane | ∞ | ∞ | | |
| 1 | 138.923 | 1.400 | 1.80000 | 29.84 |
| 2 | 32.000 | 8.420 | 1.49700 | 81.54 |
| 3 | 900.000 | 0.142 | | |
| 4 | 40.621 | 5.150 | 1.88300 | 40.76 |
| 5 | 349.130 | Variable | | |
| 6 | 510.510 | 0.800 | 1.77250 | 49.60 |
| 7 | 10.874 | 6.004 | | |
| 8* | −94.103 | 0.800 | 1.85135 | 40.10 |
| 9* | 11.318 | 2.546 | | |
| 10 | 26.786 | 3.200 | 2.00069 | 25.46 |
| 11 | −86.912 | Variable | | |
| 12 (Stop) | ∞ | Variable | | |
| 13* | 17.871 | 3.600 | 1.80610 | 40.88 |
| 14* | −404.771 | 4.908 | | |
| 15 | 22.846 | 0.550 | 1.85478 | 24.80 |
| 16 | 9.050 | 5.650 | 1.49700 | 81.54 |
| 17 | −29.055 | Variable | | |
| 18* | −28.257 | 1.367 | 1.51633 | 64.14 |
| 19* | 9.943 | Variable | | |
| 20* | 10.280 | 5.000 | 1.59201 | 67.02 |
| 21* | −45.543 | 0.700 | | |
| 22 | 49.687 | 0.550 | 1.91082 | 35.25 |
| 23 | 8.600 | 5.920 | 1.59282 | 68.63 |
| 24 | −18.425 | 1.000 | | |
| 25 | ∞ | 0.500 | 1.51633 | 64.14 |
| 26 | ∞ | | | |
| Image plane | ∞ | | | |

Aspherical surface data

8th surface k = 0.0000
A4−1.8190e−004, A6 = −5.7661e−006, A8 = 7.3262e−008,
A10 = −4.7767e−010, A12 = 1.3249e−012

9th surface k = 0.0000
A4 = 1.1930e−006, A6 = −6.7418e−006, A8 = 8.6494e−008,
A10 = −5.6854e−010, A12 = 1.2596e−012

13th surface k = 0.0000
A4 = −1.4596e−005, A6 = 1.4335e−007, A8 = −1.9171e−009,
A10 = 3.4700e−012, A12 = −5.7200e−013

14th surface k = 0.0000
A4 = 1.7013e−005, A6 = 1.8383e−007, A8 = −9.3810e−010,
A10 = −7.9445e−011, A12 = 1.2558e−013

18th surface k−0.0000
A4 = 4.6332e−004, A6 = −1.3480e−005, A8 = 1.9623e−007,
A10 = −1.7688e−009, A12 = 1.6088e−011

Unit mm

19th surface k = 0.0000
A4 = 4.2957e−004, A6 = −1.2031e−005, A8 = −1.7874e−008,
A10 = 4.1558e−009, A12 = −3.6215e−011
20th surface k = 0.0000
A4 = −2.3527e−005, A6 = −1.7052e−007, A8 = −5.3948e−008,
A10 = 1.3655e−009, A12−1.6298e−011
21th surface k = 0.0000
A4 = 2.0996e−004, A6 = −3.6532e−006, A8 = 6.6124e−0081
A10 = −9.4887e−010, A12 = 8.6667e−013

Zoom data

|  | WE | ST | TE |
|---|---|---|---|
| f(mm) | 4.055 | 14.500 | 57.388 |
| FNO. | 1.429 | 2.788 | 3.987 |
| 2ω | 93.1 | 30.9 | 7.9 |
| IH | 4.00 | 4.00 | 4.00 |
| LTL | 123.266 | 123.266 | 123.266 |
| BF(mm) | 4.830 | 4.830 | 4.830 |
| d5 | 0.601 | 20.039 | 38.095 |
| d11 | 30.793 | 15.355 | 1.299 |
| d12 | 25.203 | 7.014 | 1.194 |
| d17 | 1.797 | 6.497 | 15.138 |
| d19 | 3.335 | 12.824 | 6.003 |

Unit focal length

| f1 = 64.83 | f2 = −10.58 | f3 = 18.32 | f4 = −14.07 | f5 = 13.84 |
|---|---|---|---|---|

Example 10

Unit mm

Surface data

| Surface no. | r | d | nd | vd |
|---|---|---|---|---|
| Object plane | ∞ | ∞ | | |
| 1 | 78.417 | 1.400 | 1.85478 | 24.80 |
| 2 | 46.016 | 6.200 | 1.49700 | 81.54 |
| 3 | 180.000 | 0.242 | | |
| 4 | 53.525 | 4.360 | 1.77250 | 49.60 |
| 5 | 257.344 | Variable | | |
| 6 | 156.973 | 0.836 | 1.83481 | 42.71 |
| 7 | 10.600 | 6.576 | | |
| 8* | −21.718 | 0.800 | 1.85135 | 40.10 |
| 9* | 37.963 | 3.485 | | |
| 10 | 152.990 | 2.850 | 2.00069 | 25.46 |
| 11 | −33.700 | Variable | | |
| 12 (Stop) | ∞ | Variable | | |
| 13* | 17.740 | 4.255 | 1.80610 | 40.88 |
| 14* | 885.283 | 4.794 | | |
| 15 | 28.326 | 1.156 | 1.85478 | 24.80 |
| 16 | 9.441 | 5.689 | 1.49700 | 81.54 |
| 17 | −32.954 | Variable | | |
| 18 | −1200.813 | 0.600 | 1.51633 | 64.14 |
| 19 | 10.811 | Variable | | |
| 20* | 16.000 | 3.972 | 1.58313 | 59.38 |
| 21* | −32.000 | 1.332 | | |
| 22 | 89.056 | 0.686 | 1.91082 | 35.25 |
| 23 | 10.759 | 5.937 | 1.59282 | 68.63 |
| 24 | −16.687 | 1.095 | | |
| 25 | ∞ | 0.500 | 1.51633 | 64.14 |
| 26 | ∞ | | | |
| Image plane | ∞ | | | |

Unit mm

Aspherical surface data

8th surface k = 0.0000
A4 = 5.3488e−005, A6 = −8.0252e−007, A8 = 1.7751e−009,
A10 = 0.0000e+000, A12 = 0.0000e+000
9th surface k = 0.0000
A4 = −3.0539e−006, A6 = −9.1055e−007, A8 = 4.0810e−009,
A10 = 0.0000e+000, A12 = 0.0000e+000
13th surface k = 0.0000
A4 = −2.3097e−006, A6 = 1.8119e−008, A8 = −1.2268e−011,
A10 = 0.0000e+000, A12 = 0.0000e+000
14th surface k = 0.0000
A4 = 2.7548e−005, A6 = 0.0000e+000, A8 = 0.0000e+000,
A10 = 0.0000e+000, A12 = 0.0000e+000
20th surface k = 0.0000
A4 = −6.8488e−005, A6 = −5.5672e−008, A8 = 1.9498e−009,
A10 = 0.0000e+000, A12 = 0.0000e+000
21th surface k = 0.0000
A4 = 1.2770e−005, A6 = 2.6558e−023, A8 = 0.0000e+000,
A10 = 0.0000e+000, A12 = 0.0000e+000

Zoom data

|  | WE | ST | TE |
|---|---|---|---|
| f(mm) | 3.956 | 14.544 | 54.221 |
| FNO. | 1.637 | 2.690 | 3.646 |
| 2ω | 91.3 | 27.8 | 7.5 |
| IH | 3.65 | 3.65 | 3.65 |
| LTL | 135.165 | 135.165 | 135.165 |
| BF(mm) | 4.795 | 4.795 | 4.795 |
| d5 | 0.879 | 25.222 | 45.336 |
| d11 | 45.780 | 21.437 | 1.323 |
| d12 | 22.839 | 7.296 | 1.287 |
| d17 | 2.103 | 5.663 | 19.451 |
| d19 | 3.599 | 15.582 | 7.803 |

Unit focal length

| f1 = 84.89 | f2 = −12.10 | f3 = 20.74 | f4 = −20.75 | f5 = 16.27 |
|---|---|---|---|---|

Example 11

Unit mm

Surface data

| Surface no. | r | d | nd | vd |
|---|---|---|---|---|
| Object plane | ∞ | ∞ | | |
| 1 | 243.515 | 1.400 | 1.80000 | 29.84 |
| 2 | 36.227 | 9.104 | 1.49700 | 81.54 |
| 3 | −3770.163 | 0.142 | | |
| 4 | 47.688 | 5.650 | 1.88300 | 40.76 |
| 5 | 1065.342 | Variable | | |
| 6 | −798.882 | 0.800 | 1.75500 | 52.32 |
| 7 | 11.407 | 6.272 | | |
| 8* | −64.584 | 0.800 | 1.85135 | 40.10 |
| 9* | 12.632 | 2.340 | | |
| 10 | 30.643 | 3.450 | 2.00069 | 25.46 |
| 11 | −65.636 | Variable | | |
| 12 (Stop) | ∞ | Variable | | |

-continued

Unit mm

| | | | | |
|---|---|---|---|---|
| 13* | 17.875 | 4.132 | 1.80610 | 40.88 |
| 14* | 1079.792 | 4.587 | | |
| 15 | 21.261 | 0.553 | 1.85478 | 24.80 |
| 16 | 9.165 | 5.650 | 1.49700 | 81.54 |
| 17 | −39.954 | Variable | | |
| 18* | −33.009 | 1.366 | 1.51633 | 64.14 |
| 19* | 10.200 | Variable | | |
| 20* | 11.740 | 5.000 | 1.59201 | 67.02 |
| 21* | −30.538 | 0.700 | | |
| 22 | 56.202 | 0.550 | 1.91082 | 35.25 |
| 23 | 8.600 | 6.306 | 1.59282 | 68.63 |
| 24 | −17.000 | 1.344 | | |
| 25 | ∞ | 0.500 | 1.51633 | 64.14 |
| 26 | ∞ | | | |
| Image plane | ∞ | | | |

Aspherical surface data

8th surface k = 0.0000
A4 = 2.1333e−004, A6 = −5.7273e−006, A8 = 6.8151e−008,
A10 = −4.1628e−010, A12 = 1.0339e−012
9th surface k = 0.0000
A4 = 4.2826e−005, A6 = −6.4395e−006, A8 = 8.3493e−008,
A10 = −5.5514e−010, A12 = 1.4091e−012
13th surface k = 0.0000
A4 = −1.2498e−005, A6 = 7.7352e−008, A8 = −1.3419e−009,
A10 = 3.7183e−012, A12 = −2.2084e−013
14th surface k = 0.0000
A4 = 1.4861e−005, A6 = 8.5805e−008, A8 = −5.6752e−010,
A10 = −3.7301e−011, A12 = 5.0346e−014
18th surface k = 0.0000
A4 = 3.8722e−004, A6 = −1.0711e−005, A8 = 1.4156e−007,
A10 = −5.8957e−010, A12 = −2.5601e−012
19th surface k = 0.0000
A4 = 3.6419e−004, A6 = −1.1035e−005, A8 = 5.7766e−008,
A10 = 1.8271e−009, A12 = −2.4222e−011
20th surface k = 0.0000
A4 = −9.5913e−006, A6 = −3.2339e−007, A8 = −6.0866e−008,
A10 = 1.5900e−009, A12 = −2.2086e−011
21th surface k = 0.0000
A4 = 2.3047e−004, A6 = −4.4458e−006, A8 = 7.4719e−008,
A10 = −1.5001e−009, A12 = 5.2578e−012

Zoom data

| | WE | ST | TE |
|---|---|---|---|
| f(mm) | 3.715 | 12.998 | 52.569 |
| FNO. | 1.632 | 2.832 | 4.610 |
| 2ω | 98.1 | 32.7 | 8.3 |
| IH | 4.00 | 4.00 | 4.00 |
| LTL | 134.266 | 134.266 | 134.266 |
| BF(mm) | 5.173 | 5.173 | 5.173 |
| d5 | 0.672 | 22.587 | 40.090 |
| d11 | 40.716 | 18.801 | 1.298 |
| d12 | 23.620 | 8.272 | 1.292 |
| d17 | 1.797 | 6.383 | 21.614 |
| d19 | 3.485 | 14.247 | 5.996 |

Unit focal length

| | | | | |
|---|---|---|---|---|
| f1 = 75.12 | f2 = −11.05 | f3 = 19.13 | f4 = −14.93 | f5 = 14.10 |

Example 12

Unit mm

Surface data

| Surface no. | r | d | nd | vd |
|---|---|---|---|---|
| Object plane | ∞ | ∞ | | |
| 1 | 96.913 | 1.600 | 1.92119 | 23.96 |
| 2 | 35.025 | 6.931 | 1.51633 | 64.14 |
| 3 | 275.273 | 0.250 | | |
| 4 | 42.405 | 4.600 | 1.91082 | 35.25 |
| 5 | 264.575 | Variable | | |
| 6 | 264.575 | 0.950 | 1.78800 | 47.37 |
| 7 | 10.900 | 5.812 | | |
| 8* | −120.313 | 0.800 | 1.85135 | 40.10 |
| 9* | 15.518 | 5.151 | | |
| 10 | 45.483 | 2.700 | 1.92286 | 20.88 |
| 11 | −120.498 | Variable | | |
| 12 (Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | Variable | | |
| 20* | 13.004 | 3.800 | 1.58313 | 59.38 |
| 21 | −25.125 | 0.500 | 1.60562 | 43.70 |
| 22 | −850.000 | 3.500 | | |
| 23 | 18.320 | 0.600 | 2.00100 | 29.13 |
| 24 | 8.400 | 5.727 | 1.63854 | 55.38 |
| 25 | −31.484 | 1.986 | | |
| 26 | ∞ | 0.500 | 1.51633 | 64.14 |
| 27 | ∞ | | | |
| Image plane | ∞ | | | |

Aspherical surface data

8th surface k = 0.0000
A4 = 1.5897e−004, A6 = −4.6243e−006, A8 = 6.0294e−008,
A10 = −4.3744e−010, A12 = 1.4215e−012
9th surface k = 0.0000
A4−5.4622e−005, A6 = −4.8681e−006, A8 = 6.2006e−008,
A10 = −4.3749e−010, A12 = 1.3677e−012
13th surface k = 0.0000
A4 = −8.0152e−007, A6 = −3.4395e−007, A8 = 9.0517e−009,
A10 = −1.4953e−010, A12 = 9.3464e−013
14th surface k = 0.0000
A4 = 2.4705e−005, A6 = −4.0759e−007, A8 = 1.0962e−008,
A10 = −2.0152e−010, A12 = 1.4434e−012
18th surface k = 0.0000
A4 = 1.5541e−004, A6 = −6.7393e−006, A8 = 2.3846e−007,
A10 = −5.0744e−009, A12 = 5.5675e−011

-continued

Unit mm

19th surface k = 0.0000
A4 = 1.4156e−004, A6 = −9.5105e−006, A8 = 3.6964e−007,
A10 = −8.9290e−009, A12 = 1.0492e−010
20th surface k = 0.0000
A4 = −4.0000e−005, A6 = −8.0000e−007, A8 = 2.4500e−008,
A10 = −4.0300e 010, A12 = 1.6334e−012, A14 = 9.5550e−015

Zoom data

|  | WE | ST | TE |
|---|---|---|---|
| f(mm) | 3.858 | 13.681 | 54.586 |
| FNO. | 1.616 | 2.718 | 3.743 |
| 2ω | 93.6 | 31.6 | 8.1 |
| IH | 3.90 | 3.90 | 3.90 |
| LTL | 135.411 | 135.411 | 135.411 |
| BF(mm) | 5.816 | 5.816 | 5.816 |
| d5 | 0.701 | 19.946 | 37.993 |
| d11 | 38.792 | 19.547 | 1.500 |
| d12 | 25.309 | 5.262 | 1.200 |
| d17 | 1.806 | 8.048 | 22.220 |
| d19 | 3.300 | 17.105 | 6.995 |

Unit focal length f1 = 69.54   f2 = −10.66   f3 = 21.10   f4 = −16.72   f5 = 15.54

Example 13

Unit mm

Surface data

| Surface no. | r | d | nd | vd |
|---|---|---|---|---|
| Object plane | ∞ | ∞ |  |  |
| 1 | 96.456 | 1.589 | 1.92119 | 23.96 |
| 2 | 33.488 | 0.413 |  |  |
| 3 | 34.295 | 6.800 | 1.51633 | 64.14 |
| 4 | 217.717 | 0.250 |  |  |
| 5 | 41.416 | 4.764 | 1.91082 | 35.25 |
| 6 | 346.391 | Variable |  |  |
| 7 | 371.527 | 0.950 | 1.78800 | 47.37 |
| 8 | 10.900 | 5.800 |  |  |
| 9* | −189.736 | 0.800 | 1.85135 | 40.10 |
| 10* | 15.416 | 4.653 |  |  |
| 11 | 43.038 | 2.769 | 1.92286 | 20.88 |
| 12 | −130.000 | Variable |  |  |
| 13 (Stop) | ∞ | Variable |  |  |
| 14* | 21.109 | 4.279 | 1.80610 | 40.88 |
| 15* | −580.407 | 5.759 |  |  |
| 16 | 25.990 | 0.650 | 1.85478 | 24.80 |
| 17 | 10.515 | 5.150 | 1.49700 | 81.54 |
| 18 | −31.477 | Variable |  |  |
| 19* | −47.449 | 0.898 | 1.58313 | 59.38 |
| 20* | 12.359 | Variable |  |  |
| 21* | 13.380 | 3.800 | 1.58313 | 59.38 |
| 22* | −400.000 | 3.558 |  |  |
| 23 | 18.929 | 0.600 | 2.00100 | 29.13 |
| 24 | 8.400 | 6.414 | 1.61800 | 63.40 |
| 25 | −26.140 |  |  |  |
| Image plane | ∞ |  |  |  |

Aspherical surface data

9th surface k = 0.0000
A4 = 1.5920e−004, A6 = −4.6919e−006, A8 = 6.0308e−008,
A10 = −4.3960e−010, A12 = 1.4688e−012

-continued

Unit mm

10th surface k = 0.0000
A4 = 5.2509e−005, A6 = −4.9113e−006, A8 = 6.0347e−008,
A10 = −4.1628e−010, A12 = 1.3090e−012
14th surface k = 0.0000
A4 = −1.0088e−006, A6 = −3.7363e−007, A8−8.4108e−009,
A10 = −1.5710e−010, A12 = 1.1456e−012
15th surface k = 0.0000
A4 = 2.0274e−005, A6 = −4.3298e−007, A8 = 1.0041e−008,
A10 = −2.0972e−010, A12 = 1.7329e−012
19th surface k = 0.0000
A4−1.4880e−004, A6 = −6.9569e−006, A8 = 2.4539e−007,
A10 = −4.6265e−009, A12 = 4.5653e−011
20th surface k = 0.0000
A4 = 1.4158e−004, A6 = −1.0238e−005, A8 = 3.9174e−007,
A10 = −8.3616e−009, A12 = 8.9175e−011
21th surface k = 0.0000
A4 = 4.2184e−005, A6 = −1.9187e−006, A8 = 2.8465e−008,
A10 = −3.7643e−010, A12 = −3.9956e−013
22th surface k = 0.0000
A4 = 1.1645e−004, A6 = −2.3843e−006, A8 = 4.2751e−008,
A10 = −7.9965e−010, A12 = 3.5203e−012

Zoom data

|  | WE | ST | TE |
|---|---|---|---|
| f(mm) | 3.920 | 13.900 | 55.460 |
| FNO, | 1.633 | 2.678 | 3.635 |
| 2ω | 93.1 | 31.1 | 7.9 |
| IH | 3.90 | 3.90 | 3.90 |
| LTL | 135.264 | 135.264 | 135.264 |
| BF(mm) | 6.061 | 6.061 | 6.061 |
| d6 | 0.700 | 20.317 | 38.205 |
| d12 | 38.905 | 19.288 | 1.400 |
| d13 | 24.352 | 5.053 | 1.200 |
| d18 | 1.892 | 8.146 | 21.502 |
| d20 | 3.458 | 16.503 | 7.000 |

Unit focal length f1 = 68.35   f2 = −10.76   f3 = 20.96   f4 = −16.72   f5 = 15.78

Example 14

Unit mm

Surface data

| Surface no. | r | d | nd | vd |
|---|---|---|---|---|
| Object plane | ∞ | ∞ |  |  |
| 1 | 96.913 | 1.600 | 1.92119 | 23.96 |
| 2 | 35.025 | 6.931 | 1.51633 | 64.14 |
| 3 | 275.273 | 0.250 |  |  |
| 4 | 42.405 | 4.600 | 1.91082 | 35.25 |
| 5 | 264.575 | Variable |  |  |
| 6 | 264.575 | 0.950 | 1.78800 | 47.37 |
| 7 | 10.900 | 5.812 |  |  |
| 8 | −120.313 | 0.800 | 1.85135 | 40.10 |
| 9* | 15.518 | 5.151 |  |  |

-continued

| Unit mm | | | | |
|---|---|---|---|---|
| 10 | 45.483 | 2.700 | 1.92286 | 20.88 |
| 11 | −120.498 | Variable | | |
| 12 (Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | 3.300 | | |
| 20* | 13.004 | 3.800 | 1.58313 | 59.38 |
| 21* | −850.000 | 3.800 | | |
| 22 | 18.320 | 0.600 | 2.00100 | 29.13 |
| 23 | 8.400 | 5.727 | 1.61800 | 63.40 |
| 24 | −31.484 | | | |
| Image plane | ∞ | | | |

Aspherical surface data

8th surface k = 0.0000
A4 = 1.5897e−004, A6 = −4.6243e−006, A8 = 6.0294e−008,
A10 = −4.3744e−010, A12 = 1.4215e−012
9th surface k = 0.0000
A4−5.4622e−005, A6 = −4.8681e−006, A8 = 6.2006e−008,
A10 = −4.3749e−010, A12 = 1.3677e−012
13th surface k = 0.0000
A4 = −8.0152e−007, A6 = −3.4395e−007, A8 = 9.0517e−009,
A10 = −1.4953e−010, A12 = 9.3464e−013
14th surface k = 0.0000
A4 = 2.4705e−005, A6 = −4.0759e−007, A8 = 1,0962e−008,
A10 = −2.0152e−010, A12 = 1.4434e−012
18th surface k = 0.0000
A4 = 1.5541e−004, A6 = −6.7393e−006, A8 = 2.3846e−007,
A10 = −5.0744e−009, A12 = 5.5675e−011
19th surface k = 0.0000
A4 = 1.4156e−004, A6 = −9.5105e−006, A8 = 3.6964e−007,
A10 = −8.9290e−009, A12 = 1.0492e−010
20th surface k = 0.0000
A4 = 2.1326e−005, A6 = −1.5883e−006, A8 = 2.2701e−008,
A10 = −3.9311e−010, A12 = 1.3883e−012
21th surface k = 0.0000
A4 = 8.9785e−005, A6 = −2.2240e−006, A8 = 4.2912e−008,
A10 = −8.1741e−010, A12 = 4.8550e−012

Zoom data

| | WE | ST | TE |
|---|---|---|---|
| f(mm) | 3.920 | 12.513 | 53.868 |
| FNO. | 1.731 | 2.334 | 3.694 |
| 2ω | 88.0 | 30.9 | 7.4 |
| IH | 3.86 | 3.86 | 3.86 |
| LTL | 135.267 | 121.686 | 131.638 |
| BF(mm) | 5.87 | 5.87 | 5.87 |
| d5 | 0.700 | 19.944 | 37.993 |
| d11 | 42.422 | 9.597 | 1.500 |
| d12 | 21.682 | 15.217 | 1.200 |
| d17 | 1.809 | 8.274 | 22.287 |

-continued

| Unit mm | | | | |
|---|---|---|---|---|
| Unit focal length | | | | |
| f1 = 69.54 | f2 = −10.66 | f3 = 21.10 | f4 = 32.96 | |
| fGI1 = −16.72 | fGI2 = 15.86 | | | |

Example 15

| Unit mm | | | | |
|---|---|---|---|---|
| Surface data | | | | |
| Surface no. | r | d | nd | νd |
| Object plane | ∞ | ∞ | | |
| 1 | 74.305 | 1.60 | 2.00100 | 29.13 |
| 2 | 39.739 | 9.80 | 1.51633 | 64.14 |
| 3 | 510.162 | 0.25 | | |
| 4 | 43.101 | 6.70 | 1.72916 | 54.68 |
| 5 | 279.799 | Variable | | |
| 6 | 292.375 | 1.00 | 1.85150 | 40.78 |
| 7 | 10.139 | 6.50 | | |
| 8* | −35.627 | 0.80 | 1.63493 | 23.90 |
| 9* | 24.038 | 2.79 | | |
| 10 | −50.917 | 1.00 | 1.58313 | 59.38 |
| 11 | 23.297 | 4.00 | 2.00069 | 25.46 |
| 12 | −54.268 | Variable | | |
| 13(Stop) | ∞ | Variable | | |
| 14* | 16.043 | 5.70 | 1.83220 | 40.10 |
| 15* | −120.926 | 1.87 | | |
| 16 | 25.968 | 1.00 | 1.85478 | 24.80 |
| 17 | 8.834 | 4.40 | 1.43875 | 94.66 |
| 18 | −37.900 | Variable | | |
| 19* | −25.596 | 1.00 | 1.53071 | 55.69 |
| 20* | 14.290 | Variable | | |
| 21* | 13.514 | 4.30 | 1.53071 | 55.69 |
| 22* | −44.164 | 0.45 | | |
| 23 | 66.275 | 1.00 | 1.85478 | 24.80 |
| 24 | 9.670 | 5.00 | 1.77250 | 49.60 |
| 25 | −26.170 | 1.90 | | |
| 26 | ∞ | 1.66 | 1.51633 | 64.14 |
| 27 | ∞ | 1.10 | | |
| 28 | ∞ | 0.50 | 1.51633 | 64.14 |
| 29 | ∞ | 0.40 | | |
| 30 | ∞ | | | |
| Image plane | ∞ | | | |

Aspherical surface data

8th surface k = 0.000
A4 = 7.00154e−05, A6 = −9.56717e−07, A8 = 2.23446e−08,
A10 = −2.19934e−10, A12 = 5.58216e−13
9th surface k = 0.000
A4 = 2.03014e−05, A6 = −1.73413e−06, A8 = 4.54113e−08,
A10 = −5.93032e−10, A12 = 2.50946e−12
14th surface k = 0.000
A4 = −1.42780e−05, A6 = 1.48910e−08
15th surface k = 0.000
A4 = 3.21340e−05, A6 = 1.87989e−08
19th surface k = 0.000
A4 = 8.28574e−05
20th surface k = 0.000
A4 = 2. 72604e−05

| Unit mm |
| --- |

21th surface k = 0.000
A4 = 3.43371e−05, A6 = −6.70538e−07
22th surface k = 0.000
A4 = 2.10868e−04, A6 = −1.28308e−06

| Zoom data | | | |
| --- | --- | --- | --- |
| | WE | ST | TE |
| f(mm) | 4.25 | 16.28 | 62.41 |
| FNO. | 1.63 | 2.70 | 3.58 |
| 2ω | 83.91 | 24.00 | 6.41 |
| IH | 3.57 | 3.57 | 3.57 |
| LTL(in air) | 128.24 | 128.25 | 128.26 |
| BF(in air) | 4.82 | 4.82 | 4.82 |
| d5 | 0.60 | 23.92 | 40.98 |
| d12 | 41.65 | 18.33 | 1.27 |
| d13 | 12.89 | 3.40 | 1.20 |
| d18 | 2.33 | 6.23 | 11.51 |
| d20 | 6.78 | 12.37 | 9.29 |

| Unit focal length |
| --- |
| f1 = 68.44   f2 = −10.97   f3 = 18.00   f4 = −17.13   f5 = 13.48 |

Example 16

| Unit mm | | | | |
| --- | --- | --- | --- | --- |
| Surface data | | | | |
| Surface no. | r | d | nd | vd |
| Object plane | ∞ | ∞ | | |
| 1 | 75.298 | 1.60 | 2.00100 | 29.13 |
| 2 | 39.492 | 9.65 | 1.58313 | 59.38 |
| 3 | 322.982 | 0.25 | | |
| 4 | 43.084 | 6.45 | 1.72916 | 54.68 |
| 5 | 212.979 | Variable | | |
| 6 | 187.214 | 1.00 | 1.77250 | 49.60 |
| 7 | 9.461 | 6.10 | | |
| 8* | −24.055 | 0.80 | 1.86100 | 37.10 |
| 9* | 16.962 | 2.37 | | |
| 10 | 67.860 | 1.00 | 1.85150 | 40.78 |
| 11 | 17.627 | 5.30 | 2.00100 | 29.13 |
| 12 | −36.112 | Variable | | |
| 13(Stop) | ∞ | Variable | | |
| 14* | 16.763 | 4.40 | 1.74320 | 49.34 |
| 15* | −62.938 | 5.00 | | |
| 16 | 36.776 | 1.00 | 1.85478 | 24.80 |
| 17 | 8.799 | 4.40 | 1.49700 | 81.54 |
| 18 | −33.850 | Variable | | |
| 19* | −35.000 | 1.00 | 1.53071 | 55.69 |
| 20* | 18.994 | Variable | | |
| 21* | 10.780 | 5.00 | 1.53071 | 55.69 |
| 22* | −22.176 | 1.90 | | |
| 23 | ∞ | 1.66 | 1.51633 | 64.14 |
| 24 | ∞ | 1.10 | | |
| 25 | ∞ | 0.50 | 1.51633 | 64.14 |
| 26 | ∞ | 0.40 | | |
| 27 | ∞ | | | |
| Image plane | ∞ | | | |

| Aspherical surface data |
| --- |

8th surface k = 0.000
A4 = 3.18725e−05, A6 = −3.12895e−07, A8 = 8.06106e−10

9th surface k = 0.000
A4 = −8.07435e−05, A6 = −1.88676e−07, A8 = 1.16509e−09
14th surface k = 0.000
A4 = −1.69703e−05
15th surface k = 0.000
A4 = 2.65035e−05
19th surface k = 0.000
A4 = 6.59515e−05
20th surface k = 0.000
A4 = 7.16179e−05
21th surface k = 0.000
A4 = 4.66141e−05, A6 = 8.70629e−07
22th surface k = 0.000
A4 = 3.82979e−04, A6 = −2.06490e−06

| Zoom data | | | |
| --- | --- | --- | --- |
| | WE | ST | TE |
| f(mm) | 4.25 | 16.28 | 62.42 |
| FNO. | 1.63 | 2.70 | 3.57 |
| 2ω | 84.39 | 24.25 | 6.49 |
| IH | 3.60 | 3.60 | 3.60 |
| LTL(in air) | 126.22 | 126.23 | 126.25 |
| BF(in air) | 4.82 | 4.82 | 4.82 |
| d5 | 0.60 | 24.32 | 41.59 |
| d12 | 42.26 | 18.55 | 1.27 |
| d13 | 12.99 | 4.00 | 1.20 |
| d18 | 1.88 | 5.49 | 12.74 |
| d20 | 8.34 | 13.71 | 9.26 |

| Unit focal length |
| --- |
| f1 = 69.38   f2 = −10.70   f3 = 19.18   f4 = −23.05   f5 = 14.43 |

Example 17

| Unit mm | | | | |
| --- | --- | --- | --- | --- |
| Surface data | | | | |
| Surface no. | r | d | nd | vd |
| Object plane | ∞ | ∞ | | |
| 1 | 112.583 | 1.60 | 2.00100 | 29.13 |
| 2 | 42.537 | 9.27 | 1.57250 | 57.74 |
| 3 | 2639.872 | 0.25 | | |
| 4 | 47.965 | 6.42 | 1.77250 | 49.60 |
| 5 | 574.373 | Variable | | |
| 6 | 134.598 | 1.00 | 1.77250 | 49.60 |
| 7 | 9.800 | 8.29 | | |
| 8* | −19.261 | 1.00 | 1.75501 | 51.16 |
| 9* | 23.427 | 0.50 | | |
| 10 | 39.761 | 4.00 | 2.00100 | 29.13 |
| 11 | −38.266 | Variable | | |
| 12(Stop) | ∞ | Variable | | |
| 13* | 15.262 | 5.68 | 1.76450 | 49.09 |
| 14* | −124.392 | 1.59 | | |
| 15 | 28.880 | 1.00 | 1.85025 | 30.05 |

-continued

| Unit mm | | | | |
|---|---|---|---|---|
| 16 | 9.830 | 4.40 | 1.43875 | 94.66 |
| 17 | −26.249 | Variable | | |
| 18* | 1170.605 | 1.00 | 1.53071 | 55.69 |
| 19* | 13.196 | Variable | | |
| 20* | 22.608 | 4.15 | 1.53071 | 55.69 |
| 21* | −44.164 | 0.48 | | |
| 22 | −33.947 | 1.00 | 1.78472 | 25.68 |
| 23 | 8.000 | 5.10 | 1.89190 | 37.13 |
| 24 | −22.991 | 1.41 | | |
| 25 | ∞ | 1.66 | 1.51633 | 64.14 |
| 26 | ∞ | 1.10 | | |
| 27 | ∞ | 0.50 | 1.51633 | 64.14 |
| 28 | ∞ | 0.40 | | |
| 29 | ∞ | 0.00 | | |
| 30 | ∞ | | | |
| Image plane | ∞ | | | |

Aspherical surface data

8th surface $k = 0.000$
$A4 = 2.59538e{-}05$, $A6 = 1.24894e{-}06$, $A8 = -4.30344e{-}08$,
$A10 = 5.20431e{-}10$, $A12 = -2.97226e{-}12$ 9th surface $k = 0.000$
$A4 = -5.09126e{-}05$, $A6 = 3.60788e{-}07$, $A8 = -1.15270e{-}08$,
$A10 = 5.81889e{-}11$ 13th surface $k = 0.000$
$A4 = -1.98329e{-}05$, $A6 = 2.65626e{-}08$ 14th surface $k = 0.000$
$A4 = 4.29360e{-}05$, $A6 = 3.62189e{-}08$ 18th surface $k = 0.000$
$A4 = 3.66944e{-}05$ 19th surface $k = 0.000$
$A4 = 3.18078e{-}05$ 20th surface $k = 0.000$
$A4 = 7.66172e{-}05$, $A6 = -3.23939e{-}07$ 21th surface $k = 0.000$
$A4 = 2.75164e{-}04$, $A6 = -1.09540e{-}07$ Zoom data

| | WE | ST | TE |
|---|---|---|---|
| f(mm) | 4.25 | 16.29 | 62.45 |
| FNO. | 1.70 | 2.25 | 2.90 |
| 2ω | 82.98 | 23.66 | 6.36 |
| IH | 3.57 | 3.57 | 3.57 |
| LTL(in air) | 128.15 | 128.15 | 128.15 |
| BF(in air) | 4.33 | 4.33 | 4.33 |
| d5 | 0.60 | 28.03 | 43.33 |
| d11 | 43.88 | 16.45 | 1.15 |
| d12 | 13.84 | 7.79 | 1.37 |
| d17 | 1.70 | 5.25 | 15.09 |
| d19 | 7.06 | 9.56 | 6.14 |

Unit focal length $f1 = 74.06$   $f2 = -10.98$   $f3 = 17.52$   $f4 = -25.16$   $f5 = 17.13$ Example 18

| Unit mm | | | | |
|---|---|---|---|---|
| Surface data | | | | |
| Surface no. | r | d | nd | vd |
| Object plane | ∞ | ∞ | | |
| 1 | 85.190 | 1.60 | 2.00100 | 29.13 |
| 2 | 39.861 | 9.65 | 1.65160 | 58.55 |
| 3 | 455.716 | 0.25 | | |
| 4 | 38.804 | 5.65 | 1.72916 | 54.68 |
| 5 | 117.303 | Variable | | |
| 6 | 104.067 | 1.00 | 1.77250 | 49.60 |
| 7 | 9.697 | 6.50 | | |
| 8* | −20.736 | 0.80 | 1.82080 | 42.71 |
| 9* | 22.320 | 3.20 | | |
| 10 | 60.660 | 4.48 | 1.85478 | 24.80 |
| 11 | −40.377 | Variable | | |
| 12(Stop) | ∞ | Variable | | |
| 13* | 20.221 | 5.15 | 1.80625 | 40.91 |
| 14* | −515.025 | 2.29 | | |
| 15 | 17.033 | 1.08 | 1.92119 | 23.96 |
| 16 | 9.676 | 4.30 | 1.43875 | 94.66 |
| 17 | −28.538 | Variable | | |
| 18* | −24.441 | 1.00 | 1.53071 | 55.69 |
| 19* | 14.433 | Variable | | |
| 20* | 20.095 | 5.00 | 1.53071 | 55.69 |
| 21* | −20.556 | 1.18 | | |
| 22 | 22.434 | 0.96 | 1.85478 | 24.80 |
| 23 | 7.755 | 4.20 | 1.67790 | 55.34 |
| 24 | −47.865 | 1.90 | | |
| 25 | ∞ | 1.66 | 1.51633 | 64.14 |
| 26 | ∞ | 1.10 | | |
| 27 | ∞ | 0.50 | 1.51633 | 64.14 |
| 28 | ∞ | 0.40 | | |
| 29 | ∞ | | | |
| Image plane | ∞ | | | |

Aspherical surface data

8th surface $k = 0.000$
$A4 = 7.05088e{-}05$, $A6 = -9.89939e{-}07$, $A8 = 5.39911e{-}09$,
$A10 = -2.86165e{-}11$ 9th surface $k = 0.000$
$A4 = -1.55537e{-}05$, $A6 = -9.45234e{-}07$, $A8 = 5.80775e{-}09$,
$A10 = -1.24163e{-}11$ 13th surface $k = 0.000$
$A4 = 1.08488e{-}05$, $A6 = 7.95359e{-}08$ 14th surface $k = 0.000$
$A4 = 4.20909e{-}05$, $A6 = 3.88176e{-}08$ 18th surface $k = 0.000$
$A4 = -1.55872e{-}04$, $A6 = 7.16800e{-}07$ 19th surface $k = 0.000$
$A4 = -2.22811e{-}04$, $A6 = -4.00081e{-}07$ 20th surface $k = 0.000$
$A4 = 4.41342e{-}05$, $A6 = 5.95755e{-}07$ 21th surface $k = 0.000$
$A4 = 1.82459e{-}04$, $A6 = 6.24812e{-}07$ -continued

| Unit mm | | | |
|---|---|---|---|
| Zoom data | | | |
| | WE | ST | TE |
| f(mm) | 3.90 | 14.94 | 57.28 |
| FNO. | 1.62 | 2.65 | 3.53 |
| 2ω | 88.98 | 26.26 | 6.97 |
| IH | 3.60 | 3.60 | 3.60 |
| LTL(in air) | 128.24 | 128.24 | 128.24 |
| BF(in air) | 4.82 | 4.82 | 4.82 |
| d5 | 0.60 | 24.79 | 41.72 |
| d11 | 42.39 | 18.20 | 1.27 |
| d12 | 10.56 | 2.42 | 1.20 |
| d17 | 3.06 | 7.46 | 14.26 |
| d19 | 8.51 | 12.25 | 6.68 |

Unit focal length f1 = 69.89  f2 = −9.69  f3 = 17.78  f4 = −16.95  f5 = 13.65

Example 19

| Unit mm | | | | |
|---|---|---|---|---|
| Surface data | | | | |
| Surface no. | r | d | nd | vd |
| Object plane | ∞ | ∞ | | |
| 1 | 78.214 | 1.60 | 2.00100 | 29.13 |
| 2 | 41.631 | 9.70 | 1.58313 | 59.38 |
| 3 | 311.597 | 0.25 | | |
| 4 | 44.015 | 6.20 | 1.72916 | 54.68 |
| 5 | 175.043 | Variable | | |
| 6 | 180.669 | 1.00 | 1.77250 | 49.60 |
| 7 | 10.084 | 6.65 | | |
| 8* | −22.237 | 0.80 | 1.86100 | 37.10 |
| 9* | 15.411 | 2.19 | | |
| 10 | 59.435 | 1.00 | 1.85150 | 40.78 |
| 11 | 17.312 | 5.55 | 2.00100 | 29.13 |
| 12 | −33.745 | Variable | | |
| 13(Stop) | ∞ | Variable | | |
| 14* | 15.942 | 4.40 | 1.74320 | 49.34 |
| 15* | −57.763 | 4.50 | | |
| 16 | 39.599 | 1.00 | 1.85478 | 24.80 |
| 17 | 8.583 | 4.50 | 1.49700 | 81.54 |
| 18 | −37.640 | Variable | | |
| 19* | −35.253 | 1.00 | 1.53071 | 55.69 |
| 20* | 16.567 | Variable | | |
| 21* | 10.542 | 4.98 | 1.53071 | 55.69 |
| 22* | −18.462 | 1.90 | | |
| 23 | ∞ | 1.66 | 1.51633 | 64.14 |
| 24 | ∞ | 1.10 | | |
| 25 | ∞ | 0.50 | 1.51633 | 64.14 |
| 26 | ∞ | 0.40 | | |
| 27 | ∞ | | | |
| Image plane | ∞ | | | |

Aspherical surface data

8th surface k = 0.000
A4 = 7.63900e−05, A6 = −6.59696e−07, A8 = 1.82009e−09

9th surface k = 0.000
A4 = −6.09643e−05, A6 = −5.94685e−07, A8 = 2.45748e−09

14th surface k = 0.000
A4 = −1.95196e−05

-continued

| Unit mm |
|---|

15th surface k = 0.000
A4 = 3.07519e−05

19th surface k = 0.000
A4 = 5.70950e−05

20th surface k = 0.000
A4 = 5.60370e−05

21th surface k = 0.000
A4 = 4.09049e−05, A6 = 1.08630e−06

22th surface k = 0.000
A4 = 4.67965e−04, A6 = −2.27356e−06

| Zoom data | | | |
|---|---|---|---|
| | WE | ST | TE |
| f(mm) | 3.95 | 15.13 | 58.01 |
| FNO. | 1.63 | 2.55 | 3.52 |
| 2ω | 88.35 | 26.07 | 6.95 |
| IH | 3.60 | 3.60 | 3.60 |
| LTL(in air) | 128.36 | 128.37 | 128.39 |
| BF(in air) | 4.82 | 4.82 | 4.82 |
| d5 | 0.60 | 27.08 | 44.67 |
| d12 | 45.34 | 18.85 | 1.27 |
| d13 | 12.89 | 5.10 | 1.20 |
| d18 | 1.85 | 5.45 | 13.51 |
| d20 | 7.52 | 11.71 | 7.55 |

Unit focal length f1 = 74.89  f2 = −10.89  f3 = 18.90  f4 = −21.10  f5 = 13.44

Example 20

| Unit mm | | | | |
|---|---|---|---|---|
| Surface data | | | | |
| Surface no. | r | d | nd | vd |
| Object plane | ∞ | ∞ | | |
| 1 | 65.809 | 1.60 | 1.85478 | 24.80 |
| 2 | 38.766 | 7.95 | 1.55032 | 75.50 |
| 3 | 223.530 | 0.25 | | |
| 4 | 42.992 | 4.85 | 1.77250 | 49.60 |
| 5 | 124.311 | Variable | | |
| 6 | 111.728 | 1.00 | 1.77250 | 49.60 |
| 7 | 9.925 | 6.50 | | |
| 8* | −20.833 | 0.80 | 1.82080 | 42.71 |
| 9* | 21.858 | 3.65 | | |
| 10 | 53.779 | 4.50 | 1.85478 | 24.80 |
| 11 | −46.798 | Variable | | |
| 12(Stop) | ∞ | Variable | | |
| 13* | 19.827 | 5.19 | 1.80625 | 40.91 |
| 14* | −131.067 | 2.97 | | |
| 15 | 20.975 | 0.93 | 1.92119 | 23.96 |
| 16 | 10.285 | 4.75 | 1.43875 | 94.66 |
| 17 | −27.230 | Variable | | |
| 18* | −25.524 | 1.00 | 1.53071 | 55.69 |
| 19* | 13.782 | Variable | | |
| 20* | 16.275 | 5.00 | 1.53071 | 55.69 |
| 21* | −27.265 | 1.72 | | |
| 22 | 20.023 | 1.00 | 1.85478 | 24.80 |
| 23 | 7.838 | 4.62 | 1.65160 | 58.55 |

-continued

Unit mm

| | | | | |
|---|---|---|---|---|
| 24 | −64.137 | 1.90 | | |
| 25 | ∞ | 1.66 | 1.51633 | 64.14 |
| 26 | ∞ | 1.10 | | |
| 27 | ∞ | 0.50 | 1.51633 | 64.14 |
| 28 | ∞ | 0.40 | | |
| 29 | ∞ | | | |
| Image plane | ∞ | | | |

Aspherical surface data

8th surface k = 0.000
A4 = 2.99006e−04, A6 = −6.80181e−06, A8 = 7.46586e−08,
A10 = −3.35157e−10
9th surface k = 0.000
A4 = 2.04324e−04, A6 = −7.27771e−06, A8 = 8.67538e−08,
A10 = −4.05303e−10
13th surface k = 0.000
A4 = −4.49296e−06, A6 = 6.46834e−08
14th surface k = 0.000
A4 = 2.87299e−05, A6 = 4.39112e−08
18th surface k = 0.000
A4 = −4.90342e−05, A6 = 1.74426e−07
19th surface k = 0.000
A4 = −1.16616e−04, A6 = −7.34683e−07
20th surface k = 0.000
A4 = 7.27663e−06, A6 = −4.33891e−07
21th surface k = 0.000
A4 = 1.07199e−04, A6 = −5.82775e−07

Zoom data

| | WE | ST | TE |
|---|---|---|---|
| f(mm) | 3.88 | 14.87 | 56.99 |
| FNO. | 1.62 | 2.50 | 2.85 |
| 2ω | 88.78 | 26.16 | 7.03 |
| IH | 3.57 | 3.57 | 3.57 |
| LTL(in air) | 127.06 | 127.06 | 127.06 |
| BF(in air) | 4.82 | 4.82 | 4.82 |
| d5 | 0.60 | 23.23 | 40.76 |
| d11 | 41.43 | 18.80 | 1.27 |
| d12 | 11.89 | 1.29 | 1.20 |
| d17 | 2.14 | 7.03 | 13.97 |
| d19 | 7.90 | 13.61 | 6.76 |

Unit focal length f1 = 68.99  f2 = −9.67  f3 = 18.30  f4 = −16.72  f5 = 14.16

Next, the following is values of the conditional expressions in each of the examples. The values described in the following item (1) correspond to the values of Conditional Expression (1-1), (1-2), and (1-3). The values described in the following item (2) correspond to the values of Conditional Expression (2-1), and (2-2). The values described in the following item (4) correspond to the values of Conditional Expression (4-1), and (4-2). The values described in the following item (28) correspond to the values of Conditional Expression (28-1), and (28-2). The values described in the following item (29) correspond to the values of Conditional Expressions (29-1), (29-2), (29-3), (29-4), and (29-5). The values described in the following item (30) correspond to the values of Conditional Expression (30-1), and (30-2). The values described in the following item (32) correspond to the value of Conditional Expression (32-1). The values described in the following item (35) correspond to the value of Conditional Expression (35-1). The mark "hyphen (-)" means that the value cannot be calculated.

| | Example1 | Example2 | Example3 |
|---|---|---|---|
| (1)\|fG2/fw\| | 2.743 | 2.293 | 2.383 |
| (2)ΔSS/LTLw | 0 | 0 | 0 |
| (3)fG2 × PG1G2a | 0.024 | 0.034 | 0.019 |
| (4)fG1/fw | 19.486 | 12.706 | 14.274 |
| (5)(LTLt − LTLw)/LTLw | 0.000 | 0.000 | 0.000 |
| (6)fG1/ft | 1.377 | 1.046 | 1.009 |
| (7)\|fG1/fG2\| | 7.103 | 5.541 | 5.989 |
| (8)fG3/fw | 5.458 | 3.146 | 3.808 |
| (9)DTw | −6.836 | −6.178 | −4.688 |
| (10)vdG3P1 | 81.54 | 68.63 | 81.54 |
| (11)vdGI1N1 | 67.02 | 64.14 | 64.14 |
| (12)fGI2SUB1/fGI2 | 1.365 | 1.169 | 1.198 |
| (13)\|fGI2SUB1/fGI1\| | 1.048 | 1.166 | 0.986 |
| (14)DGI2SUB12a/fGI2 | 0.073 | 0.077 | 0.076 |
| (15)DGI2SUB12a/fw | 0.258 | 0.221 | 0.237 |
| (16)\|MGGI2SUB1back × (MGGI2SUB1-1)\| | 0.600 | 0.683 | 0.600 |
| (17)vdGI2SUB1P | 59.38 | 81.54 | 67.02 |
| (18)vdGI2SUB2N | 32.32 | 18.9 | 20.88 |
| (19)fG1/fG3 | 3.570 | 4.039 | 3.748 |
| (20)\|fG3/fGI1\| | 1.194 | 1.095 | 1.002 |
| (21)fG2/fGI1 | 0.600 | 0.798 | 0.627 |
| (22)\|fG2/fG3\| | 0.503 | 0.729 | 0.626 |
| (23)\|fGI1/fGI2\| | 1.303 | 1.002 | 1.215 |
| (24)fG1 × PG1NPa | 0.000 | 0.000 | 0.000 |
| (25)fGI2SUB1/fw | 4.790 | 3.350 | 3.747 |
| (26)SFGI2SUB1 | −0.477 | 0.247 | 0.254 |
| (27)ΔG3M/LTLw | 0.113 | 0.068 | 0.077 |
| (28)ΩHw/2 | 41.877 | 38.769 | 39.781 |
| (29)ft/fw | 14.15 | 12.14 | 14.15 |
| (30)FNOw | 1.62 | 1.51 | 1.48 |
| (31)FNOt | 3.27 | 1.94 | 3.01 |
| (32)ΣG1/LTLw | 0.087 | 0.161 | 0.145 |
| (33)ft/fw + 143.9 × tan(ΩHw/2) − 121.88 | 21.3 | 5.8 | 12.1 |
| (34)ft/fw + 126.52 × tan(ΩHw/2) − 101.91 | 25.7 | 11.8 | 17.6 |
| (35)Rimg | 3.8 | 3.6 | 3.8 |
| (36)ndGI1N1 | 1.592 | 1.516 | 1.516 |
| (37)ndGI2SUB1P | 1.583 | 1.497 | 1.592 |
| (38)\|fG22/RG2C\| | — | — | — |
| (39)RG2C/fGI2 | — | — | — |

| | Example4 | Example5 | Example6 |
|---|---|---|---|
| (1)\|fG2/fw\| | 2.569 | 2.721 | 2.732 |
| (2)ΔSS/LTLw | 0 | 0 | 0 |
| (3)fG2 × PG1G2a | −0.008 | 0.004 | 0.002 |
| (4)fG1/fw | 18.231 | 19.952 | 18.338 |
| (5)(LTLt − LTLw)/LTLw | 0.000 | 0.000 | 0.000 |
| (6)fG1/ft | 1.288 | 1.383 | 1.269 |
| (7)\|fG1/fG2\| | 7.097 | 7.334 | 6.712 |
| (8)fG3/fw | 5.327 | 5.057 | 5.015 |
| (9)DTw | −6.364 | −6.627 | −7.162 |
| (10)vdG3P1 | 81.54 | 68.63 | 68.63 |
| (11)vdGI1N1 | 63.85 | 67.02 | 81.54 |
| (12)fGI2SUB1/fGI2 | 1.444 | 1.101 | 1.079 |
| (13)\|fGI2SUB1/fGI1\| | 1.131 | 1.004 | 0.874 |
| (14)DGI2SUB12a/fGI2 | 0.190 | 0.034 | 0.067 |
| (15)DGI2SUB12a/fw | 0.662 | 0.133 | 0.265 |
| (16)\|MGGI2SUB1back × (MGGI2SUB1-1)\| | 0.600 | 0.713 | 0.709 |
| (17)vdGI2SUB1P | 63.85 | 81.54 | 81.54 |
| (18)vdGI2SUB2N | 25.46 | 28.27 | 29.13 |
| (19)fG1/fG3 | 3.423 | 3.946 | 3.657 |
| (20)\|fG3/fGI1\| | 1.195 | 1.193 | 1.031 |
| (21)fG2/fGI1 | 0.576 | 0.642 | 0.562 |
| (22)\|fG2/fG3\| | 0.482 | 0.538 | 0.545 |

-continued

| | | | |
|---|---|---|---|
| (23)\|fGI1/fGI2\| | 1.277 | 1.097 | 1.234 |
| (24)fG1 × PG1NPa | 0.000 | 0.000 | 0.000 |
| (25)fGI2SUB1/fw | 5.041 | 4.256 | 4.252 |
| (26)SFGI2SUB1 | −0.284 | −0.379 | −0.416 |
| (27)ΔG3M/LTLw | 0.100 | 0.173 | 0.170 |
| (28)ΩHw/2 | 41.987 | 44.936 | 44.098 |
| (29)ft/fw | 14.15 | 14.43 | 14.45 |
| (30)FNOw | 1.63 | 1.63 | 1.63 |
| (31)FNOt | 3.90 | 4.55 | 3.75 |
| (32)ΣG1/LTLw | 0.106 | 0.120 | 0.119 |
| (33)ft/fw + 143.9 × tan(ΩHw/2) − 121.88 | 21.8 | 36.1 | 32.0 |
| (34)ft/fw + 126.52 × tan(ΩHw/2) − 101.91 | 26.1 | 38.8 | 35.1 |
| (35)Rimg | 3.8 | 3.9 | 3.9 |
| (36)ndGI1N1 | 1.619 | 1.592 | 1.497 |
| (37)ndGI2SUB1P | 1.619 | 1.497 | 1.497 |
| (38)\|fG22/RG2C\| | — | — | — |
| (39)RG2C/fGI2 | — | — | — |

| | Example7 | Example8 | Example9 |
|---|---|---|---|
| (1)\|fG2/fw\| | 2.773 | 2.981 | 2.609 |
| (2)ΔSS/LTLw | 0 | 0 | 0.065 |
| (3)fG2 × PG1G2a | 0.000 | −0.004 | −0.010 |
| (4)fG1/fw | 18.086 | 20.250 | 15.989 |
| (5)(LTLt − LTLw)/LTLw | 0.033 | 0.000 | 0.000 |
| (6)fG1/ft | 0.903 | 1.408 | 1.130 |
| (7)\|fG1/fG2\| | 6.523 | 6.794 | 6.128 |
| (8)fG3/fw | 5.486 | 5.313 | 4.517 |
| (9)DTw | −6.744 | −5.442 | −6.592 |
| (10)vdG3P1 | 81.54 | 81.54 | 81.54 |
| (11)vdGI1N1 | 59.38 | 81.54 | 64.14 |
| (12)fGI2SUB1/fGI2 | 1.387 | 1.044 | 1.059 |
| (13)\|fGI2SUB1/fGI1\| | 1.316 | 0.957 | 1.041 |
| (14)DGI2SUB12a/fGI2 | 0.240 | 0.050 | 0.051 |
| (15)DGI2SUB12a/fw | 0.988 | 0.188 | 0.173 |
| (16)\|MGGI2SUB1back × (MGGI2SUB1-1)\| | 0.646 | 0.808 | 0.792 |
| (17)vdGI2SUB1P | 59.38 | 81.54 | 67.02 |
| (18)vdGI2SUB2N | 29.13 | 37.37 | 35.25 |
| (19)fG1/fG3 | 3.297 | 3.811 | 3.540 |
| (20)\|fG3/fGI1\| | 1.262 | 1.284 | 1.301 |
| (21)fG2/fGI1 | 0.638 | 0.720 | 0.752 |
| (22)\|fG2/fG3\| | 0.505 | 0.561 | 0.578 |
| (23)\|fGI1/fGI2\| | 1.054 | 1.090 | 1.017 |
| (24)fG1 × PG1NPa | 0.000 | 0.000 | 0.000 |
| (25)fGI2SUB1/fw | 5.722 | 3.962 | 3.614 |
| (26)SFGI2SUB1 | −0.970 | −0.319 | −0.632 |
| (27)ΔG3M/LTLw | 0.183 | 0.165 | 0.130 |
| (28)ΩHw/2 | 43.477 | 44.624 | 42.624 |
| (29)ft/fw | 20.03 | 14.38 | 14.15 |
| (30)FNOw | 1.64 | 1.63 | 1.43 |
| (31)FNOt | 3.98 | 3.82 | 3.99 |
| (32)ΣG1/LTLw | 0.099 | 0.117 | 0.123 |
| (33)ft/fw + 143.9 × tan(ΩHw/2) − 121.88 | 34.6 | 34.5 | 24.7 |
| (34)ft/fw + 126.52 × tan(ΩHw/2) − 101.91 | 38.1 | 37.3 | 28.7 |
| (35)Rimg | 3.9 | 4.0 | 4.0 |
| (36)ndGI1N1 | 1.583 | 1.497 | 1.516 |
| (37)ndGI2SUB1P | 1.583 | 1.497 | 1.592 |
| (38)\|fG22/RG2C\| | — | — | — |
| (39)RG2C/fGI2 | — | — | — |

| | Example10 | Example11 | Example12 |
|---|---|---|---|
| (1)\|fG2/fw\| | 3.058 | 2.976 | 2.763 |
| (2)ΔSS/LTLw | 0 | 0 | 0 |
| (3)fG2 × PG1G2a | 0.030 | −0.024 | 0.000 |
| (4)fG1/fw | 21.461 | 20.223 | 18.025 |
| (5)(LTLt − LTLw)/LTLw | 0.000 | 0.000 | 0.000 |
| (6)fG1/ft | 1.566 | 1.429 | 1.274 |
| (7)\|fG1/fG2\| | 7.018 | 6.796 | 6.523 |
| (8)fG3/fw | 5.244 | 5.150 | 5.468 |
| (9)DTw | −9.801 | −6.540 | −5.123 |
| (10)vdG3P1 | 81.54 | 81.54 | 81.54 |
| (11)vdGI1N1 | 64.14 | 64.14 | 59.38 |
| (12)fGI2SUB1/fGI2 | 1.160 | 1.063 | 1.441 |

-continued

| | | | |
|---|---|---|---|
| (13)\|fGI2SUB1/fGI1\| | 0.909 | 1.004 | 1.339 |
| (14)DGI2SUB12a/fGI2 | 0.082 | 0.050 | 0.225 |
| (15)DGI2SUB12a/fw | 0.337 | 0.188 | 0.907 |
| (16)\|MGGI2SUB1back × (MGGI2SUB1-1)\| | 0.597 | 0.786 | 0.625 |
| (17)vdGI2SUB1P | 59.38 | 67.02 | 59.38 |
| (18)vdGI2SUB2N | 35.25 | 35.25 | 29.13 |
| (19)fG1/fG3 | 4.092 | 3.926 | 3.297 |
| (20)\|fG3/fGI1\| | 1.000 | 1.281 | 1.262 |
| (21)fG2/fGI1 | 0.583 | 0.740 | 0.638 |
| (22)\|fG2/fG3\| | 0.583 | 0.578 | 0.505 |
| (23)\|fGI1/fGI2\| | 1.276 | 1.059 | 1.076 |
| (24)fG1 × PG1NPa | 0.000 | 0.000 | 0.000 |
| (25)fGI2SUB1/fw | 4.770 | 4.033 | 5.803 |
| (26)SFGI2SUB1 | −0.333 | −0.445 | −0.970 |
| (27)ΔG3M/LTLw | 0.159 | 0.166 | 0.178 |
| (28)ΩHw/2 | 41.728 | 45.127 | 42.887 |
| (29)ft/fw | 13.71 | 14.15 | 14.15 |
| (30)FNOw | 1.64 | 1.63 | 1.62 |
| (31)FNOt | 3.65 | 4.61 | 3.74 |
| (32)ΣG1/LTLw | 0.090 | 0.121 | 0.099 |
| (33)ft/fw + 143.9 × tan(ΩHw/2) − 121.88 | 20.2 | 36.8 | 25.9 |
| (34)ft/fw + 126.52 × tan(ΩHw/2) − 101.91 | 24.6 | 39.3 | 29.8 |
| (35)Rimg | 3.7 | 4.0 | 3.9 |
| (36)ndGI1N1 | 1.516 | 1.516 | 1.583 |
| (37)ndGI2SUB1P | 1.583 | 1.592 | 1.583 |
| (38)\|fG22/RG2C\| | — | — | — |
| (39)RG2C/fGI2 | — | — | — |

| | Example13 | Example14 | Example15 |
|---|---|---|---|
| (1)\|fG2/fw\| | 2.744 | 2.720 | 2.583 |
| (2)ΔSS/LTLw | 0 | 0 | 0 |
| (3)fG2 × PG1G2a | −0.002 | 0.000 | −0.002 |
| (4)fG1/fw | 17.437 | 17.741 | 16.103 |
| (5)(LTLt − LTLw)/LTLw | 0.000 | −0.027 | 0.000 |
| (6)fG1/ft | 1.232 | 1.291 | 1.095 |
| (7)\|fG1/fG2\| | 6.354 | 6.523 | 6.234 |
| (8)fG3/fw | 5.348 | 5.382 | 4.235 |
| (9)DTw | −5.767 | −5.774 | −6.500 |
| (10)vdG3P1 | 81.54 | 81.54 | 94.66 |
| (11)vdGI1N1 | 59.38 | 59.38 | 55.69 |
| (12)fGI2SUB1/fGI2 | 1.412 | 1.387 | 1.484 |
| (13)\|fGI2SUB1/fGI1\| | 1.332 | 1.316 | 1.168 |
| (14)DGI2SUB12a/fGI2 | 0.226 | 0.240 | 0.033 |
| (15)DGI2SUB12a/fw | 0.908 | 0.969 | 0.106 |
| (16)\|MGGI2SUB1back × (MGGI2SUB1-1)\| | 0.645 | 0.646 | 0.496 |
| (17)vdGI2SUB1P | 59.38 | 59.38 | 55.69 |
| (18)vdGI2SUB2N | 29.13 | 29.13 | 24.8 |
| (19)fG1/fG3 | 3.261 | 3.297 | 3.803 |
| (20)\|fG3/fGI1\| | 1.254 | 1.262 | 1.051 |
| (21)fG2/fGI1 | 0.643 | 0.638 | 0.641 |
| (22)\|fG2/fG3\| | 0.513 | 0.505 | 0.610 |
| (23)\|fGI1/fGI2\| | 1.060 | 1.054 | 1.271 |
| (24)fG1 × PG1NPa | 0.048 | 0.000 | 0.000 |
| (25)fGI2SUB1/fw | 5.683 | 5.612 | 4.709 |
| (26)SFGI2SUB1 | −0.935 | −0.970 | −0.531 |
| (27)ΔG3M/LTLw | 0.171 | 0.151 | 0.091 |
| (28)ΩHw/2 | 42.627 | 40.118 | 37.936 |
| (29)ft/fw | 14.15 | 13.74 | 14.70 |
| (30)FNOw | 1.63 | 1.73 | 1.63 |
| (31)FNOt | 3.63 | 3.69 | 3.58 |
| (32)ΣG1/LTLw | 0.102 | 0.099 | 0.142 |
| (33)ft/fw + 143.9 × tan(ΩHw/2) − 121.88 | 24.7 | 13.1 | 5.0 |
| (34)ft/fw + 126.52 × tan(ΩHw/2) − 101.91 | 28.7 | 18.4 | 11.4 |
| (35)Rimg | 3.9 | 3.6 | 3.6 |
| (36)ndGI1N1 | 1.583 | 1.583 | 1.531 |
| (37)ndGI2SUB1P | 1.583 | 1.583 | 1.531 |
| (38)\|fG22/RG2C\| | — | — | 0.965 |
| (39)RG2C/fGI2 | — | — | — |

-continued

|  | Example16 | Example17 | Example18 |
|---|---|---|---|
| (1)\|fG2/fw\| | 2.520 | 2.582 | 2.485 |
| (2)ΔSS/LTLw | 0 | 0 | 0 |
| (3)fG2 × PG1G2a | 0.007 | 0.062 | 0.011 |
| (4)fG1/fw | 16.324 | 17.411 | 17.919 |
| (5)(LTLt − LTLw)/LTLw | 0.000 | 0.000 | 0.000 |
| (6)fG1/ft | 1.111 | 1.174 | 1.220 |
| (7)\|fG1/fG2\| | 6.477 | 6.745 | 7.211 |
| (8)fG3/fw | 4.513 | 4.118 | 4.558 |
| (9)DTw | −6.500 | −5.501 | −6.006 |
| (10)vdG3P1 | 81.54 | 94.66 | 94.66 |
| (11)vdGI1N1 | 55.69 | 55.69 | 55.69 |
| (12)fGI2SUB1/fGI2 | 1.000 | 1.681 | 1.466 |
| (13)\|fGI2SUB1/fGI1\| | 0.626 | 1.145 | 1.180 |
| (14)DGI2SUB12a/fGI2 | — | 0.028 | 0.086 |
| (15)DGI2SUB12a/fw | — | 0.113 | 0.302 |
| (16)\|MGGI2SUB1back × (MGGI2SUB1-1)\| | — | 0.316 | 0.502 |
| (17)vdGI2SUB1P | 55.69 | 55.69 | 55.69 |
| (18)vdGI2SUB2N | — | 25.68 | 24.8 |
| (19)fG1/fG3 | 3.617 | 4.228 | 3.931 |
| (20)\|fG3/fGI1\| | 0.832 | 0.696 | 1.049 |
| (21)fG2/fGI1 | 0.465 | 0.437 | 0.572 |
| (22)\|fG2/fG3\| | 0.558 | 0.627 | 0.545 |
| (23)\|fGI1/fGI2\| | 1.598 | 1.469 | 1.242 |
| (24)fG1 × PG1NPa | 0.000 | 0.000 | 0.000 |
| (25)fGI2SUB1/fw | 3.395 | 6.770 | 5.128 |
| (26)SFGI2SUB1 | −0.346 | −0.323 | −0.011 |
| (27)ΔG3M/LTLw | 0.093 | 0.097 | 0.073 |
| (28)ΩHw/2 | 38.041 | 37.623 | 40.416 |
| (29)ft/fw | 14.70 | 14.83 | 14.69 |
| (30)FNOw | 1.63 | 1.70 | 1.62 |
| (31)FNOt | 3.57 | 2.91 | 3.54 |
| (32)ΣG1/LTLw | 0.141 | 0.136 | 0.133 |
| (33)ft/fw + 143.9 × tan(ΩHw/2) − 121.88 | 5.4 | 3.9 | 15.4 |
| (34)ft/fw + 126.52 × tan(ΩHw/2) − 101.91 | 11.8 | 10.4 | 20.5 |
| (35)Rimg | 3.6 | 3.6 | 3.6 |
| (36)ndGI1N1 | 1.531 | 1.531 | 1.531 |
| (37)ndGI2SUB1P | 1.531 | 1.531 | 1.531 |
| (38)\|fG22/RG2C\| | 0.650 | — | — |
| (39)RG2C/fGI2 | 1.222 | — | — |

|  | Example19 | Example20 |
|---|---|---|
| (1)\|fG2/fw\| | 2.758 | 2.492 |
| (2)ΔSS/LTLw | 0 | 0 |
| (3)fG2 × PG1G2a | −0.002 | 0.009 |
| (4)fG1/fw | 18.960 | 17.774 |
| (5)(LTLt − LTLw)/LTLw | 0.000 | 0.000 |
| (6)fG1/ft | 1.290 | 1.210 |
| (7)\|fG1/fG2\| | 6.876 | 7.133 |
| (8)fG3/fw | 4.785 | 4.715 |
| (9)DTw | −6.119 | −6.004 |
| (10)vdG3P1 | 81.54 | 94.66 |
| (11)vdGI1N1 | 55.69 | 55.69 |
| (12)fGI2SUB1/fGI2 | 1.000 | 1.412 |
| (13)\|fGI2SUB1/fGI1\| | 0.637 | 1.196 |
| (14)DGI2SUB12a/fGI2 | — | 0.122 |
| (15)DGI2SUB12a/fw | — | 0.443 |
| (16)\|MGGI2SUB1back × (MGGI2SUB1-1)\| | — | 0.559 |
| (17)vdGI2SUB1P | 55.69 | 55.69 |
| (18)vdGI2SUB2N | — | 24.8 |
| (19)fG1/fG3 | 3.963 | 3.769 |
| (20)\|fG3/fGI1\| | 0.896 | 1.095 |
| (21)fG2/fGI1 | 0.516 | 0.579 |
| (22)\|fG2/fG3\| | 0.576 | 0.528 |
| (23)\|fGI1/fGI2\| | 1.569 | 1.180 |
| (24)fG1 × PG1NPa | 0.000 | 0.000 |
| (25)fGI2SUB1/fw | 3.404 | 5.153 |
| (26)SFGI2SUB1 | −0.273 | −0.252 |
| (27)ΔG3M/LTLw | 0.091 | 0.084 |
| (28)ΩHw/2 | 39.996 | 40.280 |
| (29)ft/fw | 14.70 | 14.69 |
| (30)FNOw | 1.63 | 1.62 |
| (31)FNOt | 3.52 | 2.85 |
| (32)ΣG1/LTLw | 0.138 | 0.115 |
| (33)ft/fw + 143.9 × tan(ΩHw/2) − 121.88 | 13.5 | 14.8 |
| (34)ft/fw + 126.52 × tan(ΩHw/2) − 101.91 | 18.9 | 20.0 |
| (35)Rimg | 3.6 | 3.6 |
| (36)ndGI1N1 | 1.531 | 1.531 |
| (37)ndGI2SUB1P | 1.531 | 1.531 |
| (38)\|fG22/RG2C\| | 0.605 | — |
| (39)RG2C/fGI2 | 1.288 | — |

Figure 41:
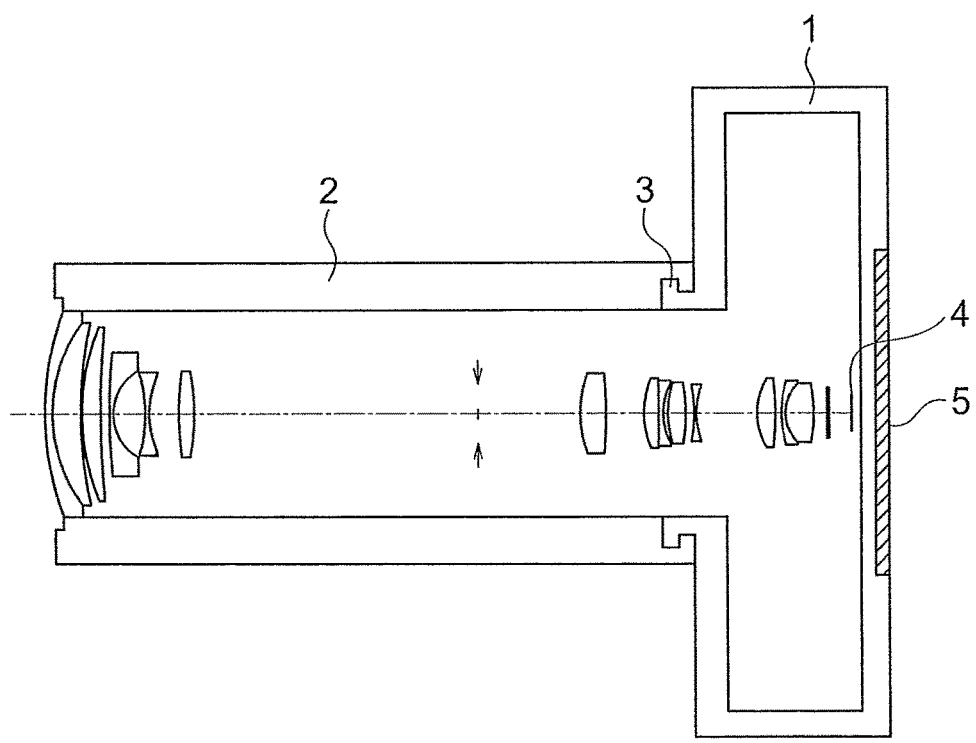
FIG. 41 is a cross-sectional view of an image pickup apparatus.

FIG. 41 is a cross-sectional view of a single-lens mirrorless camera as an electronic image pickup apparatus. In FIG. 41, a photographic optical system 2 can be disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount can be used. In this example, a bayonet-type mount is used. Moreover, an image pickup element surface 4 and a back monitor 5 can be disposed in the body of the single-lens mirrorless camera 1. As an image pickup element, an element such as a small-size COD (charge coupled device) or a CMOS (complementary metal-oxide semiconductor) can be used.

Moreover, as the photographic optical system 2 of the single-lens mirrorless camera 1, the variable magnification optical system described in any one of the examples from the first example to the twentieth example can be used.

Figure 42:
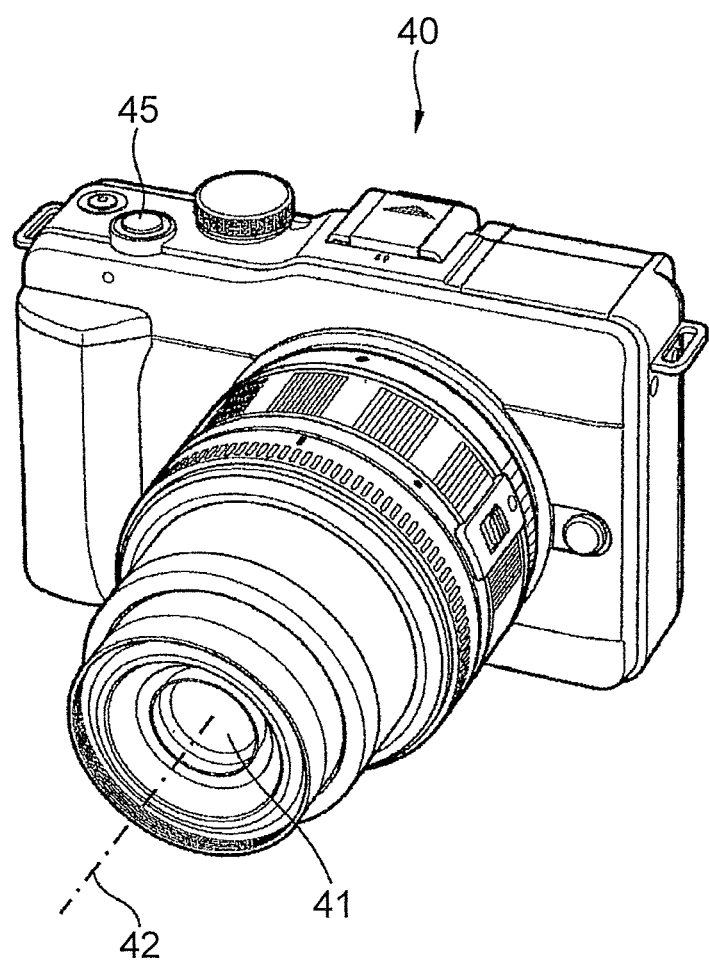
FIG. 42 is a front perspective view of the image pickup apparatus.
Figure 43:
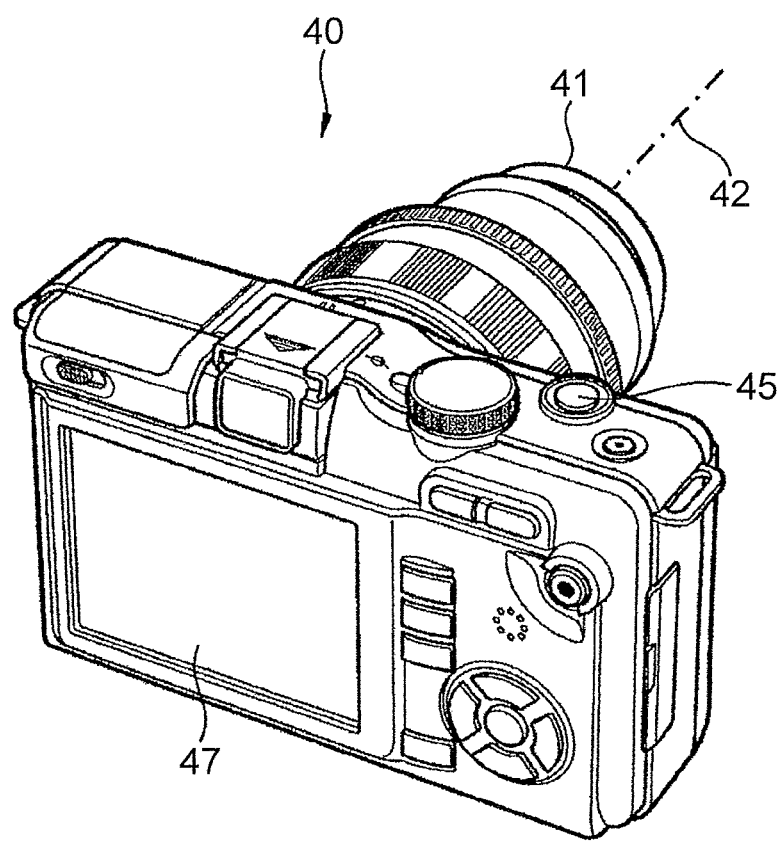
FIG. 43 is a rear perspective view of the image pickup apparatus.

FIG. 42 and FIG. 43 are conceptual diagrams of an arrangement of the image pickup apparatus. FIG. 42 is a front perspective view of a digital camera 40 as the image pickup apparatus, and FIG. 43 is a rear perspective view of the digital camera 40. The variable magnification optical system according to the present example can be used in a photographic optical system 41 of the digital camera 40.

The digital camera 40 according to the present embodiment can include the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography can be carried out by the photographic optical system 41 such as the variable magnification optical system according to the first example. An object image which is formed by the photographic optical system 41 can be formed on an image pickup element (photoelectric conversion surface) which is provided near an image forming surface. The object image which has been received optically by the image pickup element can be displayed on the liquid-crystal display monitor 47 which is provided to a rear surface of the camera, as an electronic image by a processor. Moreover, it is possible to record the electronic image which has been photographed, in a storage means.

Figure 44:
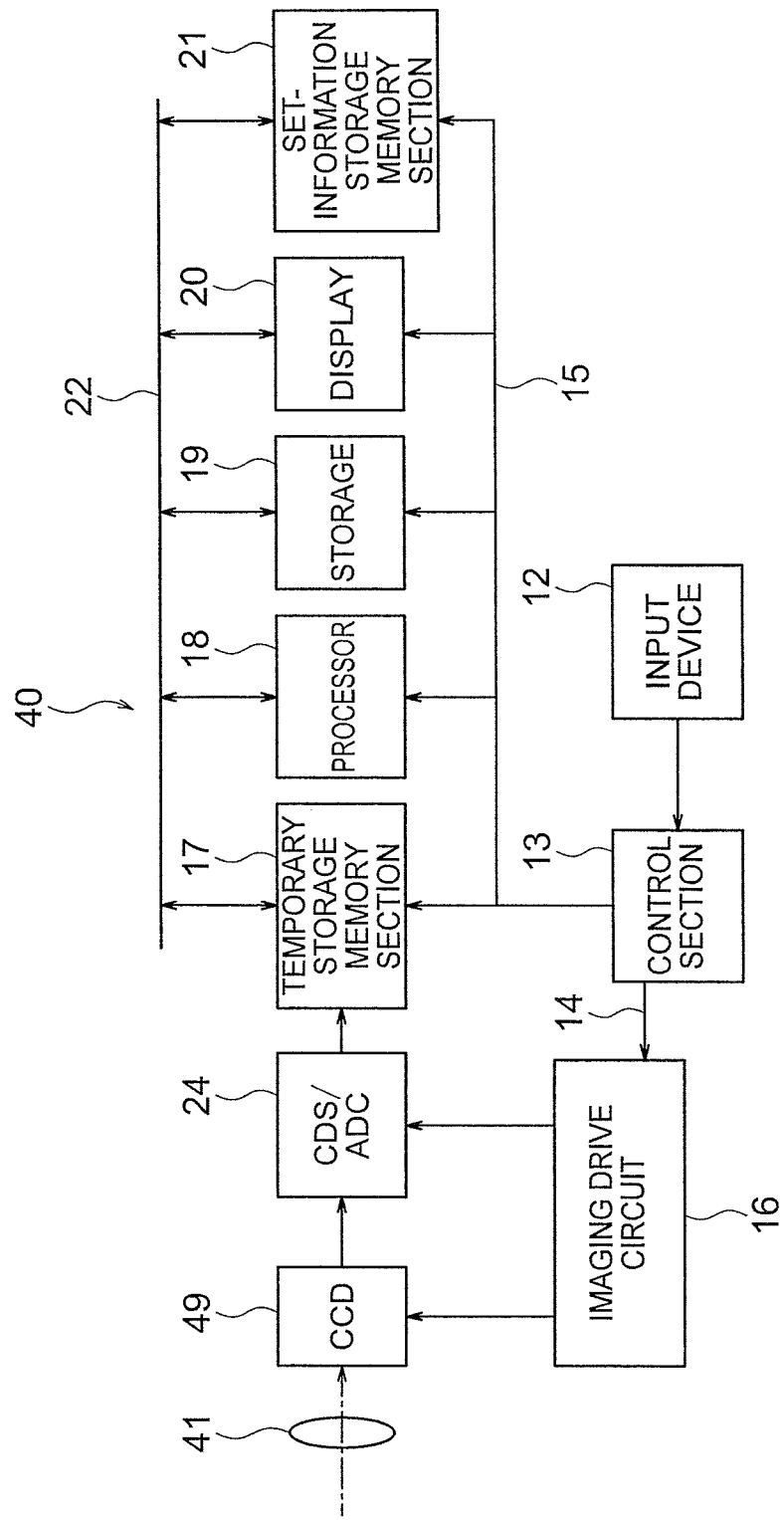
FIG. 44 is a structural block diagram of an internal circuit of a main part of the image pickup apparatus.

FIG. 44 is a structural block diagram of an internal circuit of main components of the digital camera 40. In the following description, the processor described above can include for instance, a CDS/ADC section 24, a temporary storage memory 117, and a processor 18, and a memory can consist of a storage 19 for example.

As shown in FIG. 44, the digital camera 40 can include an input device 12, a control section 13 which is connected to the input device 12, the temporary storage memory 17 and an imaging drive circuit 16 which are connected to a control-signal output port of the control section 13, via a bus 14 and a bus 15, the processor 18, the storage 19, a display 20, and a set-information storage memory section 21.

The temporary storage memory 17, the processor 18, the storage 19, the display 20, and the set-information storage memory section 21 are structured to be capable of mutually inputting and outputting data via a bus 22. Moreover, the CCD 49 and the CDS/ADC section 24 can be connected to the imaging drive circuit 16.

The input device 12 can include various input buttons and switches, and can inform the control section 13 of event information which is input from outside (by a user of the digital camera) via these input buttons and switches. The control section 13 is a central processing unit (CPU), and can include a built-in computer program memory which is not shown in the diagram. The control section 13 can control the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and can output to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 can be a buffer which includes an SDRAM (Synchronous Dynamic Random Access Memory) for example, and can be a memory device which stores temporarily the RAW data which is output from the CDS/ADC section 24. The processor 18 is a circuit which reads the RAW data stored in the temporary storage memory 17, or the RAW data stored in the storage 19, and carries out electrically various image-processing including the distortion correction, based on image-quality parameters specified by the control section 13.

The storage 19 is a recording medium in the form of a card or a stick including a flash memory for instance, detachably mounted. The storage 19 can record and maintain the RAW data transferred from the temporary storage memory 17 and image data subjected to image processing in the processor 18 in the card flash memory and the stick flash memory.

The display 20 includes the liquid-crystal display monitor, and can display photographed RAW data, image data and operation menu on the liquid-crystal display monitor. The set-information storage memory section 21 can include a. ROM section in which various image quality parameters are stored in advance, and a RAM section which stores image quality parameters which are selected by an input operation on the operating section 12, from among the image quality parameters which are read from the ROM section.

Figure 45:
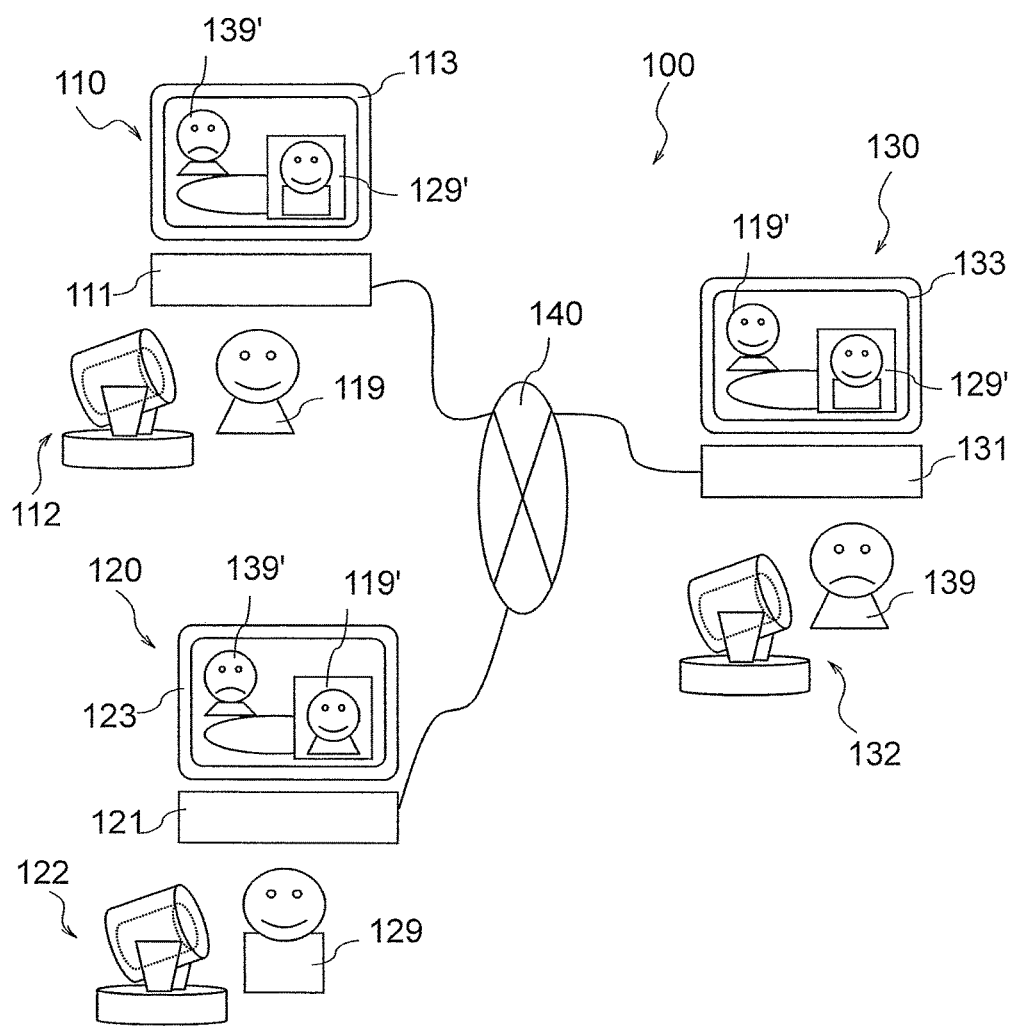
FIG. 45 is a diagram illustrating an arrangement of a television conference system.

FIG. 45 shows an arrangement of a television conference system. The television conference system 100 can include a plurality of television conference apparatuses 110, 120, and 130. Moreover, each of the television conference apparatuses 110, 120, and 130 is can be connected to a network such as a wide area network (WAN) 140.

The television conference apparatus 110 can include a main unit 111, a camera 112, and a display 113. Similarly, the television conference apparatus 120 and the television conference apparatus 130 can include same units. The camera 112 can include variable magnification optical system of example 1 and an image pickup sensor. Photography of conference participants and conference material can be carried out by the image pickup sensor.

The television conference apparatuses 110, 120, and 130 can be disposed at bases (remote places) which are mutually isolated. Therefore, image of each of conference participant 119, 129, 139 can be transmitted to a television conference apparatus used by other conference participants, via the wide area network (WAN) 140. As a result, an image 129' of the conference participants 129 and an image 139' of the conference participants 139 can be displayed on the display 113. Moreover, an audio can be also transmitted together with the transmission of images. Concerning the display 123 and the display 133, display is performed as with the display 113.

In such manner, by using the television conference system 100, even when the bases are remote places, each of the conference participants 119, 129, and 139 is able to get on with the meeting while watching and listening to other conference participants. A television conference apparatus to be used at each base is not necessarily required to be the same apparatus.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

According to the present invention, a variable magnification optical system that has a high zoom ratio and a wide angle of view and in which a small F-number is ensured at a wide angle end and various aberrations are corrected, and an image pickup apparatus that using the same, can be provided.

As described above, the present invention is suitable for a variable magnification optical system that has a high zoom ratio and a wide angle of view and in which a small F-number is ensured at a wide angle end and various aberrations are favorably corrected, and for an image pickup apparatus using the same.

What is claimed is:

1. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the first lens unit and an aperture stop are fixed,
the second lens unit moves so that a distance between the first lens unit and the second lens unit is widened at a telephoto end than at a wide angle end, and
the third lens unit moves,
the third lens unit includes a positive lens and a negative lens, and
the following Conditional Expressions (1-1) and (4-2) are satisfied:

$$1.52 \leq |fG2/fw| \leq 10.0 \quad (1\text{-}1), \text{ and}$$

$$3.1 \leq fG1/fw \leq 50 \quad (4\text{-}2)$$

where
fG1 is a focal length of the first lens unit,
fG2 is a focal length of the second lens unit, and
fw is a focal length of the variable magnification optical system at the wide angle end.

2. An image pickup apparatus comprising:
an optical system; and
an image pickup element having an image pickup surface, and converting an image formed on the image pickup surface with the optical system into an electric signal, wherein
the optical system is the variable magnification optical system according to claim 1.

3. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the first lens unit and an aperture stop are fixed,
the second lens unit moves so that a distance between the first lens unit and the second lens unit is widened at a telephoto end than at a wide angle end, and
the third lens unit moves,
the third lens unit includes a positive lens and a negative lens, and
the following Conditional Expressions (1-1), (7), and (32) are satisfied:

$$1.52 \leq |fG2/fw| \leq 10.0 \quad (1\text{-}1),$$

$$1.7 \leq |fG1/fG2| \leq 9.1 \quad (7), \text{ and}$$

$$0.04 \leq \Sigma G1/LTLw \leq 0.35 \quad (32)$$

where
fG1 is a focal length of the first lens unit,
fG2 is a focal length of the second lens unit,
fw is a focal length of the variable magnification optical system at the wide angle end,
ΣG1 is a thickness of the first lens unit, and
LTLw is an overall length of the variable magnification optical system at the wide angle end.

4. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the second lens unit moves so that a distance between the first lens unit and the second lens unit is widened at a telephoto end than at a wide angle end,
the first lens unit is fixed,
the third lens unit moves, and
an aperture stop moves only in one direction or is fixed,
the first lens unit includes a negative lens and a positive lens,
the positive lens in the first lens unit is a positive meniscus lens having a convex surface facing the object side,
the third lens unit includes a positive lens and a negative lens, and
the following Conditional Expression (1-3) is satisfied:

$$1.60 \leq |fG2/fw| \leq 10.0 \quad (1\text{-}3)$$

where
fG2 is a focal length of the second lens unit, and
fw is a focal length of the variable magnification optical system at the wide angle end.

5. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the second lens unit moves so that a distance between the first lens unit and the second lens unit is widened at a telephoto end than at a wide angle end,
the first lens unit is fixed,
the third lens unit moves, and
an aperture stop moves only in one direction or is fixed,
the third lens unit includes a positive lens and a negative lens, and
the following Conditional Expression (4-1) is satisfied:

$$8.7 \leq fG1/fw \leq 50 \quad (4\text{-}1)$$

where
fG1 is a focal length of the first lens unit, and
fw is a focal length of the variable magnification optical system at the wide angle end.

6. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
a distance between (i) the lenses belonging to the first region and (ii) the lenses belonging to the second region changes,
the second lens unit moves so that a distance between the first lens unit and the second lens unit is larger at a telephoto end than at a wide angle end,
the third lens unit moves, and
all the lenses belonging to the second region are fixed, the first lens unit includes a negative lens and a positive lens, the positive lens in the first lens unit is a positive meniscus lens having a convex surface facing the object side, the following Conditional Expressions (1-1) and (2-1) are satisfied:

$$1.52 \leq |fG2/fw| \leq 10.0 \quad (1\text{-}1), \text{ and}$$

$$0 \leq \Delta SS/LTLw \leq 0.065 \quad (2\text{-}1)$$

where fG2 is a focal length of the second lens unit, fw is a focal length of the variable magnification optical system at the wide angle end, ΔSS is a maximum amount of movement of an aperture stop at a time of changing magnification, and LTLw is an overall length of the variable magnification optical system at the wide angle end.

7. The variable magnification optical system according to claim 6, wherein the following Conditional Expression (3) is satisfied:

$$-0.067 \leq fG2 \times PG1G2a \leq 0.207 \quad (3)$$

where fG2 is a focal length of the second lens unit,

PG1G2a is represented by the following expression:

$$PG1G2a = 1/RG1B - 1/RG2F, \text{ where}$$

RG1B is a radius of curvature of the lens surface positioned closest to the image side in the first lens unit, and RG2F is a radius of curvature of the lens surface positioned closest to the object side in the second lens unit.

8. The variable magnification optical system according to claim 6, wherein the following Conditional Expression (5) is satisfied:

$$-0.20 \leq (LTLt - LTLw)/LTLw \leq 0.46 \quad (5)$$

where

LTLt is an overall length of the variable magnification optical system at the telephoto end, and LTLw is an overall length of the variable magnification optical system at the wide angle end.

9. The variable magnification optical system according to claim 6, wherein the following Conditional Expression (4-2) is satisfied:

$$3.1 \leq fG1/fw \leq 50 \quad (4\text{-}2)$$

where fG1 is a focal length of the first lens unit, and fW is the focal length of the variable magnification optical system at the wide angle end.

10. The variable magnification optical system according to claim 6, wherein the following Conditional Expression (6) is satisfied:

$$0.1 \leq fG1/ft \leq 3.0 \quad (6)$$

where fG1 is a focal length of the first lens unit, and ft is a focal length of the variable magnification optical system at the telephoto end.

11. The variable magnification optical system according to claim 6, wherein the following Conditional Expression (7) is satisfied:

$$1.7 \leq |fG1/fG2| \leq 9.1 \quad (7)$$

where fG1 is a focal length of the first lens unit, and fG2 is a focal length of the second lens unit.

12. The variable magnification optical system according to claim 6, wherein the following Conditional Expression (8) is satisfied:

$$1.0 \leq fG3/fw \leq 9.0 \quad (8)$$

where fG3 is a focal length of the third lens unit, and fW is the focal length of the variable magnification optical system at the wide angle end.

13. The variable magnification optical system according to claim 6, wherein the following Conditional Expression (9) is satisfied:

$$-14\% < DTw < 5\% \quad (9)$$

where

DTw is a distortion amount at the maximum angle of view at the wide angle end, and is indicated with the following Equation:

$$DTw = (IHw1 - IHw2)/IHw2 \times 100(\%),$$

IHw1 is a real image height when light flux including the ray of the maximum angle of view is imaged on the image surface at the wide angle end, IHw2 is a paraxial image height when light flux including the ray of the maximum angle of view is imaged on the image surface at the wide angle end, and both image heights are image heights at the time of focusing to an infinite object point.

14. The variable magnification optical system according to claim 6, wherein the third lens unit includes a predetermined positive lens that satisfies the following Conditional Expression (10):

$$63 \leq vdG3P1 \leq 100.0 \quad (10)$$

where vdG3P1 is Abbe number of the predetermined positive lens.

15. The variable magnification optical system according to claim 6, wherein:

the third lens unit includes a first positive lens and a cemented lens, and the cemented lens consists of a negative lens and a biconvex positive lens, or the cemented lens consists of a positive lens and a negative lens, and has a meniscus shape having a convex surface facing the object side.

16. The variable magnification optical system according to claim 6, wherein at the time of changing magnification, all the lenses belonging to the first region move so that a distance between the third lens unit and all the lenses belonging to the first region changes.

17. The variable magnification optical system according to claim 6, wherein at the time of changing magnification, all the lenses belonging to the first region move so that a distance between the third lens unit and all the lenses belonging to the first region is widened at the telephoto end than at the wide angle end.

18. The variable magnification optical system according to claim 6, wherein at a time of changing magnification from the wide angle end to the telephoto end, all the lenses belonging to the first region move along a locus convex towards the object side.

19. The variable magnification optical system according to claim 6, wherein all the lenses belonging to the first region are fixed at the time of changing magnification.

20. The variable magnification optical system according to claim 6, wherein all the lenses belonging to the second region are fixed at the time of changing magnification.

21. The variable magnification optical system according to claim 6, wherein all the lenses belonging to the first region are moved at a time of focusing.

22. The variable magnification optical system according to claim 6, wherein only one negative lens belongs to the first region and moves at a time of focusing.

23. The variable magnification optical system according to claim 6, wherein a predetermined negative lens that satisfies the following Conditional Expression (11) is disposed in the first region:

$$51.0 \leq vdGI1N1 \leq 100.0 \tag{11}$$

where vdGI1N1 is Abbe number of a predetermined negative lens.

24. The variable magnification optical system according to claim 6, wherein:
all the lenses belonging to the second region are divided into lenses belonging to a first sub-lens unit and lenses belonging to a second sub-lens unit,
the first sub-lens unit has a positive refractive power, and
the second sub-lens unit includes a negative lens and a positive lens.

25. The variable magnification optical system according to claim 6, wherein the aperture stop is disposed closer to the image side than the second lens unit is, and closer to the object side than the surface closest to the image side in the third lens unit.

26. The variable magnification optical system according to claim 6, wherein the aperture stop is fixed at a time of changing magnification.

27. The variable magnification optical system according to claim 6, wherein the first lens unit is fixed at a time of changing magnification.

28. The variable magnification optical system according to claim 6, wherein the following Conditional Expression (19) is satisfied:

$$2.0 \leq fG1/fG3 \leq 10.0 \tag{19}$$

where fG1 is a focal length of the first lens unit, and
fG3 is a focal length of the third lens unit.

29. The variable magnification optical system according to claim 6, wherein the following Conditional Expression (20) is satisfied:

$$0.5 \leq |fG3/fGI1| \leq 2.0 \tag{20}$$

where fG3 is a focal length of the third lens unit, and
fGI1 is a focal length on the basis of all the lenses belonging to the first region.

30. The variable magnification optical system according to claim 6, wherein the following Conditional Expression (21) is satisfied:

$$0.20 \leq fG2/fGI1 \leq 2.0 \tag{21}$$

where fG2 is a focal length of the second lens unit, and
fGI1 is a focal length on the basis of all the lenses belonging to the first region.

31. The variable magnification optical system according to claim 6, wherein the following Conditional Expression (22) is satisfied:

$$0.20 \leq |fG2/fG3| \leq 2.0 \tag{22}$$

where fG2 is a focal length of the second lens unit, and
fG3 is a focal length of the third lens unit.

32. The variable magnification optical system according to claim 6, wherein the following Conditional Expression (23) is satisfied:

$$0.5 \leq |fGI1/fGI2| \leq 2.0 \tag{23}$$

where fGI1 is a focal length on the basis of all the lenses belonging to the first region, and
fGI2 is a focal length on the basis of all the lenses belonging to the second region.

33. The variable magnification optical system according to claim 6, wherein the third lens unit move to be positioned closer to the object side at the telephoto end than at the wide angle end.

34. The variable magnification optical system according to claim 6, wherein the first lens unit further includes one positive lens.

35. The variable magnification optical system according to claim 6, wherein:
the negative lens in the first lens unit and the positive lens in the first lens unit is disposed in proximity to each other, and
the following Conditional Expression (24) is satisfied:

$$-0.1 \leq fG1 \times PG1NPa \leq 0.27 \tag{24}$$

where fG1 is a focal length of the first lens unit,
PG1NPa is represented by the following expression:

$$PG1NPa = 1/RG1NB - 1/RG1PF, \text{ where}$$

RG1NB is a radius of curvature of an image-side lens surface of the negative lens in the first lens unit, and
RG1PF is a radius of curvature of an object-side lens surface of the positive lens in the first lens unit.

36. The variable magnification optical system according to claim 6, wherein the following Conditional Expression (27) is satisfied:

$$0.03 \leq \Delta G3M/LTLw \leq 0.3 \tag{27}$$

where

ΔG3M is an amount of movement of the third lens unit moved from the wide angle end to the telephoto end, and
LTLw is an overall length of the variable magnification optical system at the wide angle end.

37. The variable magnification optical system according to claim 6, wherein the third lens unit includes a positive lens and a negative lens.

38. The variable magnification optical system according to claim 6, wherein the following Conditional Expression (28) is satisfied:

$$33.4° \leq \Omega Hw/2 \leq 70.0° \tag{28}$$

where

ΩHw is the total angle of view in the horizontal direction at the wide angle end.

39. The variable magnification optical system according to claim 6, wherein the following Conditional Expression (29) is satisfied:

$$5.0 \leq ft/fw \leq 120.0 \tag{29}$$

where ft is the focal length of the variable magnification optical system at the telephoto end, and
fW is the focal length of the variable magnification optical system at the wide angle end.

40. The variable magnification optical system according to claim 6, wherein the following Conditional Expression (30) is satisfied:

$$0.60 \leq FNOw \leq 2.5 \tag{30}$$

where
FNOw is an F-number at the wide angle end.

41. The variable magnification optical system according to claim 6, wherein the following Conditional Expression (31) is satisfied:

$$0.70 \leq FNOt \leq 5.5 \tag{31}$$

where
FNOt is an F-number at the telephoto end.

42. The variable magnification optical system according to claim 6, wherein at a time of changing magnification, the aperture stop is moved only in one direction or is fixed.

43. The variable magnification optical system according to claim 6, wherein a negative lens and a positive lens belong to the second region.

44. The variable magnification optical system according to claim 6, wherein the following Conditional Expression (32) is satisfied:

$$0.04 \leq \Sigma G1/LTLw \leq 0.35 \tag{32}$$

where
$\Sigma G1$ is a thickness of the first lens unit, and
LTLw is an overall length of the variable magnification optical system at the wide angle end.

45. The variable magnification optical system according to claim 6, wherein the following Conditional Expression (33) is satisfied:

$$0.0 \leq ft/fw + 143.9 \times \tan(\Omega Hw/2) - 121.88 \leq 110 \tag{33}$$

where
fW is the focal length of the variable magnification optical system at the wide angle end,
ft is a focal length of the variable magnification optical system at the telephoto end, and
$\Omega Hw$ is a total angle of view in the horizontal direction at the wide angle end.

46. The variable magnification optical system according to claim 6, wherein the following Conditional Expression (34) is satisfied:

$$0.0 \leq ft/fw + 126.52 \times \tan(\Omega Hw/2) - 101.91 \leq 120 \tag{34}$$

where
fW is the focal length of the variable magnification optical system at the wide angle end,
ft is a focal length of the variable magnification optical system at the telephoto end, and
$\Omega Hw$ is a total angle of view in the horizontal direction at the wide angle end.

47. The variable magnification optical system according to claim 6, further comprising:
a predetermined resin negative lens that has an aspheric surface and satisfies the following Conditional Expression (36), and
the predetermined resin negative lens is disposed in the first region, $$1.4 \leq ndGI1N1 \leq 1.55 \tag{36}$$

where
ndGI1N1 is a refractive index on d-line of the predetermined resin negative lens.

48. The variable magnification optical system according to claim 6, further comprising:
a predetermined resin positive lens that has an aspheric surface and satisfies the following Conditional Expression (37), and
the predetermined resin positive lens is a positive lens positioned closest to the object side among the positive lenses in the first sub-lens unit:

$$1.4 \leq ndGI2SUB1P \leq 1.55 \tag{37}$$

where
ndGI2SUB1P is a refractive index on d-line of the predetermined resin positive lens.

49. The variable magnification optical system according to claim 6, wherein:
the second lens unit consists of, in order from the object side, a first negative lens, a second negative lens, and a cemented doublet lens,
the second negative lens consists of a resin negative lens,
the cemented doublet lens consists of a negative lens and a positive lens, and the following Conditional Expression (38) is satisfied:

$$0.7 \leq |fG22/RG2C| \leq 2 \tag{38}$$

where
fG22 is a focal length of the second negative lens, and
RG2C is a radius of paraxial curvature of the cemented surface of the cemented doublet lens.

50. The variable magnification optical system according to claim 6, wherein:
the second lens unit consists of, in order from the object side, the first negative lens, the second negative lens, and the cemented doublet lens,
the cemented doublet lens consists of the negative lens and the positive lens,
a lens belonging to the second region consists of one positive lens, and the following Conditional Expression (39) and is satisfied:

$$0.7 \leq RG2C/fGI2 \leq 1.9 \tag{39}$$

where
RG2C is a radius of paraxial curvature of the cemented surface of the cemented doublet lens, and
fGI2 is a focal length on the one positive lens belonging to the second region.

51. An image pickup apparatus comprising:
an optical system; and
an image pickup element having an image pickup surface, and converting an image formed on the image pickup surface with the optical system into an electric signal, wherein
the optical system is the variable magnification optical system according to claim 6.

52. A variable magnification optical system comprising:
in order from an object side,
a first lens unit having a positive refractive power;
a second lens unit having a negative refractive power;
a third lens unit having a positive refractive power; and
an image-side lens unit, wherein
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the second lens unit moves so that a distance between the first lens unit and the second lens unit is larger at a telephoto end than at a wide angle end, the third lens unit moves, and
all the lenses belonging to the second region are fixed, and
the following Conditional Expressions (1-2) and (3) are satisfied:

$$1.61 \leq |fG2/fw| \leq 10.0 \qquad (1\text{-}2), \text{ and}$$

$$0.067 \leq fG2 \times PG1G2a \leq 0.207 \qquad (3)$$

where
fG2 is a focal length of the second lens unit,
fw is a focal length of the variable magnification optical system at the wide angle end,
PG1G2a is represented by the following expression:

$$PG1G2a = 1/RG1B - 1/RG2F, \text{ where}$$

RG1B is a radius of curvature of a lens surface positioned closest to an image side in the first lens unit, and
RG2F is a radius of curvature of a lens surface positioned closest to the object side in the second lens unit.

53. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the second lens unit moves so that a distance between the first lens unit and the second lens unit is larger at a telephoto end than at a wide angle end,
the first lens unit is fixed, and
the third lens unit moves,
the first lens unit includes a negative lens and a positive lens,
the positive lens in the first lens unit is a positive meniscus lens having a convex surface facing the object side,
the third lens unit includes a positive lens and a negative lens, and
the following Conditional Expressions (1-3) and (2-2) are satisfied:

$$1.60 \leq |fG2/fw| \leq 10.0 \qquad (1\text{-}3), \text{ and}$$

$$0 \leq \Delta SS/LTLw \leq 0.11 \qquad (2\text{-}2)$$

where
fG2 is a focal length of the second lens unit,
fw is a focal length of the variable magnification optical system at the wide angle end,
ΔSS is a maximum amount of movement of an aperture stop at a time of changing magnification, and
LTLw is an overall length of the variable magnification optical system at the wide angle end.

54. A variable magnification optical system comprising:
in order from an object side,
a first lens unit having a positive refractive power;
a second lens unit having a negative refractive power;
a third lens unit having a positive refractive power; and
an image-side lens unit, wherein:
the image-side lens unit includes a lens belonging to a first region and a lens belonging to a second region,
a refractive power based on all lenses belonging to the first region is a negative refractive power, and a refractive power based on all lenses belonging to the second region is a positive refractive power,
at a time of changing magnification,
a distance between the lens units changes,
the second lens unit moves so that a distance between the first lens unit and the second lens unit is larger at a telephoto end than at a wide angle end,
the first lens unit is fixed, and
the third lens unit moves,
the third lens unit includes a positive lens and a negative lens, and
the following Conditional Expressions (2-2) and (4-1) are satisfied:

$$0 \leq \Delta SS/LTLw \leq 0.11 \qquad (2\text{-}2), \text{ and}$$

$$8.7 \leq fG1/fw \leq 50 \qquad (4\text{-}1)$$

where
ΔSS is a maximum amount of movement of an aperture stop at a time of changing magnification,
LTLw is an overall length of the variable magnification optical system at the wide angle end,
fG1 is a focal length of the first lens unit, and
fw is a focal length of the variable magnification optical system at the wide angle end.

55. A variable magnification optical system comprising:
in order from an object side,
a first lens unit having a positive refractive power; and
a second lens unit having a negative refractive power, wherein:
an image-side first positive lens unit having a positive refractive power is included on an image side of the second lens unit,
an image-side second positive lens unit having a positive refractive power is included on the image side of the image-side first positive lens unit,
at a time of changing magnification,
the second lens unit moves so that a distance between the first lens unit and the second lens unit is widened at a telephoto end than at a wide angle end, and
an aperture stop moves, and
the following Conditional Expressions (28-1), (29-1), and (32) are satisfied:

$$35.3° \leq \Omega Hw/2 \leq 70.0° \qquad (28\text{-}1)$$

$$7.0 \leq ft/fw \leq 120.0 \qquad (29\text{-}1), \text{ and}$$

$$0.04 \leq \Sigma G1/LTLw \leq 0.35 \qquad (32)$$

where
ΩHw is a total angle of view in a horizontal direction at the wide angle end,
ft is a focal length of the variable magnification optical system at the telephoto end,
fw is a focal length of the variable magnification optical system at the wide angle end,
ΣG1 is a thickness of the first lens unit, and
LTLw is an overall length of the variable magnification optical system at the wide angle end.

56. An image pickup apparatus comprising:
an optical system; and
an image pickup element having an image pickup surface, and converting an image formed on the image pickup surface with the optical system into an electric signal, wherein
the optical system is the variable magnification optical system according to claim 55.

57. A variable magnification optical system comprising: in order from an object side,
a first lens unit having a positive refractive power; and
a second lens unit having a negative refractive power, wherein:
an image-side first positive lens unit having a positive refractive power is included on an image side of the second lens unit,
an image-side second positive lens unit having a positive refractive power is included on the image side of the image-side first positive lens unit,
at a time of changing magnification,
the second lens unit moves so that a distance between the first lens unit and the second lens unit is larger at a telephoto end than at a wide angle end, and
an aperture stop moves, and
the following Conditional Expressions (28-2), (29-2), and (30-1) are satisfied:

$$33.4° \le \Omega Hw/2 \le 70.0° \quad (28\text{-}2)$$

$$5.0 \le ft/fw \le 65.0 \quad (29\text{-}2), \text{ and}$$

$$0.60 \le FNOw \le 1.84 \quad (30\text{-}1)$$

where
ΩHw is a total angle of view in a horizontal direction at the wide angle end,
ft is a focal length of the variable magnification optical system at the telephoto end,
fw is a focal length of the variable magnification optical system at the wide angle end, and
FNOw is an F-number at the wide angle end.

58. A variable magnification optical system comprising: in order from an object side,
a first lens unit having a positive refractive power; and
a second lens unit having a negative refractive power, wherein:
an image-side first positive lens unit having a positive refractive power is included on an image side of the second lens unit,
an image-side second positive lens unit having a positive refractive power is included on the image side of the image-side first positive lens unit,
at a time of changing magnification,
the second lens unit moves so that a distance between the first lens unit and the second lens unit is larger at a telephoto end than at a wide angle end, and
the following Conditional Expressions (29-3), (30-2), and (31) are satisfied:

$$10.0 \le ft/fw \le 65.0 \quad (29\text{-}3)$$

$$0.60 \le FNOw \le 1.62 \quad (30\text{-}2), \text{ and}$$

$$0.70 \le FNOt \le 5.5 \quad (31)$$

where
ft is a focal length of the variable magnification optical system at the telephoto end,
fw is a focal length of the variable magnification optical system at the wide angle end,
FNOw is an F-number at the wide angle end, and
FNOt is an F-number at the telephoto end.

59. A variable magnification optical system comprising: in order from an object side,
a first lens unit having a positive refractive power; and
a second lens unit having a negative refractive power, wherein:
an image-side first positive lens unit having a positive refractive power is included on an image side of the second lens unit,
an image-side second positive lens unit having a positive refractive power is included on the image side of the image-side first positive lens unit,
at a time of changing magnification,
the second lens unit moves so that a distance between the first lens unit and the second lens unit is larger at a telephoto end than at a wide angle end, and
the first lens unit is fixed, and
the following Conditional Expressions (29-4), (33), (35), and (32-1) are satisfied:

$$10.2 \le ft/fw \le 120.0 \quad (29\text{-}4),$$

$$0.0 \le ft/fw + 143.9 \times \tan(\Omega Hw/2) - 121.88 \le 110 \quad (33),$$

$$2.5 \text{ mm} \le Rimg \le 22.0 \text{ mm} \quad (35), \text{ and}$$

$$0.04 \le \Sigma G1/LTLw \le 0.33 \quad (32\text{-}1)$$

where
ft is a focal length of the variable magnification optical system at the telephoto end,
fw is a focal length of the variable magnification optical system at the wide angle end,
ΩHw is a total angle of view in a horizontal direction at the wide angle end,
Rimg is a radius of an image circle at an image pickup element,
ΣG1 is a thickness of the first lens unit, and
LTLw is an overall length of the variable magnification optical system at the wide angle end.

60. A variable magnification optical system comprising: in order from an object side,
a first lens unit having a positive refractive power; and
a second lens unit having a negative refractive power, wherein:
an image-side first positive lens unit having a positive refractive power is included on an image side of the second lens unit,
an image-side second positive lens unit having a positive refractive power is included on the image side of the image-side first positive lens unit,
at a time of changing magnification,
the second lens unit moves so that a distance between the first lens unit and the second lens unit is larger at a telephoto end than at a wide angle end, and
the first lens unit is fixed, and
the following Conditional Expressions (29-5), (34), (35-1), and (32-1) are satisfied:

$$6.1 \le ft/fw \le 120.0 \quad (29\text{-}5)$$

$$0.0 \le ft/fw + 126.52 \times \tan(\Omega Hw/2) - 101.91 \le 120 \quad (34)$$

$$3.3 \text{ mm} \le Rimg \le 22.0 \text{ mm} \quad (35\text{-}1)$$

$$0.04 \le \Sigma G1/LTLw \le 0.33 \quad (32\text{-}1)$$

where
ft is a focal length of the variable magnification optical system at the telephoto end, fw is a focal length of the variable magnification optical system at the wide angle end,
ΩHw is a total angle of view in a horizontal direction at the wide angle end,
Rimg is a radius of an image circle at an image pickup element, ΣG1 is a thickness of the first lens unit, and
LTLw is an overall length of the variable magnification optical system at the wide angle end.

* * * * *